(12) United States Patent
Katsuyama

(10) Patent No.: US 10,298,812 B2
(45) Date of Patent: May 21, 2019

(54) HALFTONE MASK MANUFACTURING METHOD AND HALFTONE MASK MANUFACTURING SYSTEM

(71) Applicant: FUJIFILM Corporation, Tokyo (JP)

(72) Inventor: Kimito Katsuyama, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/993,335

(22) Filed: May 30, 2018

(65) Prior Publication Data
US 2018/0352115 A1    Dec. 6, 2018

Related U.S. Application Data

(63) Continuation of application No. PCT/JP2016/084960, filed on Nov. 25, 2016.

(30) Foreign Application Priority Data

Dec. 1, 2015 (JP) ................................. 2015-234980

(51) Int. Cl.
  *H04N 1/405* (2006.01)
  *H04N 1/60* (2006.01)
  *B41J 2/52* (2006.01)

(52) U.S. Cl.
  CPC ............. *H04N 1/6027* (2013.01); *B41J 2/52* (2013.01); *H04N 1/4051* (2013.01); *H04N 1/4053* (2013.01); *H04N 1/6022* (2013.01)

(58) Field of Classification Search
  CPC .. H04N 1/6027; H04N 1/6022; H04N 1/4051; H04N 1/4053; B41J 2/52
  See application file for complete search history.

(56) References Cited

U.S. PATENT DOCUMENTS

2008/0309983 A1   12/2008   Mizutani

FOREIGN PATENT DOCUMENTS

| EP | 2 571 245 A1 | 3/2013 |
|---|---|---|
| JP | 2003-046777 A | 2/2003 |
| JP | 2003-101776 A | 4/2003 |
| JP | 2007-208786 A | 8/2007 |
| JP | 2007-251734 A | 9/2007 |
| JP | 2013-207677 A | 10/2013 |

OTHER PUBLICATIONS

International Search Report issued in PCT/JP2016/084960; dated Feb. 14, 2017.

(Continued)

*Primary Examiner* — Christopher Wait
(74) *Attorney, Agent, or Firm* — Studebaker & Brackett PC

(57) ABSTRACT

A temporary dot pattern at a dot pattern determining target gradation is determined by adding or removing dots as much as the number of dots corresponding to a gradation difference to or from a dot pattern at a gradation at which a dot pattern is already determined, and a dot pattern at a dot pattern determining target gradation is determined by performing a replacement process of replacing dots including some of dots at a dot pattern determined gradation among the dots in the temporary dot pattern with non-dot arrangements. A halftone mask may be constituted by a group of dot patterns at each gradation, or the halftone mask may be constituted by setting a dot pattern for each gradation as a threshold value.

23 Claims, 27 Drawing Sheets

(56) References Cited

OTHER PUBLICATIONS

International Preliminary Report on Patentability and Written Opinion issued in PCT/JP2016/084960; dated Jun. 5, 2018.
The extended European search report issued by the European Patent Office dated Oct. 19, 2018, which corresponds to European Patent Application No. 16870550.7-1209 and is related to U.S. Appl. No. 15/993,335.

WHITE AND BLACK ARRANGEMENT AFTER WHITE-TO-BLACK CHANGING PROCESS (THRESHOLD VALUE 9)

TEMPORARILY CHANGE ONE WHITE PIXEL TO BLACK PIXEL, AND EVALUATE GRAININESS

WHITE AND BLACK ARRANGEMENT BEFORE WHITE-TO-BLACK CHANGING PROCESS (THRESHOLD VALUE 8)

WHITE AND BLACK ARRANGEMENT AFTER
WHITE-TO-BLACK CHANGING PROCESS

↑
14

WHITE AND BLACK DITHER MASK

↑
20

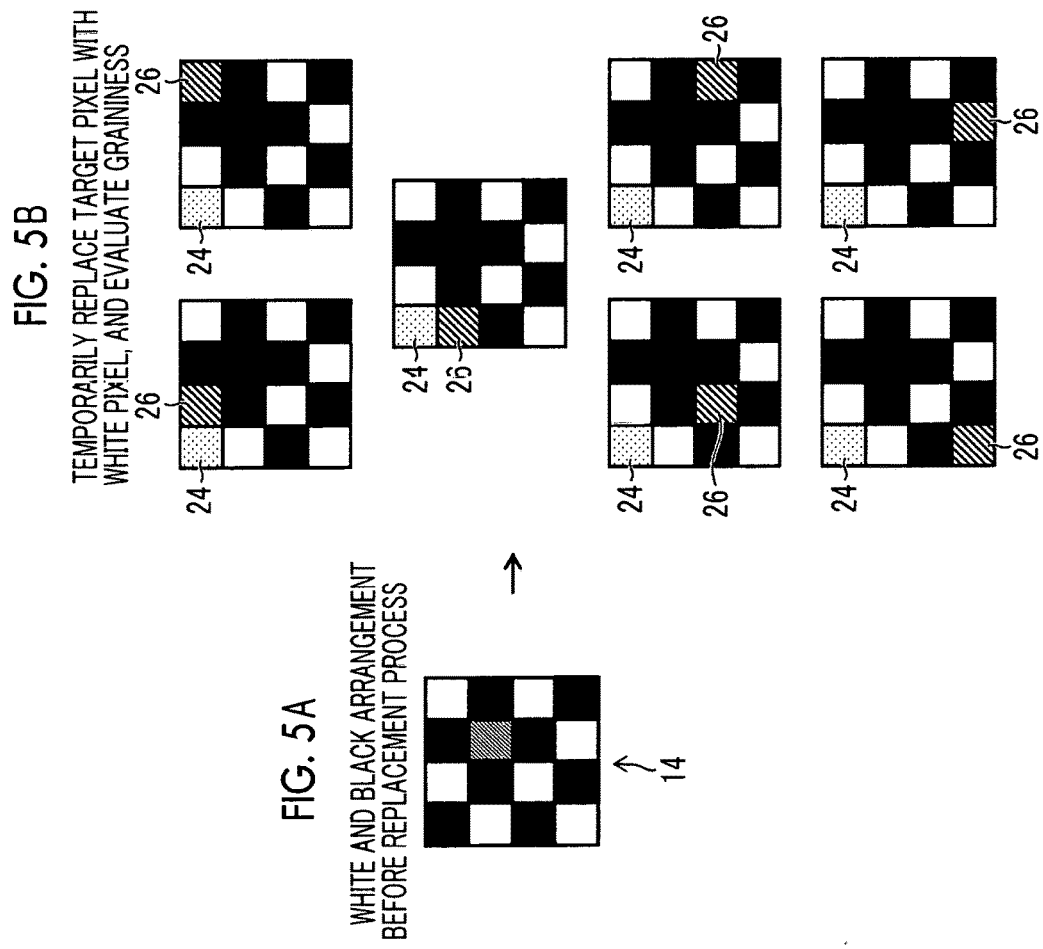

WHITE AND BLACK ARRANGEMENT AFTER REPLACEMENT PROCESS

WHITE AND BLACK DITHER MASK

BLACK AND WHITE DITHER MASK

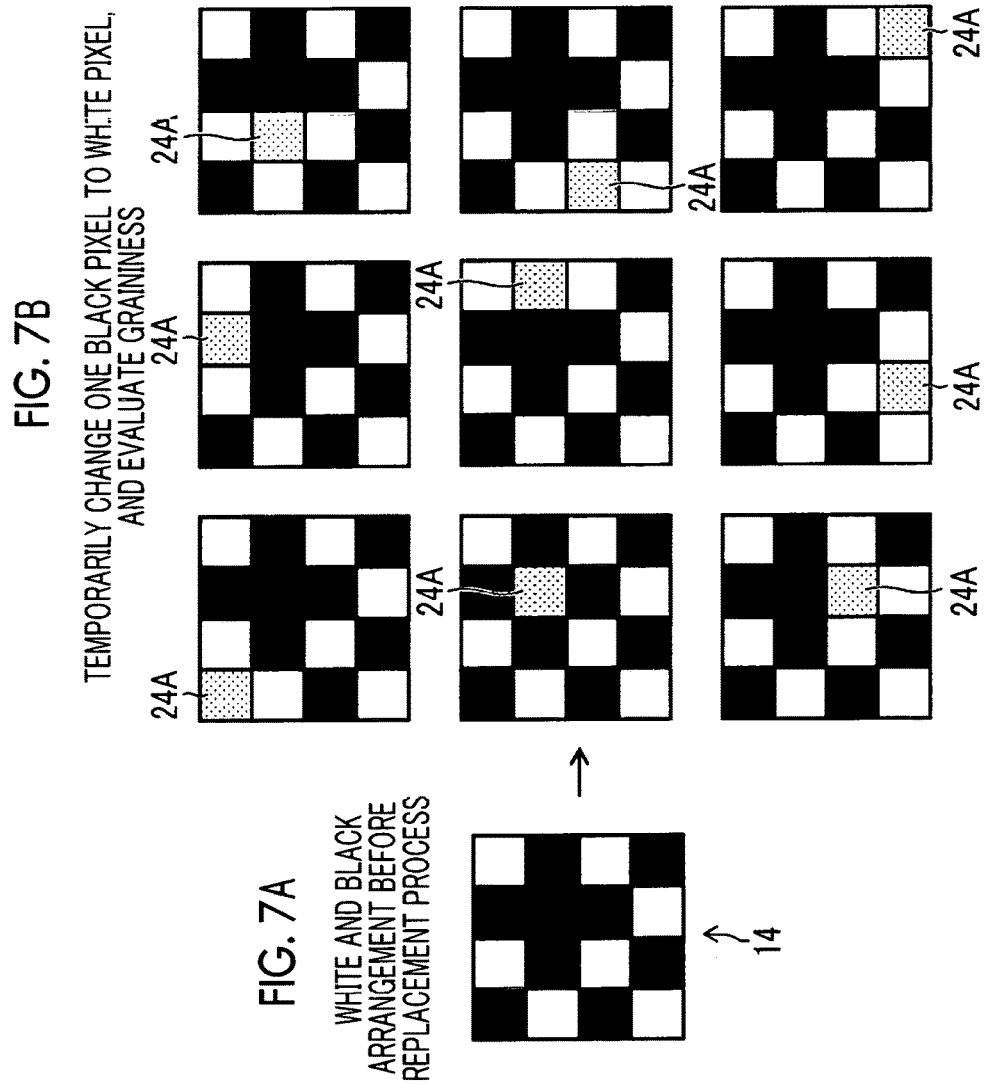

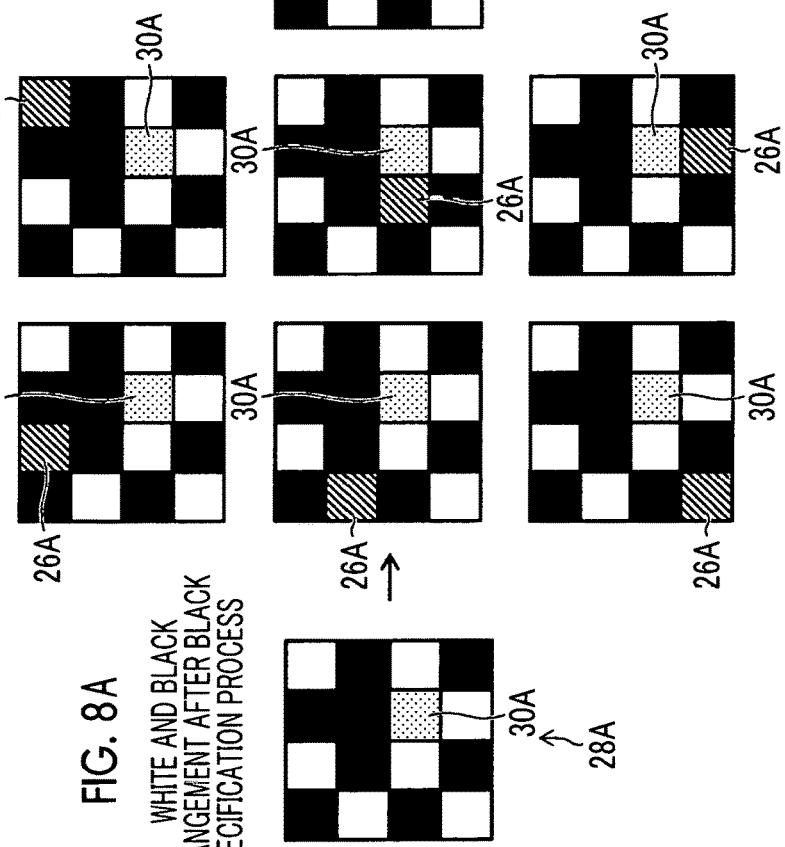
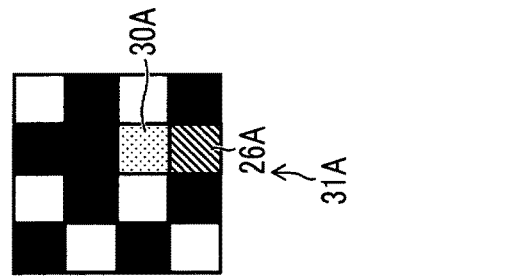

WHITE AND BLACK ARRANGEMENT BEFORE BLACK-TO-WHITE CHANGING PROCESS (THRESHOLD VALUE 8)

TEMPORARILY CHANGE ONE BLACK PIXEL TO WHITE PIXEL, AND EVALUATE GRAININESS

WHITE AND BLACK ARRANGEMENT AFTER BLACK-TO-WHITE CHANGING PROCESS (THRESHOLD VALUE 8)

WHITE AND BLACK ARRANGEMENT AFTER BLACK-TO-WHITE CHANGING PROCESS

54

WHITE AND BLACK DITHER MASK

20

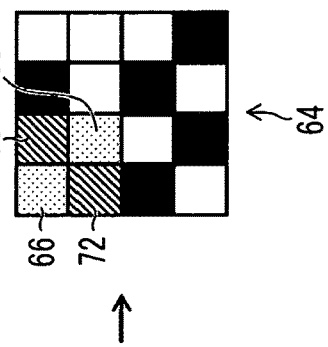
FIG. 12C
WHITE AND BLACK ARRANGEMENT AFTER REPLACEMENT PROCESS
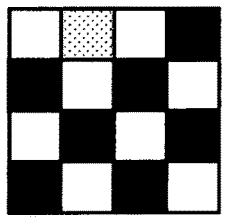
FIG. 12A
WHITE AND BLACK ARRANGEMENT BEFORE REPLACEMENT PROCESS
FIG. 12B
TEMPORARILY REPLACE TARGET PIXEL WITH WHITE PIXEL, AND EVALUATE GRAININESS

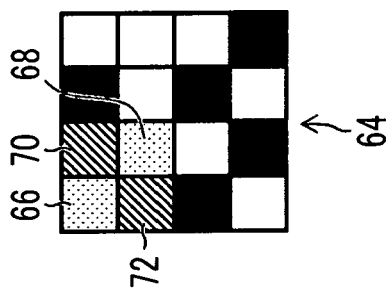

FIG. 15A

| 11 | 12 | 13 | 14 | 15 | 16 | 17 | 18 | 19 |
|----|----|----|----|----|----|----|----|----|
| 21 | 22 | 23 | 24 | 25 | 26 | 27 | 28 | 29 |
| 31 | 32 | 33 | 34 | 35 | 36 | 37 | 38 | 39 |
| 41 | 42 | 43 | 44 | 45 | 46 | 47 | 48 | 49 |
| 51 | 52 | 53 | 54 | 55 | 56 | 57 | 58 | 59 |
| 61 | 62 | 63 | 64 | 65 | 66 | 67 | 68 | 69 |
| 71 | 72 | 73 | 74 | 75 | 76 | 77 | 78 | 79 |
| 81 | 82 | 83 | 84 | 85 | 86 | 87 | 88 | 89 |
| 91 | 92 | 93 | 94 | 95 | 96 | 97 | 98 | 99 |

| 11 | 12 | 13 | 14 | 15 | 16 | 17 | 18 | 19 |
|----|----|----|----|----|----|----|----|----|
| 21 | 22 | 23 | 24 | 25 | 26 | 27 | 28 | 29 |
| 31 | 32 | 33 | 34 | 35 | 36 | 37 | 38 | 39 |
| 41 | 42 | 43 | 44 | 45 | 46 | 47 | 48 | 49 |
| 51 | 52 | 53 | 54 | 55 | 56 | 57 | 58 | 59 |
| 61 | 62 | 63 | 64 | 65 | 66 | 67 | 68 | 69 |
| 71 | 72 | 73 | 74 | 75 | 76 | 77 | 78 | 79 |
| 81 | 82 | 83 | 84 | 85 | 86 | 87 | 88 | 89 |
| 91 | 92 | 93 | 94 | 95 | 96 | 97 | 98 | 99 |

↑
112

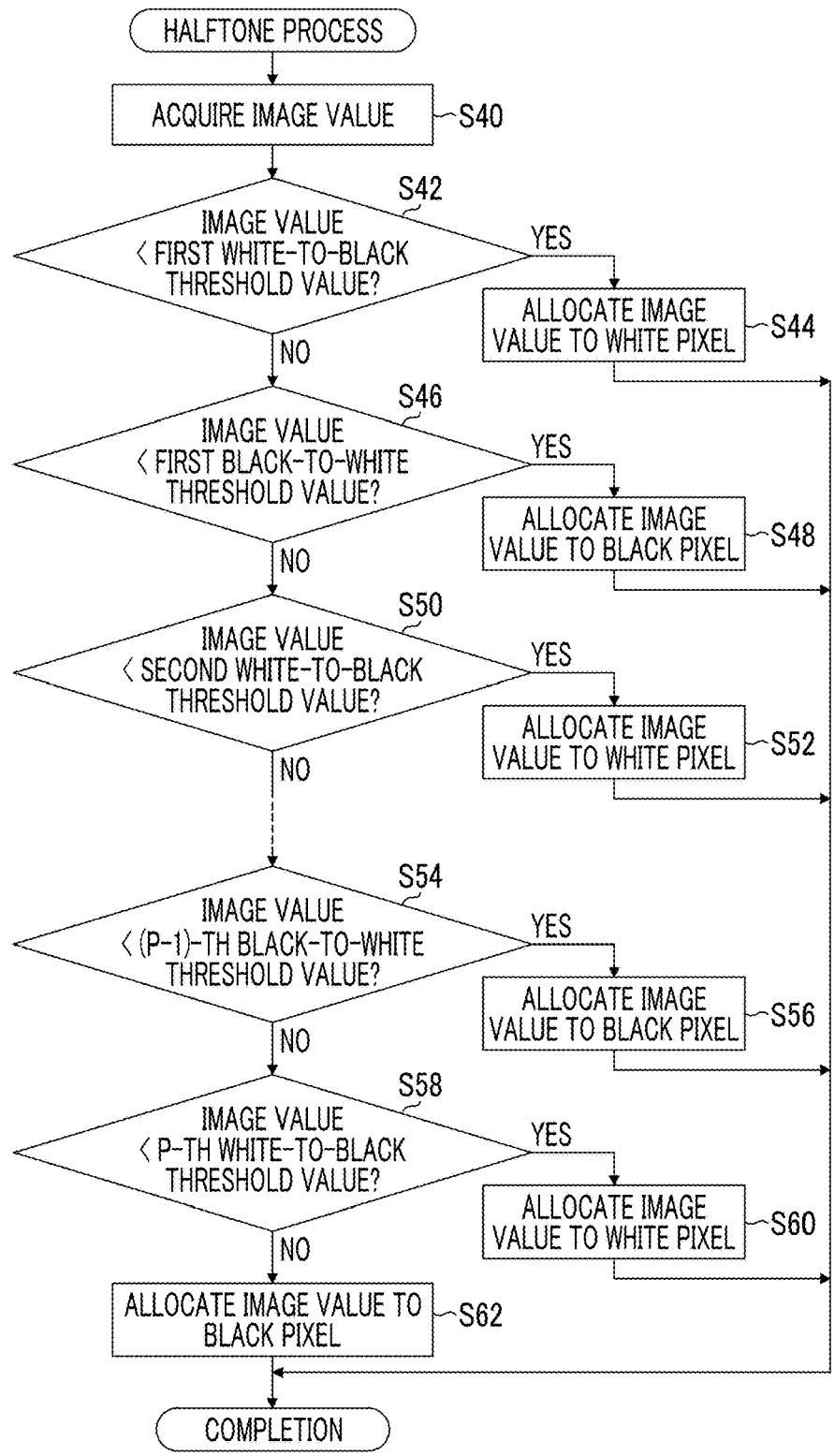

| 11 | 12 | 13 | 14 | 15 | 16 | 17 | 18 | 19 | 1a | 1b | 1c | 1d | 1e | 1f | 1g |
|----|----|----|----|----|----|----|----|----|----|----|----|----|----|----|----|
| 21 | 22 | 23 | 24 | 25 | 26 | 27 | 28 | 29 | 2a | 2b | 2c | 2d | 2e | 2f | 2g |
| 31 | 32 | 33 | 34 | 35 | 36 | 37 | 38 | 39 | 3a | 3b | 3c | 3d | 3e | 3f | 3g |
| 41 | 42 | 43 | 44 | 45 | 46 | 47 | 48 | 49 | 4a | 4b | 4c | 4d | 4e | 4f | 4g |
| 51 | 52 | 53 | 54 | 55 | 56 | 57 | 58 | 59 | 5a | 5b | 5c | 5d | 5e | 5f | 5g |
| 61 | 62 | 63 | 64 | 65 | 66 | 67 | 68 | 69 | 6a | 6b | 6c | 6d | 6e | 6f | 6g |
| 71 | 72 | 73 | 74 | 75 | 76 | 77 | 78 | 79 | 7a | 7b | 7c | 7d | 7e | 7f | 7g |
| 81 | 82 | 83 | 84 | 85 | 86 | 87 | 88 | 89 | 8a | 8b | 8c | 8d | 8e | 8f | 8g |
| 91 | 92 | 93 | 94 | 95 | 96 | 97 | 98 | 99 | 9a | 9b | 9c | 9d | 9e | 9f | 9g |
| a1 | a2 | a3 | a4 | a5 | a6 | a7 | a8 | a9 | aa | ab | ac | ad | ae | af | ag |
| b1 | b2 | b3 | b4 | b5 | b6 | b7 | b8 | b9 | ba | bb | bc | bd | be | bf | bg |
| c1 | c2 | c3 | c4 | c5 | c6 | c7 | c8 | c9 | ca | cb | cc | cd | ce | cf | cg |
| d1 | d2 | d3 | d4 | d5 | d6 | d7 | d8 | d9 | da | db | dc | dd | de | df | dg |
| e1 | e2 | e3 | e4 | e5 | e6 | e7 | e8 | e9 | ea | eb | ec | ed | ee | ef | eg |
| f1 | f2 | f3 | f4 | f5 | f6 | f7 | f8 | f9 | fa | fb | fc | fd | fe | ff | fg |
| g1 | g2 | g3 | g4 | g5 | g6 | g7 | g8 | g9 | ga | gb | gc | gd | ge | gf | gg |

304

| 11 | 12 | 13 | 14 | 15 | 16 | 17 | 18 | 19 | 1a | 1b | 1c | 1d | 1e | 1f | 1g |
|----|----|----|----|----|----|----|----|----|----|----|----|----|----|----|----|
| 21 | 22 | 23 | 24 | 25 | 26 | 27 | 28 | 29 | 2a | 2b | 2c | 2d | 2e | 2f | 2g |
| 31 | 32 | 33 | 34 | 35 | 36 | 37 | 38 | 39 | 3a | 3b | 3c | 3d | 3e | 3f | 3g |
| 41 | 42 | 43 | 44 | 45 | 46 | 47 | 48 | 49 | 4a | 4b | 4c | 4d | 4e | 4f | 4g |
| 51 | 52 | 53 | 54 | 55 | 56 | 57 | 58 | 59 | 5a | 5b | 5c | 5d | 5e | 5f | 5g |
| 61 | 62 | 63 | 64 | 65 | 66 | 67 | 68 | 69 | 6a | 6b | 6c | 6d | 6e | 6f | 6g |
| 71 | 72 | 73 | 74 | 75 | 76 | 77 | 78 | 79 | 7a | 7b | 7c | 7d | 7e | 7f | 7g |
| 81 | 82 | 83 | 84 | 85 | 86 | 87 | 88 | 89 | 8a | 8b | 8c | 8d | 8e | 8f | 8g |
| 91 | 92 | 93 | 94 | 95 | 96 | 97 | 98 | 99 | 9a | 9b | 9c | 9d | 9e | 9f | 9g |
| a1 | a2 | a3 | a4 | a5 | a6 | a7 | a8 | a9 | aa | ab | ac | ad | ae | af | ag |
| b1 | b2 | b3 | b4 | b5 | b6 | b7 | b8 | b9 | ba | bb | bc | bd | be | bf | bg |
| c1 | c2 | c3 | c4 | c5 | c6 | c7 | c8 | c9 | ca | cb | cc | cd | ce | cf | cg |
| d1 | d2 | d3 | d4 | d5 | d6 | d7 | d8 | d9 | da | db | dc | dd | de | df | dg |
| e1 | e2 | e3 | e4 | e5 | e6 | e7 | e8 | e9 | ea | eb | ec | ed | ee | ef | eg |
| f1 | f2 | f3 | f4 | f5 | f6 | f7 | f8 | f9 | fa | fb | fc | fd | fe | ff | fg |
| g1 | g2 | g3 | g4 | g5 | g6 | g7 | g8 | g9 | ga | gb | gc | gd | ge | gf | gg |

HALFTONE MASK MANUFACTURING METHOD AND HALFTONE MASK MANUFACTURING SYSTEM

CROSS-REFERENCE TO RELATED APPLICATIONS

The present application is a Continuation of PCT International Application No. PCT/JP2016/084960 filed on Nov. 25, 2016 claiming priority under 35 U.S.C. § 119(a) to Japanese Patent Application No. 2015-234980 filed on Dec. 1, 2015. Each of the above applications is hereby expressly incorporated by reference, in their entirety, into the present application.

BACKGROUND OF THE INVENTION

1. Field of the Invention

The present invention relates to a halftone mask manufacturing method and a halftone mask manufacturing system, and particularly, relates to a halftone mask applied to a halftone process of creating a halftone image.

2. Description of the Related Art

As a technique that expresses a larger number of tones than the number of colors with a limited number of colors as in a printer, there is a technique called halftone dots or halftones. The halftone is a technique that enables printing in the printer by expressing a color image by a pattern of small dots having a limited number of colors.

As a technique that processes the image at a high speed with less arithmetic processing amount, there is a technique called a dither method as one halftone technique. The dither method is a technique that allocates multivalued image values to binary values by dividing the image into small blocks and comparing an image of each block with a dither mask having the same pixel size as each block and having a threshold value for each pixel.

That is, the dither method is a technique that compares an image value of each pixel with the threshold value of the dither mask, sets a white pixel in a case where the image value is less than the threshold value, and sets a black pixel in a case where the image value is equal to or greater than the threshold value. The white pixel mentioned herein represents a non-dot arrangement pixel which is a pixel in which a dot is not disposed. The black pixel represents a dot arrangement pixel which is a pixel in which the dot is disposed. Hereinafter, a process of allocating the image value of each pixel to a binary value is called binarization.

The dither method has stacking limitations. The stacking limitations mean limitations of $I_k \subset I_g$ in a case where k and g are integers which satisfy k<g, a black arrangement at a density value k and a black arrangement at a density value g are $I_k$ and $I_g$. In a white arrangement, in a case where a white arrangement at a density value k and a white arrangement at a density value g are $J_k$ and $J_g$, the relationship of $J_k \supset J_g$ is satisfied. Here, $A \subset B$ indicates that A is a subset of B.

The black arrangement represents the arrangement of the pixel in which the dot is disposed. The white arrangement represents the arrangement of the pixel in which the dot is not disposed. The black arrangement and the white arrangement are collectively referred to as a white and black arrangement. The white and black arrangement is the same as the dot pattern or the dot arrangement.

That is, the white and black arrangement at each density of the dither mask is not independent for each density. Thus, since the black pixel is consecutively increased from the black arrangement at a density which is equal to or less than a certain density in the black arrangement at the certain density, there are limitations that the white and black arrangement includes the black arrangement at the density which is equal to or less than the certain density. Further, since the white pixel is consecutively increased from the white arrangement at a density which is equal to or greater than a certain density in the white arrangement at the certain density, there are limitations that the white and black arrangement includes the white arrangement at the certain density which is equal to or greater than the certain density.

Due to the stacking limitations, the white and black arrangement at each density of the dither mask has bad image quality such as graininess compared to the white and black arrangement independently optimized through an error diffusion method at each density. That is, a halftone image acquired through the dither method has bad image quality such as graininess compared to a halftone image acquired through the error diffusion method of independently optimizing the white and black arrangement at each density.

JP2003-046777A describes a dither mask creating method of determining a dot arrangement by picking up a plurality of gradations separated with a predetermined gradation and independently optimizing the dot arrangement, and subsequently determining the dot arrangements between the picked-up gradations through interpolation.

In the dither mask creating method described in JP2003-046777A, dot patterns present in a gradation section interposed between the optimum patterns are created by picking up a plurality of discontinuous gradations, individually generating optimum dot patterns for the picked-up gradations, selecting common dots and difference dots between the optimum dot patterns at the gradations, and gradually canceling the difference dots depending on the number of gradations interposed between the optimum patterns.

In the creating of the dither mask described in JP2003-046777A, the deterioration in image quality due to the limitations of the sequential dot arrangement is prevented, and the continuity of the dot patterns present in the gradation sections interposed between the optimum patterns is secured through the interpolation.

JP2013-207677A describes an image processing device that retains a plurality of independent dither masks, determines a mask to be used among the plurality of masks based on an input gradation value, and performs a halftone process by using the determined mask.

In the image processing device described in JP2013-207677A, an image having favorable graininess is acquired without having stacking limitations between the plurality of independent dither masks. It is possible to reduce storage capacity compared to a case where the halftone patterns at all the gradations are retained.

SUMMARY OF THE INVENTION

In the dither mask creating method described in JP2003-046777A, the quality of the dot arrangement at the gradation of each picked-up section is improved compared to the sequential mask construction method of the related art having the stacking limitations.

However, since the dot arrangement at the gradation of each section is independently optimized and the continuity of the dot arrangements between the gradations is not considered, the continuity of the dot arrangements between the gradations including the dot arrangement between the gradations of the sections may not be secured.

That is, in the creating of the dither mask described in JP2003-046777A, even though the dot arrangement between the gradations of the sections is determined from the dot arrangements at the gradations of the sections through interpolation, the continuity of the dot arrangement including the dot arrangement between the gradations of the sections is not able to be secured in a case where an interval between the gradations of the sections is narrow or a case where the dot arrangements at the gradations of the sections are greatly discontinuous.

For example, as an extreme example, in a case where the interval between the gradations of the sections is an interval of one gradation, that is, one dot, since the dot arrangements at the gradations of the sections are independent, the dot arrangements at the continuous gradations are also discontinuous.

In JP2003-046777A, an interval of the number of gradations which is equal to or greater than 1/32 of the total number of gradations or is equal to or greater than 1/16 of the total number of gradations is spaced as the interval between the gradations of the section, and thus, it is possible to secure quality of the continuity of the gradations.

However, all the on-dots need to be replaced in a case where the dot arrangements at the gradations of the sections are greatly discontinuous, for example, a case where the common dots of the dot arrangements at the gradations of the sections are not present as an extreme example, that is, a case where pixels as on-dots are not present in all the dot arrangements at the gradations of the sections, and the dot arrangements at the continuous gradations are discontinuous even in a case where an interval of the number of gradations which is equal to or greater than 1/32 of the total number of gradations is present between the gradations of the sections or a case where an interval of the number of gradations which is equal to or greater than 1/16 of the total number of gradations is present between the gradations of the sections.

In conclusion, in the generation of the dither mask described in JP2003-046777A, in a case where the dot arrangements at the gradations of the sections are optimized in advance, since the dot arrangements are independently optimized without considering the continuity, the continuity may not be secured through the interpolation.

The image processing device described in JP2013-207677A does not completely consider the continuity of the dot arrangements at the gradations. That is, in a case where the plurality of dither masks is created, the dither masks are independently created without completely considering the continuity of the masks. Accordingly, the dot arrangements at the gradations are discontinuous.

The present invention has been made in view of such circumstances, and it is an object of the invention to provide a halftone mask manufacturing method and a halftone mask manufacturing system which are capable of securing continuity of dot patterns between gradations and achieving favorable image quality compared to a case where the dither mask of the related art is used.

In order to achieve the object, the following invention aspects are provided.

A halftone mask manufacturing method according to a first aspect is a halftone mask manufacturing method of manufacturing a halftone mask to be applied to a halftone process of creating a halftone image by converting multi-valued image data. The method comprises a dot pattern determining step of determining a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changing the dot pattern determining target gradation, and determining dot patterns for a plurality of gradations. The dot pattern determining step includes a dot number changing step of determining a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and a replacement processing step of determining the dot pattern at the dot pattern determining target gradation by performing a replacement process of replacing dots including some of the dots at the dot pattern determined gradation with non-dot arrangements on the temporary dot pattern, or a replacement processing step of determining a temporary dot pattern at the dot pattern determined gradation by performing a replacement process of replacing some of dots with non-dot arrangements on the dot pattern at the dot pattern determined gradation, and a dot number changing step of determining the dot pattern at the dot pattern determining target gradation by removing or adding the dots as much as the number of dots corresponding the gradation difference between the dot pattern determined gradation and the dot pattern determining target gradation from or to the temporary dot pattern.

According to the first aspect, since some of the dots in the dot pattern at the dot pattern determined gradation are included in the targets of the replacement process, the stacking limitations of halftone masks are partially eliminated, and thus, it is possible to improve image quality. The stacking limitations of the halftone masks are partially maintained, and thus, the constant continuity of the dot patterns between the gradations is secured.

An aspect in which the halftone mask manufacturing method includes an initial dot pattern setting step of setting an initial dot pattern is preferable. In such an aspect, in a case where a gradation of the initial dot pattern is an intermediate gradation between the minimum number of gradations to the maximum number of gradations, an aspect in which both an ascending-order process of performing a process in ascending order from the gradation of the initial dot pattern and a descending-order process of performing a process in descending order from the gradation of the initial dot pattern are performed may be adopted.

The dot pattern determining target gradation in the previous process may be adopted as the dot pattern determined gradation.

An aspect in which in the dot pattern determining step, a dot pattern of which image quality becomes best is adopted in the addition or removing of the dots or the replacement of the dots with the non-dot arrangement is preferable.

In the replacement step, the replacement of all the dots with the non-dot arrangement may be performed, and some of the dots in the dot pattern at the dot pattern determined gradation may be changed as the result.

According to a second aspect, in the halftone mask manufacturing method according to the first aspect, in the dot number changing step, the dots as much as the number of dots corresponding to the gradation difference between the dot pattern determined gradation and the dot pattern determining target gradation may be added in a case where the dot pattern determining target gradation is greater than the dot pattern determined gradation, and the dots as much as the number of dots corresponding to the gradation difference between the dot pattern determined gradation and the dot pattern determining target gradation may be removed in a case where the dot pattern determining target gradation is less than the dot pattern determined gradation.

According to the second aspect, it is possible to perform the replacement process using the dot pattern having the dots as much as the number of dots depending on the gradation.

According to a third aspect, the halftone mask manufacturing method according to the first aspect or the second aspect may further comprise a threshold value setting step of setting a threshold value to the halftone mask based on the dot pattern for each gradation determined in the dot pattern determining step.

According to the third aspect, the halftone mask in which the threshold value is set for the pixels constituting the halftone mask is manufactured.

The dither mask is used as an example of the halftone mask in which the threshold values are set for the pixels constituting the halftone mask.

According to a fourth aspect, in the halftone mask manufacturing method according to the third aspect, the threshold value setting step may include a threshold value setting step of setting a first threshold value at which the non-dot arrangement is switched to the dot with an increase in gradation and a second threshold value at which the dot is switched to the non-dot arrangement with the increase in gradation at at least some gradations.

According to the fourth aspect, the first threshold value and the second threshold value are set for the halftone mask, and thus, it is possible to optimize the dot pattern in the replacement processing step at each gradation without being influenced by the stacking limitations.

According to a fifth aspect, in the halftone mask manufacturing method according to the fourth aspect, in the threshold value setting step, two kinds of the first threshold value and the second threshold value may be set for at least some pixels at at least some gradations.

According to the fifth aspect, it is possible to perform the replacement of the dots and the non-dot arrangements by two times or more in a case where the gradation is increased, and it is possible to optimize the dot pattern at each gradation without being influenced by the stacking limitations.

According to a sixth aspect, the halftone mask manufacturing method according to the first aspect or the second aspect may further comprise a dot pattern storing step of storing the dot pattern which is determined in the dot pattern determining step and is the dot pattern for each gradation at at least some gradations.

According to the sixth aspect, the halftone mask constituted by the dot pattern for each gradation is manufactured.

It is possible to achieve an aspect in which the halftone mask according to the third aspect and the halftone mask according to the sixth aspect are combined.

According to a seventh aspect, in the halftone mask manufacturing method according to any one of the first aspect to the sixth aspect, in the dot pattern determining step, the dot pattern may be determined at one gradation at a time at at least some gradations.

According to the seventh aspect, it is possible to improve image quality by eliminating the stacking limitations of the dot patterns between the gradations for some of the halftone masks for the gradations, and constant continuity of the dot patterns between the gradations is secured by maintaining the stacking limitations for some of the halftone masks.

According to an eighth aspect, in the halftone mask manufacturing method according to any one of the first aspect to the sixth aspect, in the dot pattern determining step, a dot pattern at the dot pattern determining target gradation having a gradation difference of two or more gradations from the dot pattern determined gradation may be determined, and a dot pattern at a gradation between the dot pattern determined gradation and the dot pattern determining target gradation may be determined based on the dot pattern at the dot pattern determined gradation and the dot pattern at the dot pattern determining target gradation.

According to the eighth aspect, it is possible to improve image quality by eliminating the stacking limitations of the dot patterns between the gradations for some of the halftone masks between the gradations separated with two or more gradations, and constant continuity of the dot patterns between the gradations is secured by maintaining the stacking limitations for some of the halftone masks.

The constant continuity of the dot patterns between the gradations is secured at the intermediate gradation between the gradations separated with two or more gradations.

According to a ninth aspect, the halftone mask manufacturing method according to any one of the first aspect to the eighth aspect may further comprise a replacement process number setting step of setting the number of times of the replacement process in the replacement processing step.

According to the ninth aspect, it is possible to set the number of times of the replacement process in the replacement processing step.

As the number of times of the replacement process in the replacement processing step, the number of dots of the replacement targets may be set. Alternatively, the replacement process may be performed on all the dots of the replacement targets, the replacement process may be performed as one cycle, and one cycle of processes may be set as the number of times of the replacement process.

According to a tenth aspect, in the halftone mask manufacturing method according to the ninth aspect, in the replacement process number setting step, the number of times of the replacement process in the replacement processing step may be changed depending on the gradation at at least some gradations.

According to the tenth aspect, it is possible to set the optimum number of times of the replacement process depending on the gradation.

According to an eleventh aspect, in the halftone mask manufacturing method according to the ninth aspect or the tenth aspect, in the replacement process number setting step, the number of times of the replacement process in the replacement processing step of increasing the number of times of the replacement process in the replacement processing step in a case where the smaller one of the number of dots in the dot pattern and the number of non-dot arrangements is increased or decreasing the number of times of the replacement process in the replacement processing step in a case where the smaller one of the number of dots in the dot pattern and the number of non-dot arrangements is decreased may be set at at least some gradations.

According to the eleventh aspect, it is possible to set the optimum number of times of the replacement process depending on a ratio between the number of dots and the number of non-dot arrangements.

In a twelfth aspect, in the halftone mask manufacturing method according to any one of the ninth aspect to the eleventh aspect, in the replacement process number setting step, the number of times of the replacement process in the replacement processing step which is in proportion to the smaller one of the number of dots in the dot pattern and the number of non-dot arrangements may be changed at at least some gradations.

In the twelfth aspect, an aspect in which in a case where the maximum gradation is N, the gradation is n, the number of times of the replacement process is L, and any proportionality constant is $\alpha$, the number of times L of the replacement process is $L=\alpha \times (N-n)$.

In a thirteenth aspect, the halftone mask manufacturing method according to any one of the ninth aspect to the twelfth aspect, in the replacement process number setting step, in a case where a value acquired by dividing the gradation by a maximum gradation is x and a size of the halftone mask is M, the number of times of the replacement process in the replacement processing step may be set in a range which is not greater than $M \times (x \times x^2)$ at at least some gradations.

According to the thirteenth aspect, since the number of times of the replacement process in the replacement processing step is set in a range which is not greater than $M \times (x-x^2)$ which is the maximum value of the number of times of the replacement process in which the replacement of all the dots at the dot pattern determined gradation is not performed, it is possible to keep a balance between the improvement of the image quality and the continuity of the dot patterns between the gradations.

In a fourteenth aspect, in the halftone mask manufacturing method according to any one of the ninth aspect to the twelfth aspect, in the replacement process number setting step, the number of times of the replacement process in the replacement processing step may be set in a range which is not greater than $M \times \beta \times (x-x^2)$ at at least some gradations in a case where a value acquired by dividing the gradation by a maximum gradation is x, the size of the halftone mask is M, and predetermined constant which is greater than 0 or is equal to or less than 1 is $\beta$.

According to the fourteenth aspect, it is possible to adjust the setting of the number of times of the replacement process in a range which is not greater than $M \times \beta \times (x-x^2)$ which is the maximum value of the number of times of the replacement process.

In a fifteenth aspect, in the halftone mask manufacturing method according to any one of the ninth aspect to the fourteenth aspect, in the replacement process number setting step, the number of times of the replacement process in the replacement processing step may be set based on a replacement dot number which is the number of dots on which the replacement of the dot and the non-dot arrangement is actually performed at at least some gradations.

According to the fifteenth aspect, the replacement dot number which is the number of dots to be actually replaced is set as the number of times of the replacement process, and thus, it is possible to avoid a case where the replacement is not performed in the replacement process and a case where the replacement of all the dots is performed.

According to a sixteenth aspect, in the halftone mask manufacturing method according to any one of the ninth aspect to the fifteenth aspect, in the replacement process number setting step, the number of times of the replacement process in the replacement processing step may be set based on the number of overlapped dots or the number of overlapped non-dot arrangements in a dot pattern of a target on which the replacement process is performed and a dot pattern of each of one or more dot pattern determined gradations at at least some gradations.

According to a seventeenth aspect, in the halftone mask manufacturing method according to any one of the ninth aspect to the sixteenth aspect, in the replacement process number setting step, in a case where a value acquired by dividing a gradation of a dot or a non-dot arrangement in a dot pattern of a target on which the replacement process is performed by a maximum gradation is x, a value acquired by dividing a gradation of a dot or a non-dot arrangement in a dot pattern of each dot pattern determined gradation by a maximum gradation is y, and a size of the halftone mask is M, the number of times of the replacement process in the replacement processing step may be set in a range in which the number of overlapped non-dot arrangements or the number of overlapped dots in the dot pattern of the target on which the replacement process is performed and the dot pattern at each dot pattern determined gradation is equal to or greater than $M \times x \times y$ at at least some gradations.

According to an eighteenth aspect, in the halftone mask manufacturing method according to any one of the ninth aspect to the sixteenth aspect, in the replacement process number setting step, in a case where a value acquired by dividing a gradation of a dot or a non-dot arrangement in a dot pattern of a target on which the replacement process is performed by a maximum gradation is x, a value acquired by dividing a gradation of a dot or a non-dot arrangement in a dot pattern of each dot pattern determined gradation by a maximum gradation is y, a size of the halftone mask is M, and predetermined constant which is greater than 0 and is equal to or less than 1 is $\gamma$, the number of times of the replacement process in the replacement processing step is set in a range in which the number of overlapped non-dot arrangements or the number of overlapped dots in the dot pattern of the target on which the replacement process is performed and the dot pattern at each dot pattern determined gradation is equal to or greater than $M \times (y - \gamma \times (y - x \times y))$ at at least some gradations.

According to a nineteenth aspect, in the halftone mask manufacturing method according to any one of the first aspect to the eighteenth aspect, in the dot pattern determining step, a dot pattern of which evaluation of image quality becomes best may be determined as the dot pattern at the dot pattern determining target gradation.

According to the nineteenth aspect, it is possible to manufacture the halftone mask using the dot pattern of which the evaluation of the image quality becomes best.

According to a twentieth aspect, in the halftone mask manufacturing method according to any one of the first aspect to the nineteenth aspect, in the dot number changing step, a dot pattern of which evaluation of image quality becomes best may be determined as the temporary dot pattern at the dot pattern determining target gradation.

According to the twentieth aspect, it is possible to perform the replacement process using the temporary dot pattern of which the evaluation of the image quality becomes best.

According to a twenty-first aspect, in the halftone mask manufacturing method according to any one of the first aspect to the twentieth aspect, in the replacement processing step, a dot pattern of which evaluation of image quality becomes best may be determined as the temporary dot pattern at the dot pattern determined gradation.

A halftone mask manufacturing system according to a twenty-second aspect is a halftone mask manufacturing system of manufacturing a halftone mask to be applied to a halftone process of creating a halftone image by converting multivalued image data. The system comprises a dot pattern determining unit that determines a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changes the dot pattern determining target gradation, and determines dot patterns for a plurality of gradations. The dot pattern determining unit includes a dot number changing unit that determines a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and a replacement processing unit that determines the dot pattern at the dot pattern determining target gradation by performing a replacement process of replacing dots including some of the dots at the dot pattern determined gradation with non-dot arrangements on the temporary dot pattern, or a replacement processing unit that determines a temporary dot pattern at the dot pattern determined gradation by performing a replacement process of replacing some of dots with non-dot arrangements on the dot pattern at the dot pattern determined gradation, and a dot number changing unit that determines the dot pattern at the dot pattern determining target gradation by removing or adding the dots as much as the number of dots corresponding the gradation difference between the dot pattern determined gradation and the dot pattern determining target gradation from or to the temporary dot pattern.

According to the twenty-second aspect, it is possible to acquire the same effect as that of the first aspect.

In the twenty-second aspect, it is possible to appropriately combine the same matters as the matters specified in the second aspect to the twenty-first aspect. In this case, the step of performing the process or function specified in the halftone mask manufacturing method can be ascertained as the component of the halftone mask manufacturing system that performs the corresponding process or function.

A halftone mask manufacturing program according to a twenty-third aspect is a halftone mask manufacturing program for manufacturing a halftone mask to be applied to a halftone process of creating a halftone image by converting multivalued image data. The program causes a computer to function as dot pattern determining means for determining a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changing the dot pattern determining target gradation, and determining dot patterns for a plurality of gradations. The dot pattern determining means causes the computer to function as dot number changing means for determining a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and replacement processing means for determining the dot pattern at the dot pattern determining target gradation by performing a replacement process of replacing dots including some of the dots at the dot pattern determined gradation with non-dot arrangements on the temporary dot pattern, or replacement processing means for determining a temporary dot pattern at the dot pattern determined gradation by performing a replacement process of replacing some of dots with non-dot arrangements on the dot pattern at the dot pattern determined gradation, and dot number changing means for determining the dot pattern at the dot pattern determining target gradation by removing or adding the dots as much as the number of dots corresponding the gradation difference between the dot pattern determined gradation and the dot pattern determining target gradation from or to the temporary dot pattern.

According to the twenty-third aspect, it is possible to acquire the same effect as that of the first aspect.

In the twenty-third aspect, it is possible to appropriately combine the same matters as the matters specified in the second aspect to the twenty-first aspect. In this case, the step of performing the process or function specified in the halftone mask manufacturing method can be ascertained as the component of the means of the halftone mask manufacturing program that performs the corresponding process or function. The present invention is a non-transitory computer-readable recording medium that stores a halftone mask manufacturing program, and may be a recording medium causing a computer to function as means in the aspect in a case where the halftone mask manufacturing program is read by the computer or a processor of the computer.

According to the present invention, since some of the dots in the dot pattern at the dot pattern determined gradation are included in the targets of the replacement process, the stacking limitations of halftone masks are partially eliminated, and thus, it is possible to improve image quality. The stacking limitations of the halftone masks are partially maintained, and thus, the constant continuity of the dot patterns between the gradations is secured.

BRIEF DESCRIPTION OF THE DRAWINGS

FIG. 3A is a schematic diagram of a white and black arrangement before the white-to-black changing process. FIG. 3B is a schematic diagram of the white-to-black changing process. FIG. 3C is a schematic diagram of a white and black arrangement after the white-to-black changing process.

FIG. 4A is a schematic diagram of the white and black arrangement after the white-to-black changing process. FIG. 4B is a schematic diagram of the white and black dither mask.

FIGS. 5A to 5C are explanatory diagrams of a replacement process in the ascending-order replaced threshold value setting step shown in FIG. 2. FIG. 5A is a schematic diagram of a white and black arrangement before the replacement process. FIG. 5B is a schematic diagram of the replacement process. FIG. 5C is a schematic diagram of a white and black arrangement after the replacement process.

FIG. 6A is a schematic diagram of the white and black arrangement after the replacement process. FIG. 6B is a schematic diagram of the white and black dither mask after the replaced threshold value setting process. FIG. 6C is a schematic diagram of a black and white dither mask after the replaced threshold value setting process.

FIGS. 7A to 7C are explanatory diagrams of another example of the replacement process. FIG. 7A is a schematic diagram of the white and black arrangement before the replacement process. FIG. 7B is an explanatory diagram of a black specification process.

FIG. 7C is a schematic diagram of a white and black arrangement after the black specification process.

FIGS. 8A to 8C are explanatory diagrams of another example of the replacement process. FIG. 8A is the white and black arrangement after the black specification process.

FIG. 8B is an explanatory diagram of the replacement process. FIG. 8C is a schematic diagram of the white and black arrangement after the replacement process.

FIG. 10A is a schematic diagram of the white and black arrangement before the black-to-white changing process. FIG. 10B is a schematic diagram of the black-to-white changing process. FIG. 10C is a schematic diagram of the white and black arrangement after the black-to-white changing process.

FIG. 11A is a schematic diagram of the white and black arrangement after the black-to-white changing process. FIG. 11B is a schematic diagram of the white and black dither mask.

FIGS. 12A to 12C are explanatory diagrams of the replacement process in the descending-order replaced threshold value setting step shown in FIG. 9. FIG. 12A is a schematic diagram of the white and black arrangement before the replacement process. FIG. 12B is a schematic diagram of the replacement process. FIG. 12C is a schematic diagram of the white and black arrangement after the replacement process.

FIGS. 13A to 13C are explanatory diagrams of the replaced threshold value setting process in the descending-order replaced threshold value setting step shown in FIG. 9. FIG. 13A is a schematic diagram of the white and black arrangement after the replacement process.

FIG. 13B is a schematic diagram of the white and black dither mask after the replaced threshold value setting process. FIG. 13C is a schematic diagram of the black and white dither mask after the replaced threshold value setting process.

FIG. 15A is a schematic diagram of the white and black arrangement on which the replacement is performed through the replacement process. FIG. 15B is a schematic diagram of the black and white dither mask corresponding to FIG. 15A.

FIG. 17 is a flowchart showing a flow of a procedure of a halftone process.

FIG. 24 is a schematic diagram of a white and black arrangement corresponding to a threshold value 48.

DESCRIPTION OF THE PREFERRED EMBODIMENTS

Figure 1:
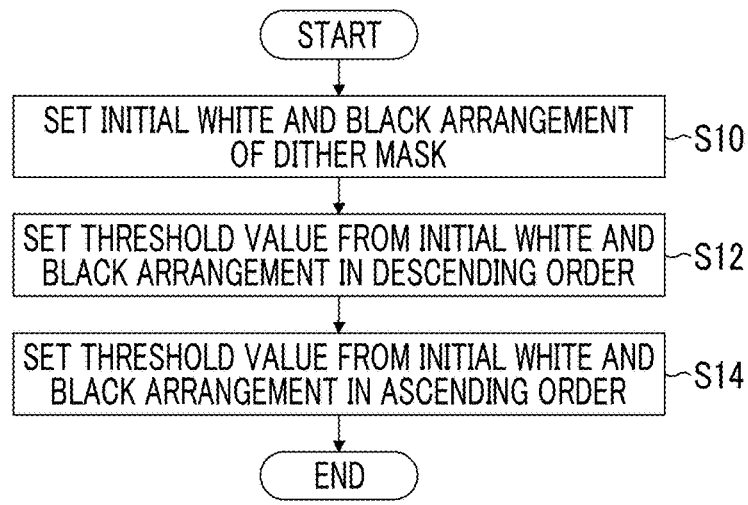
FIG. 1 is a flowchart showing a flow of a procedure of a dither mask manufacturing method according to a first embodiment.

Hereinafter, preferred embodiments of the present invention will be described with reference to the accompanying drawings.

First Embodiment

<Outline>

In the present embodiment, an example in which a dither mask manufacturing method is used as a halftone mask manufacturing method will be described. In the dither mask manufacturing method according to the present embodiment, a dither mask that achieves favorable image quality such as graininess compared to the dither mask of the related art is manufactured by partially eliminating stacking limitations and independently optimizing white and black arrangement at each density of the dither mask.

Meanwhile, in a case where the white and black arrangement at each density is independently optimized, the graininess or continuity of image data at an ununiform gradation is deteriorated. In the dither mask manufacturing method according to the present embodiment, a dither mask that secures the continuity of the white and black arrangements at the density by partially maintaining the stacking limitations and adjusting the maintained stacking limitations is manufactured.

That is, in the dither mask manufacturing method described in the present embodiment, the degree of freedom of the white and black arrangement is increased and the image quality is improved by partially canceling the stacking limitations. Further, constant continuity of the white and black arrangement between densities is secured by partially maintaining the stacking limitations. Thus, it is possible to adjust a balance between the improvement of the image quality and the securing of the continuity of the white and black arrangement between the densities.

In addition, in the dither mask manufacturing method described in the present embodiment, a dither mask capable of setting a plurality of threshold values including the threshold value at which the black pixel is changed to the white pixel in addition to changing the pixel to the black pixel in a case where an image value is greater than the threshold value at each pixel of the dither mask is manufactured.

That is, a dither mask capable of setting the threshold value in a case where the black pixel is changed to the white pixel along with the replacement of the black pixel and the white pixel in addition to the threshold value in a case where the white pixel is changed to the black pixel is manufactured. A dither mask capable of setting a plurality of threshold values including the threshold value in a case where the white pixel is changed to the black pixel and the threshold value in a case where the black pixel is changed to the white pixel is manufactured.

Here, as a recent printer, there is a printer capable of printing not only one kind of dot but also multiple kinds of dots. In addition to the white or black dots used for the printer capable of printing multiple kinds of dots, an image value is quantized to a multivalued value corresponding to each dot by using the dither method.

Meanwhile, there is only a difference between printing performed using one kind of dot and printing performed using multiple kinds of dots in that a process of allocating the image values to binary values of the white pixel and black pixel in comparison with the threshold value is performed in one stage or in multiple stages. In the present embodiment, a dither mask to be applied to a binarization process of allocating the image values to the binary values of the white pixel and the black pixel will be described.

<Procedure of Halftone Mask Manufacturing Method>

FIG. 1 is a flowchart showing a flow of a procedure of a dither mask manufacturing method according to a first embodiment. In the halftone mask manufacturing method according to the first embodiment, a white and black arrangement is determined by using a threshold value corresponding to an initial white and black arrangement as a reference threshold value and increasing or decreasing threshold values from the reference threshold value one by one, and the threshold values are set for the dither mask.

In initial white and black arrangement setting step S10 shown in FIG. 1, the initial white and black arrangement is set. white and black arrangement of the dither mask at a certain threshold value may be applied as the initial white and black arrangement. In descending-order threshold value setting step S12, the white and black arrangement at each threshold value acquired by decreasing the threshold value from the threshold value corresponding to the initial white and black arrangement set in initial white and black arrangement setting step S10 one by one is determined. Threshold values are set for pixels of the dither mask corresponding to black pixels replaced with white pixels and white pixels replaced with black pixels.

White and black arrangement corresponding to a threshold value in a previous process is applied as the white and black arrangement as a reference in a case where the threshold value is decreased by one. That is, the white and black arrangement for which a certain threshold value is set becomes reference white and black arrangement at a threshold value in a next process acquired by decreasing the threshold value by one.

In ascending-order threshold value setting step S14, the initial white and black arrangement set in the initial white and black arrangement setting step S10 is used as the reference, the threshold value is increased one by one, the white and black arrangements at the threshold values are determined, and the threshold values are set for the black pixels replaced with the white pixels and the white pixels replaced with the black pixels.

The white and black arrangement corresponding to the threshold value of the previous process is applied as the white and black arrangement as the reference in a case where the threshold value is increased one by one. That is, the white and black arrangement for which the certain threshold value is set is used as the reference white and black arrangement at the threshold value in the next process in which the threshold value is increased by one. The details of the determination of the white and black arrangement and the setting of the threshold value will be described below.

In a case where the white and black arrangements are determined for all the threshold values and the threshold value corresponding to the white and black arrangement is set, the dither mask manufacturing method shown in FIG. 1 is ended. Hereinafter, the details of the steps will be described.

In the following description, an example in which a white and black arrangement at a threshold value 8 is used as the initial white and black arrangement, the threshold values 9 to 16 are set for a dither mask which is constituted by 16 pixels of 4 pixels×4 pixels and for which threshold values of 1 to 16 are set in ascending order, and the threshold values 8 to 1 are set for the dither mask in descending order will be described.

<Procedure of Ascending-Order Threshold Value Setting Step>

Hereinafter, the ascending-order threshold value setting step shown in FIG. 1 will be described in detail. In the present embodiment, a black and white dither mask that stores threshold values for changing each of pixels from a black pixel to a white pixel may also be prepared in addition to a typical dither mask, that is, a white and black dither mask that stores threshold values for changing each of pixels from the white pixel to the black pixel in ascending order along with the replacement of the white pixel with the black pixel for eliminating stacking limitations.

Although the white and black arrangement is separately prepared for simplicity of description, the white and black arrangement is determined from the white and black dither mask and the black and white dither mask, it is not necessary to prepare the white and black arrangement.

Figure 2:
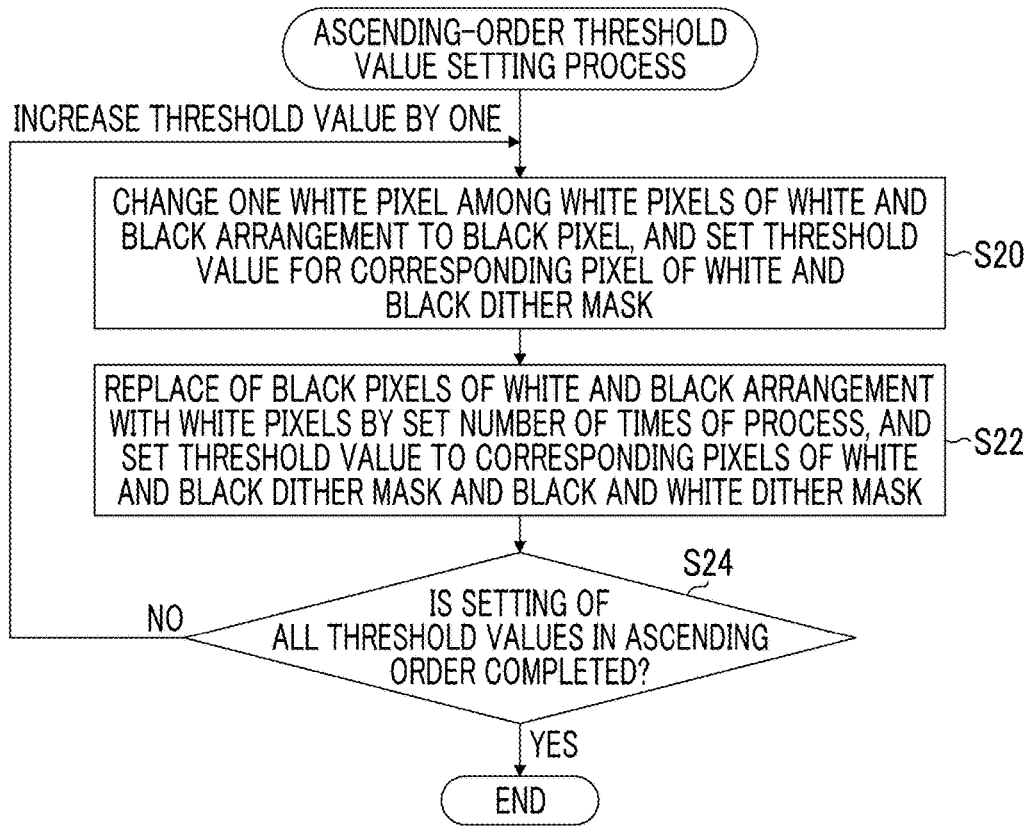
FIG. 2 is a flowchart showing a flow of a procedure of an ascending-order threshold value setting step shown in FIG. 1.

FIG. 2 is a flowchart showing a flow of a procedure of the ascending-order threshold value setting step shown in FIG. 1. For the sake of convenience in description, the ascending-order threshold value setting step will be initially described. In the ascending-order threshold value setting step, threshold values from 9 to 16 are set in ascending order.

As shown in FIG. 2, an ascending-order threshold value setting process in the ascending-order threshold value setting step includes ascending-order white-to-black changed threshold value setting step S20, ascending-order replaced threshold value setting step S22, and ascending-order threshold value setting completion determination step S24.

The steps from ascending-order white-to-black changed threshold value setting step S20 to ascending-order threshold value setting completion determination step S24 are repeatedly performed until the threshold values are set for all threshold value setting target pixels of the dither mask. Meanwhile, in a case where the threshold value is set for all the threshold value setting target pixels of the dither mask, the ascending-order threshold value setting step is ended. Hereinafter, ascending-order white-to-black changed threshold value setting step S20 and ascending-order replaced threshold value setting step S22 will be described in detail.

<Ascending-Order White-to-Black Changed Threshold Value Setting Step: White-to-Black Changing Process>

Figure 3C:
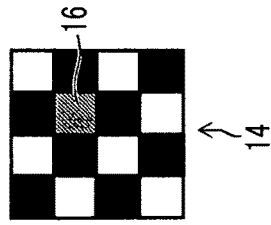
FIGS. 3A to 3C are explanatory diagrams of a white-to-black changing process in an ascending-order white-to-black changed threshold value setting step shown in FIG. 2.
Figure 3B:
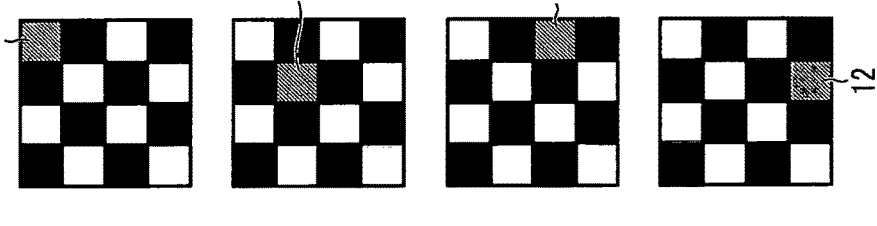
Figure 3A:
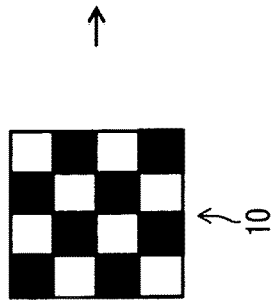

FIGS. 3A to 3C are explanatory diagrams of a white-to-black changing process in the ascending-order white-to-black changed threshold value setting step shown in FIG. 2. FIG. 3A is a schematic diagram of a white and black arrangement before the white-to-black changing process. FIG. 3B is a schematic diagram of the white-to-black changing process. FIG. 3C is a schematic diagram of the white and black arrangement after the white-to-black changing process.

The white and black arrangement 10 before the white-to-black changing process shown in FIG. 3A is the initial white and black arrangement of the dither mask set in initial white and black arrangement setting step S10 of FIG. 1 in the first white-to-black changing process. In the second and subsequent processes, the white and black arrangement performed through the previous process becomes the white and black arrangement 10 before the white-to-black changing process.

In the present embodiment, a white and black arrangement at a threshold value 8 becomes the white and black arrangement 10 before the white-to-black changing process in the first process. For example, in the second and subsequent processes, a white and black arrangement acquired through a process at a threshold value 9 becomes the white and black arrangement 10 before the white-to-black changing process in a process at a threshold value 10.

Initially, in the white-to-black changing process, for all the white pixels of the white and black arrangement 10 before the white-to-black changing process shown in FIG. 3A, the white pixels are temporarily changed to the black pixels one by one, and graininess is evaluated.

The known index may be applied as an index of the graininess evaluation. For example, a standard deviation calculated by applying a blur filter that takes account of RMS granularity, that is, visual perception characteristics of human such as VTF to the white and black arrangement may be used as the index. RMS is short for Root Mean Square. VTF is short for Visual Transfer Function.

As shown in FIG. 3B, pixels to be changed to the black pixels are temporarily switched, and the graininess is similarly evaluated. The graininess in a case where the white pixels are temporarily changed to the black pixels one by one is evaluated for all the white pixels, and the pixel of which the graininess becomes best is actually changed to the black pixel.

In FIG. 3B, pixels 12 hatched by diagonal lines are the white pixels to be temporarily changed to the black pixels. The graininess is evaluated for eight white and black arrangements shown in FIG. 3B, and the white pixel of which the graininess becomes best is determined.

In a white and black arrangement 14 after the white-to-black changing process shown in FIG. 3C, a pixel 16 hatched by diagonal lines is the white pixel of which the graininess becomes best, and is a pixel actually changed to the black pixel from the white pixel.

The white and black arrangement corresponds to a dot pattern indicating whether or not there is a dot. The white-to-black changing process in the ascending-order white-to-black changed threshold value setting step is an aspect of a dot number changing step of adding dots as much as dots corresponding to a gradation difference between a dot pattern determined gradation and a dot pattern determining target gradation, and is a component of a dot pattern determining step.

The white-to-black changing process in the ascending-order white-to-black changed threshold value setting step is an aspect of the dot number changing step of adding dots as much as dots corresponding to the gradation difference between the dot pattern determined gradation and the dot pattern determining target gradation in a case where a dot pattern determining target gradation is greater than the dot pattern determined gradation.

A threshold value of the target of the white-to-black changing process in the ascending-order white-to-black changed threshold value setting step is a gradation having a gradation difference of one or more gradations from the dot pattern determined gradation, and corresponds to a dot pattern determining target gradation which a target gradation for determining the dot pattern.

The white and black arrangement after the white-to-black changing process which is the white and black arrangement determined through the white-to-black changing process is an aspect of a temporary dot pattern with the dot pattern determining target gradation.

A threshold value in the previous process in the ascending-order white-to-black changed threshold value setting step corresponds to the dot pattern determined gradation. The white and black arrangement acquired through the previous process corresponds to a dot pattern with the dot pattern determined gradation.

A process of changing threshold values of processing targets in the ascending-order white-to-black changed threshold value setting step one by one corresponds to a process of consecutively changing the dot pattern determining target gradation.

<Ascending-Order White-to-Black Changed Threshold Value Setting Step: White-to-Black Changed Threshold Value Setting Process>

Figure 4A:
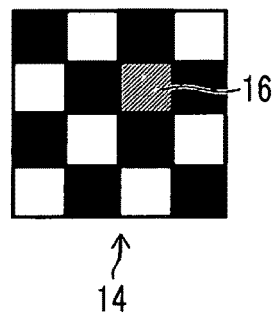
FIGS. 4A and 4B are explanatory diagrams of the white-to-black changed threshold value setting process in the ascending-order white-to-black changed threshold value setting step shown in FIG. 2.
Figure 4B:
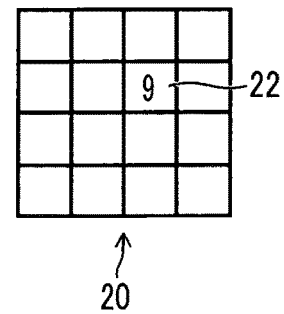

FIGS. 4A and 4B are explanatory diagrams of the white-to-black changed threshold value setting process in the ascending-order white-to-black changed threshold value setting step shown in FIG. 2. FIG. 4A is a schematic diagram of the white and black arrangement after the white-to-black changing process. FIG. 4B is a schematic diagram of the white and black dither mask.

A white and black arrangement 14 after the white-to-black changing process shown in FIG. 4A is the same white and black arrangement as the white and black arrangement 14 after the white-to-black changing process shown in FIG. 3C. A pixel 16 hatched by diagonal lines in the white and black arrangement 14 after the white-to-black changing process shown in FIG. 4A is a black pixel actually changed in the white-to-black changing process.

In a white and black dither mask 20 shown in FIG. 4B, a threshold value 9 is set for a pixel 22 of the white and black dither mask 20 shown in FIG. 4B which corresponds to the black pixel 16 actually changed to the black pixel from the white pixel in the white and black arrangement 14 after the white-to-black changing process shown in FIG. 4A.

The white-to-black changed threshold value setting process in the ascending-order white-to-black changed threshold value setting step is a component of a threshold value setting step.

<Ascending-Order Replaced Threshold Value Setting Step: Replacement Process>

FIGS. 5A to 5C are explanatory diagrams of a replacement process in the ascending-order replaced threshold value setting step shown in FIG. 2. FIG. 5A is a schematic diagram of a white and black arrangement before the replacement process. FIG. 5B is a schematic diagram of the replacement process. FIG. 5C is a schematic diagram of a white and black arrangement after the replacement process.

A white and black arrangement 14 before the replacement process shown in FIG. 5A is the same white and black arrangement as the white and black arrangement 14 after the white-to-black changing process shown in FIG. 4A.

As shown in FIG. 5B, in the replacement process, one pixel among all the black pixels in the white and black arrangement 14 before the replacement process shown in FIG. 5A is set as a target pixel. A pixel 24 hatched by dots in FIG. 5B is a target pixel.

Subsequently, the target pixel 24 which is the target black pixel is temporarily replaced with all the white pixels one by one, and the graininess is evaluated. Pixels 26 hatched by diagonal lines in FIG. 5B are the white pixels temporarily replaced with the black pixels.

The target pixel 24 shown in FIG. 5B is actually replaced with the white pixel of which the graininess becomes best. The process of replacing the target pixel 24 shown in FIG. 5B with the white pixel of which the graininess becomes best is performed while changing the target pixel 24 by a preset number of times of the process. Here, it is preferable that an order in which the target pixel 24 is changed such that the black pixel to be replaced with the white pixel is not biased is an order in which a pixel position of the target pixel 24 is randomly changed or an order in which the pixel position is changed without being biased. An order in which all the black pixels are replaced is preferable. The details of the number of times of the process will be described below.

A white and black arrangement 28 after the replacement process shown in FIG. 5C is a white and black arrangement acquired by actually replacing the target pixel 24 shown in FIG. 5B with the white pixel of which the graininess becomes best, and is a white and black arrangement acquired by performing the replacement process while changing the target pixel 24 by a preset number of times of the process.

In the white and black arrangement 28 after the replacement process shown in FIG. 5C, a pixel 32 and a pixel 34 hatched by dots are pixels changed to the white pixels from the black pixels as the result of the replacement process. In the white and black arrangement 28 after the replacement process shown in FIG. 5C, a pixel 36 and a pixel 38 hatched by diagonal lines are pixels changed to the black pixels from the white pixels as the result of the replacement process.

The black pixels as the targets of the replacement process include at least one of the black pixels of the white and black arrangement corresponding to the threshold value in the previous process. That is, at least a part of the black pixels in the white and black arrangement 10 before the white-to-black changing process shown in FIG. 3A is the target of the replacement process.

The replacement process in the ascending-order replaced threshold value setting step is an aspect of a replacement process of replacing dots including some of dots at the dot pattern determined gradation with non-dot arrangements, and is a component of the dot pattern determining step of performing the replacement process by the preset number of times of the process.

A step of setting the number of times of the replacement process in the ascending-order replaced threshold value setting step is a component of a replacement process number setting step.

<Ascending-Order Replaced Threshold Value Setting Step: Replaced Threshold Value Setting Process>

Figure 6A:
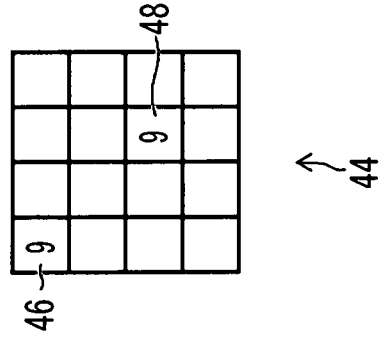
FIGS. 6A to 6C are explanatory diagrams of the replaced threshold value setting process in the ascending-order replaced threshold value setting step shown in FIG. 2.
Figure 6B:
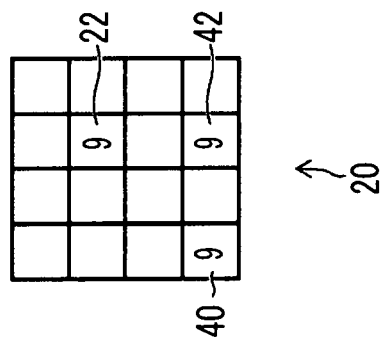
Figure 6C:
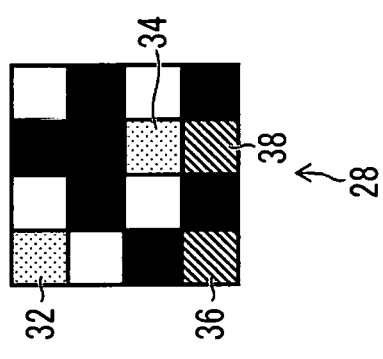

FIGS. 6A to 6C are explanatory diagrams of a replaced threshold value setting process in the ascending-order replaced threshold value setting step shown in FIG. 2. FIG. 6A is a schematic diagram of the white and black arrangement after the replacement process. FIG. 6B is a schematic diagram of the white and black dither mask after the replaced threshold value setting process. FIG. 6C is a schematic diagram of the black and white dither mask after the replaced threshold value setting process.

As shown in FIG. 6A, a pixel 32 and a pixel 34 hatched by dots in the white and black arrangement 28 after the replacement process are changed to the white pixels from the black pixels through the replacement process. A pixel 36 and a pixel 38 hatched by diagonal lines in the white and black arrangement 28 after the replacement process are changed to the black pixels from the white pixels.

In the white and black dither mask 20 shown in FIG. 6B, a threshold value 9 is set for a pixel 40 corresponding to the pixel 36 and a pixel 42 corresponding to the pixel 38 in the white and black arrangement 28 after the replacement process shown in FIG. 6A. The pixel 22 is a pixel for which a threshold value 9 is already set through the white-to-black changed threshold value setting process.

As shown in FIG. 6C, in a black and white dither mask 44, a threshold value 9 is set for a pixel 46 corresponding to the pixel 32 and a pixel 48 corresponding to the pixel 34 in the white and black arrangement 28 after the replacement process shown in FIG. 6A.

In a case where a threshold value 9 is set for the white and black dither mask 20 and the black and white dither mask 44, the threshold value is increased by one, and the process proceeds to the setting of a threshold value 10. By doing this, the threshold value is set in ascending order until a threshold value 16 is set.

The replaced threshold value setting process in the ascending-order replaced threshold value setting step is a component of the threshold value setting step. The threshold value set for the white and black dither mask corresponds to a first threshold value. The threshold value set for the black and white dither mask corresponds to a second threshold value.

<Image Quality Evaluation in Replacement Process>

In the replacement process shown in FIG. 5B, in a case where the graininess in a case where the target pixel 24 shown in FIG. 5B is not replaced is also evaluated and the graininess in a case where the target pixel 24 is not replaced becomes best, an aspect in which the black pixel and the white pixel are not replaced with each other is preferable. In such an aspect, the threshold values are also not set for the white and black dither mask 20 shown in FIG. 6B and the black and white dither mask 44 shown in FIG. 6C.

<Number of Times of Replacement Process>

The replacement process is performed while changing the target pixel 24 shown in FIG. 5B by a preset number of times of the process. The replacement process mentioned herein includes a case where the black pixel and the white pixel are not replaced with each other since the graininess in a case where the target pixel 24 described above is not replaced becomes best.

As for the number of times of the replacement process, the target pixel may be changed by using all the black pixels as the targets, the replacement of all the black pixels with all the white pixels may be performed as one cycle, and the number of cycles may be set as the number of times of the replacement process. The processing result before one cycle is used in the second and subsequent cycles of process, and thus, it is possible to improve the graininess whenever the number of times of the replacement process is repeated. Here, even in a case where the replacement process is performed on all the black pixels, it is preferable that an order in which the target pixel is changed such that the black pixels to be replaced with the white pixels are not biased is set such that the pixel position of the target pixel is randomly changed or is changed without being biased.

Although it has been described in such an aspect that all the black pixels in the white and black arrangement 14 before the replacement process shown in FIG. 5A are the targets of the replacement process in one cycle of process, some black pixels are replaced with the white pixels as the result of one cycle of processes.

<Description of Other Examples of Replacement Process>

FIGS. 7A to 8C are explanatory diagrams of other examples of the replacement process. FIG. 7A is a schematic diagram of the white and black arrangement before the replacement process. FIG. 7B is an explanatory diagram of a black specification process. FIG. 7C is a schematic diagram of a white and black arrangement after the black specification process.

FIG. 8A is a schematic diagram of the white and black arrangement after the black specification process, and is the same diagram as FIG. 7C. FIG. 8B is an explanatory diagram of the replacement process. FIG. 8C is a schematic diagram of the white and black arrangement after the replacement process.

Initially, in a white and black arrangement 14 before the replacement process which is the white and black arrangement of the targets of the replacement process shown in FIG. 7A, one pixel among all the black pixels of the white and black arrangement 14 before the replacement process is temporarily changed to the white pixel, and the graininess is evaluated for the changed pixel as shown in FIG. 7B. Pixels 24A hatched by dots in FIG. 7B are the black pixels to be temporarily changed to the white pixels. The white and black arrangement 14 before the replacement process shown in FIG. 7A is the same white and black arrangement as the white and black arrangement 14 after the white-to-black changing process shown in FIG. 3C and the white and black arrangement before the replacement process shown in FIG. 5A.

As shown in FIG. 7B, one pixel 24A among all the black pixels of the white and black arrangement 14 before the replacement process is selected, is temporarily changed to the white pixel one by one, and the graininess is evaluated. The black pixel of which the graininess in a case where the white pixel is changed becomes best is specified.

A pixel 30A of a white and black arrangement 28A after the black specification process shown in FIG. 7C is a pixel specified as the black pixel of which the graininess in a case where the black pixel is changed to the white pixel becomes best.

Subsequently, the specified black pixel 30A is temporarily replaced with all the white pixels of the white and black arrangement 28A after the black specification process shown in FIG. 8A, and the graininess is evaluated. Pixels 26A hatched by diagonal lines in FIG. 8B are the temporarily replaced white pixels.

The specified black pixel 30A is actually replaced with the white pixel of which the graininess becomes best, and becomes the white pixel. The pixel 26A of the white and black arrangement 31A after the replacement process shown in FIG. 8C is actually replaced with the pixel 30A, and becomes the black pixel from the white pixel. The replacement of the black pixel is repeatedly performed by a preset number of times of the replacement process. Since the graininess of the white and black arrangement before the replacement process becomes best, the replacement of the black pixel and the white pixel includes a case where the replacement of the black pixel and the white pixel is not performed.

The setting of the threshold value for the white and black dither mask and the black and white dither mask is the same as the example described above, and thus, the description thereof is omitted.

<Example of Generation of Dither Mask Using Void and Cluster Method>

In a case where the known void and cluster method is used in the generation of the dither mask, the ascending-order threshold value setting process shown in FIG. 2 is as follows.

Initially, an energy mask in which a blur filter such as a Gaussian filter is applied with a pixel, which corresponds to each black pixel of the white and black arrangement 10 before the white-to-black changing process shown in FIG. 3A, as a center is prepared. In ascending-order white-to-black changed threshold value setting step S20 shown in FIG. 2, a void pixel which is a pixel of which energy is minimum, among all the white pixels in the white and black arrangement 10 before the white-to-black changing process shown in FIG. 3A, is changed with the black pixel, and the threshold value to set for the white and black dither mask 20 shown in FIG. 4B.

The energy mask is updated by applying the blur filter with the pixel in the white and black arrangement 14 after the white-to-black changing process shown in FIG. 4A, which corresponds to the pixel for which the threshold value is set in the white and black dither mask 20 shown in FIG. 4B, as the center.

In ascending-order replaced threshold value setting step S22 shown in FIG. 2, one pixel among all the black pixels in the white and black arrangement 14 before the replacement process shown in FIG. 5A is initially set as the target pixel 24 as shown in FIG. 5B.

Subsequently, the target pixel 24 is changed to the white pixel as shown in FIG. 5B. The blur filter is removed with the changed target pixel 24 as the center, and the energy mask is updated. Subsequently, the void pixel which is the pixel of which the energy is minimum, among all the white pixels including the target pixel 24 changed to the white pixel from the black pixel, is changed to the black pixel. The energy mask is updated by applying the blur filter with the pixel changed to the black pixel, and the threshold value is set for the white and black dither mask shown in FIG. 6B and the black and white dither mask shown in FIG. 6C.

Similarly to the example described above, the replacement process is performed while changing the target pixel by a preset number of times of the process. The replacement process mentioned herein includes a case where the replacement of the black pixel and the white pixel is not performed since the energy of the target pixel 24 described above is minimum. Similarly to the example described above, it is preferable that an order in which the target pixel 24 is changed is an order in which a pixel position of the target pixel 24 is randomly changed or an order in which the pixel position is changed without being biased. An order in which all the black pixels are replaced is preferable.

The target pixel may be changed by using all the black pixels as the targets, the replacement of all the black pixels with all the white pixels may be performed as one cycle, and the number of cycles may be set as the number of times of the replacement process.

In a case where the known void and cluster method is used in the generation of the dither mask, the ascending-order replaced threshold value setting step S22 shown in FIG. 2 may be as follows.

A cluster pixel which is a pixel of which energy is maximum, among all the black pixels in the white and black arrangement 14 before the replacement process shown in FIG. 7A, is specified, and is changed to the white pixel. The pixel 30A of the white and black arrangement 28A after the black specification process shown in FIG. 7C is the pixel specified as the black pixel of which the energy is maximum. The blur filter is removed with the pixel 30A changed to the white pixel as the center, and the energy mask is updated.

Subsequently, the energy mask is updated by changing the void pixel which is the pixel of which the energy is minimum, among all the white pixels, to the black pixel and applying the blur filter with the pixel changed to the black pixel as the center, and the threshold value is set for the white and black dither mask and the black and white dither mask.

Similarly to the example described above, in the replacement process, the replacement of the black pixel is repeatedly performed by a preset number of times of the process. The replacement process mentioned herein includes a case where the replacement of the black pixel and the white pixel is not performed since the energy of the specified pixel 30A is minimum as described above.

<Description of Special Process of Threshold Value Setting>

In ascending-order white-to-black changed threshold value setting step S20 and the ascending-order replaced threshold value setting step S22 shown in FIG. 2, after the white pixel is changed to the black pixel once, the changed black pixel may be returned to the white pixel again while maintaining the same threshold value. Similarly, after the black pixel is changed to the white pixel once, the changed white pixel may be returned to the black pixel again while maintaining the same threshold value.

In this case, it is assumed that the threshold value is not set for the white and black dither mask and the black and white dither mask. Specifically, in a case where the threshold value is set for any pixel of the white and black dither mask, it is checked whether or not the same threshold value is already set for the corresponding pixel of the black and white dither mask. In a case where the same threshold value is set for the corresponding pixels of the black and white dither mask, the threshold values of the pixels of the white and black dither mask and the black and white dither mask are removed.

Similarly, in a case where the threshold value is set for any pixel of the black and white dither mask, it is checked whether or not the same threshold value is already set for the corresponding pixel of the white and black dither mask. In a case where the same threshold value is already set for the corresponding pixel of the white and black dither mask, the threshold values of the pixels of the black and white dither mask and the white and black dither mask are removed.

The ascending-order threshold value setting step has been described above according to the procedure of FIG. 2. Here, the order of ascending-order white-to-black changed threshold value setting step S20 and ascending-order replaced threshold value setting step S22 in the procedure of FIG. 2 may be reversed.

That is, the white and black arrangement after the replacement process may be initially determined and the threshold value may be set for the white and black dither mask and the black and white dither mask by performing the replacement process on the white and black arrangement at the dot pattern determined gradation by the preset number of times of the process in ascending-order replaced threshold value setting step S22. Subsequently, the white and black arrangement at the dot pattern determining target gradation may be determined and the threshold value may be set for or may be removed from the white and black dither mask and the black and white dither mask by adding the dots as much as the dots corresponding to the gradation difference between the dot pattern determined gradation and the dot pattern determining target gradation to the white and black arrangement after the replacement process in ascending-order white-to-black changed threshold value setting step S20.

These steps may be repeatedly performed until the threshold value is set for all the threshold value setting target pixels of the dither mask. Here, the details of ascending-order white-to-black changed threshold value setting step S20 and ascending-order replaced threshold value setting step S22 are described above, and thus, the description thereof is omitted. Image quality becomes good by performing ascending-order replaced threshold value setting step S22 in the dot pattern determining target gradation.

The aspect in which ascending-order replaced threshold value setting step S22 is performed and ascending-order white-to-black changed threshold value setting step S20 is subsequently performed is an aspect of a dot pattern determining step of performing a replacement processing step and subsequently performing a dot number changing step.

<Procedure of Descending-Order Threshold Value Setting Step>

Figure 9:
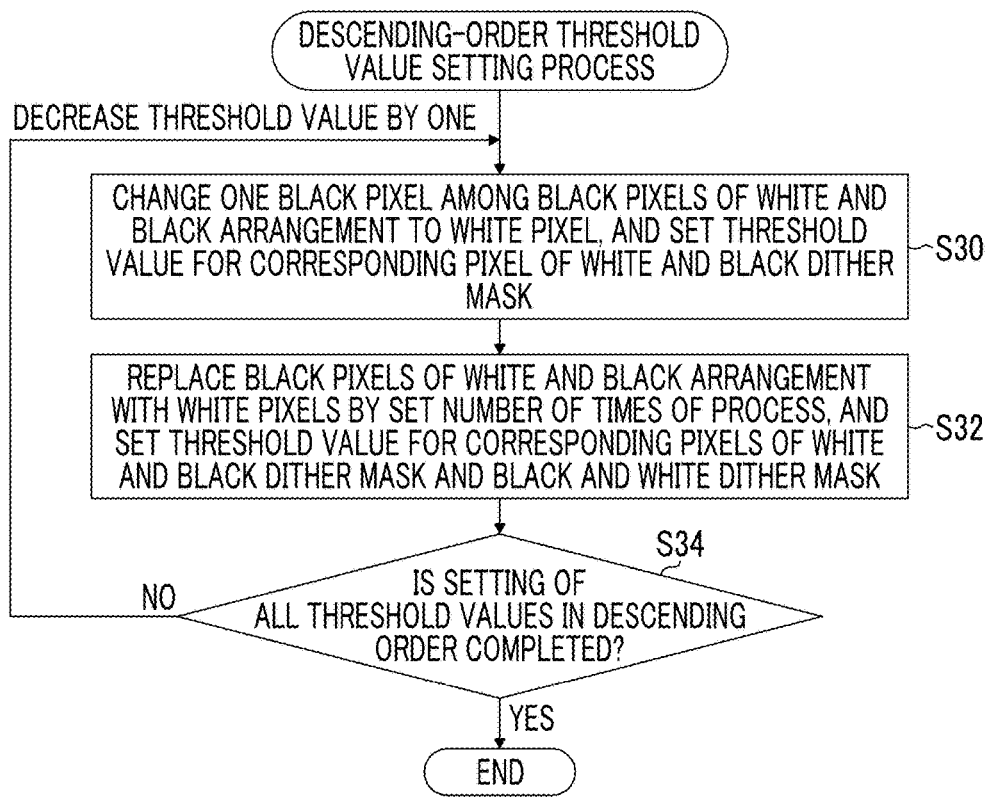
FIG. 9 is a flowchart showing a flow of a procedure of a descending-order threshold value setting step shown in FIG. 1.

Hereinafter, a procedure of the descending-order threshold value setting step shown in FIG. 1 will be described. FIG. 9 is a flowchart showing a flow of the procedure of the descending-order threshold value setting step shown in FIG. 1. In the descending-order threshold value setting step to be described below, the process of increasing the threshold value of the ascending-order threshold value setting step described above one by one is a process of decreasing the threshold value one by one. In the descending-order threshold value setting step, the process of temporarily changing one white pixel to the black pixel in the ascending-order threshold value setting step and evaluating the graininess is a process of temporarily changing one black pixel to the white pixel and evaluating the graininess. In the descending-order threshold value setting step, the threshold values from 8 to 1 are set.

As shown in FIG. 9, a descending-order threshold value setting process in the descending-order threshold value setting step includes descending-order black-to-white changed threshold value setting step S30, descending-order replaced threshold value setting step S32, and descending-order threshold value setting completion determination step S34.

The steps from descending-order black-to-white changed threshold value setting step S30 to descending-order threshold value setting completion determination step S34 are repeatedly performed until the threshold values are set for all the threshold value setting target pixels of the dither mask. Meanwhile, in a case where the threshold value is set for all the threshold value setting target pixels of the dither mask, the descending-order threshold value setting step is ended.

<Descending-Order Black-to-White Changed Threshold Value Setting Step: Black-to-White Changing Process>

Figure 10A:
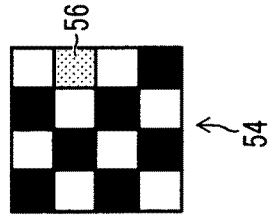
FIGS. 10A to 10C are explanatory diagrams of the black-to-white changing process in the descending-order black-to-white changed threshold value setting step shown in FIG. 9.
Figure 10B:
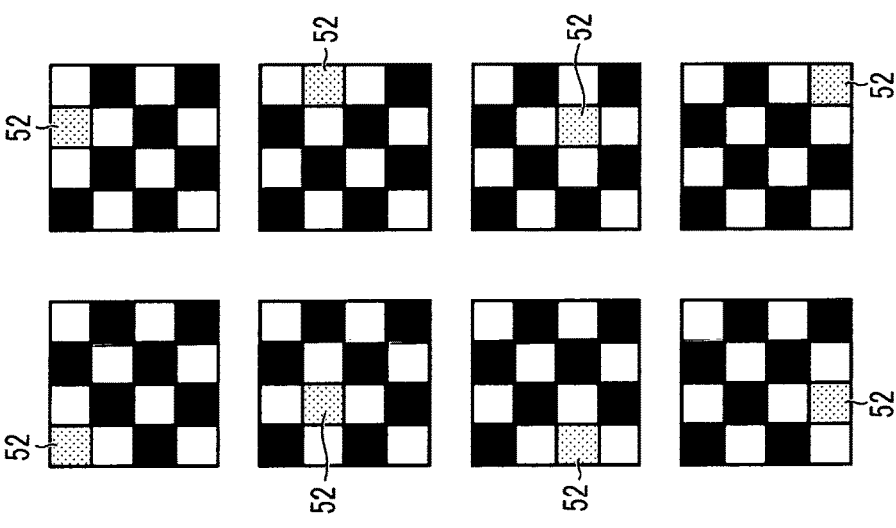
Figure 10C:
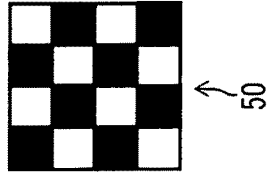

FIGS. 10A to 10C are explanatory diagrams of a black-to-white changing process in the descending-order black-to-white changed threshold value setting step shown in FIG. 9. FIG. 10A is a schematic diagram of a white and black arrangement before the black-to-white changing process. FIG. 10B is a schematic diagram of the black-to-white changing process. FIG. 10C is a schematic diagram of a white and black arrangement after the black-to-white changing process.

A white and black arrangement 50 after the black-to-white changing process shown in FIG. 10A is the initial white and black arrangement of the dither mask set in the initial white and black arrangement setting step S10 of FIG. 1 in a first black-to-white changing process.

In the black-to-white changing process, graininess in a case where all black pixels of the white and black arrangement 50 before the black-to-white changing process shown in FIG. 10A are temporarily changed to the white pixels one by one is evaluated. The pixel of which the graininess becomes best is actually changed to the white pixel.

Pixels 52 hatched by dots in FIG. 10B are the black pixels to be temporarily changed to the white pixels one by one. The graininess is evaluated for eight white and black arrangements shown in FIG. 10B, and the white and black arrangement of which the graininess becomes best is determined. A pixel 56 hatched by dots in a white and black arrangement 54 after the black-to-white changing process shown in FIG. 10C is a black pixel of which the graininess becomes best, and is a pixel actually changed to the white pixel from the black pixel.

Similarly to the ascending-order threshold value setting step described above, the known index may be applied as the index of the graininess, and thus, the description thereof is omitted.

The black-to-white changing process in the descending-order black-to-white changed threshold value setting step is an aspect of a dot number changing determination process of removing dots as much as dots corresponding to a gradation difference between a dot pattern determined gradation and a dot pattern determining target gradation, and is a component of the dot pattern determining step.

The black-to-white changing process in the descending-order black-to-white changed threshold value setting step is an aspect of a dot number changing step of removing dots as much as dots corresponding to a gradation difference between a dot pattern determined gradation and a dot pattern determining target gradation in a case where the dot pattern determining target gradation is less than the dot pattern determined gradation.

The white and black arrangement after the black-to-white changing process which is the white and black arrangement determined through the black-to-white changing process is an aspect of a temporary dot pattern in the dot pattern determining target gradation.

A threshold value of the target of the black-to-white changing process in the descending-order black-to-white changed threshold value setting step is a gradation having a gradation difference of one or more gradations from the dot pattern determined gradation, and corresponds to a dot pattern determining target gradation which is a gradation of the target for determining the dot pattern.

A process of changing threshold values of processing targets in the descending-order black-to-white changed threshold value setting step one by one corresponds to a process of consecutively changing the dot pattern determining target gradation.

<Descending-Order Black-to-White Changed Threshold Value Setting Step: Black-to-White Changed Threshold Value Setting Process>

Figure 11A:
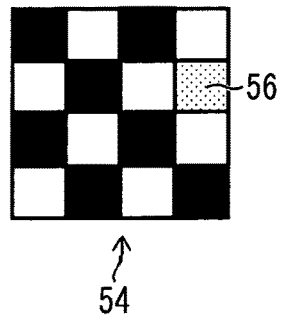
FIGS. 11A and 11B are explanatory diagrams of the black-to-white changed threshold value setting process in the descending-order black-to-white changed threshold value setting step shown in FIG. 9.
Figure 11B:
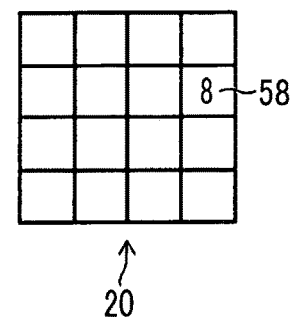

FIGS. 11A and 11B are explanatory diagrams of a black-to-white changed threshold value setting process in the descending-order black-to-white changed threshold value setting step shown in FIG. 9. FIG. 11A is a schematic diagram of the white and black arrangement after the black-to-white changing process. FIG. 11B is a schematic diagram of the white and black dither mask.

A white and black arrangement 54 after the black-to-white changing process shown in FIG. 11A is the same as the white and black arrangement 54 after the black-to-white changing process shown in FIG. 10C. In the white and black arrangement 54 after the black-to-white changing process shown in FIG. 11A, a pixel 56 hatched by dots is the white pixel actually changed in the black-to-white changing process.

A threshold value 8 is set for a pixel 58 in a white and black dither mask 20 shown in FIG. 11B, which corresponds to the pixel 56 changed to the white pixel from the black pixel in the white and black arrangement 54 after the black-to-white changing process. Here, the threshold values in the ascending order are the threshold values for changing the white pixels to the black pixels, whereas the threshold values in the descending order are the threshold values for returning the changed white pixels to the black pixels.

The black-to-white changed threshold value setting process in the descending-order black-to-white changed threshold value setting step is a component in the threshold value setting step.

<Descending-Order Replaced Threshold Value Setting Step: Replacement Process>

FIGS. 12A to 12C are explanatory diagrams of the replacement process in the descending-order replaced threshold value setting step shown in FIG. 9. FIG. 12A is a schematic diagram of the white and black arrangement before the replacement process. FIG. 12B is a schematic diagram of the replacement process. FIG. 12C is a schematic diagram of the white and black arrangement after the replacement process.

The white and black arrangement 54 before the replacement process shown in FIG. 12A is the same as the white and black arrangement 54 after the black-to-white changing process on which the black-to-white changing process shown in FIG. 11A has been performed.

As shown in FIG. 12B, in the replacement process, one pixel among all the black pixels in the white and black arrangement 54 before the replacement process shown in FIG. 12A is set as the target pixel. A pixel 60 hatched by dots in FIG. 12B is the target pixel.

Subsequently, the target pixel 60 which is the target black pixel is temporarily replaced with all the white pixels one by one, and graininess is evaluated. Pixels 62 hatched by diagonal lines in FIG. 12B are the white pixels temporarily replaced with the black pixels.

The target pixel 60 shown in FIG. 12B is actually replaced with the white pixel of which the graininess becomes best. The process of replacing the target pixel 60 shown in FIG.

12B with the white pixel of which the graininess becomes best is performed while changing the target pixel 60 by a preset number of times of the process. Here, similarly to the ascending-order threshold value setting step S14 described above, it is preferable that the target pixel 60 is changed in an order without being biased such as a random order such that the black pixel to be replaced with the white pixel is not biased and in an order in which all the black pixels are performed as one cycle.

The number of times of the process is the same as the ascending-order threshold value setting step S14 described above, and the description thereof is omitted.

A white and black arrangement 64 after the replacement process shown in FIG. 12C is a white and black arrangement acquired by actually replacing the target pixel 60 shown in FIG. 12B with the white pixel of which the graininess becomes best, and is a white and black arrangement on which the replacement process has been performed while changing the target pixel 60 by a preset number of times of the process.

In the white and black arrangement 64 after the replacement process shown in FIG. 12C, a pixel 66 and a pixel 68 hatched by dots are pixels changed to the white pixels from the black pixels as the result of the replacement process. In the white and black arrangement 64 after the replacement process shown in FIG. 12C, a pixel 70 and a pixel 72 hatched by diagonal lines are pixels changed to the black pixels from the white pixels as the result of the replacement process.

The black pixel as the target of the replacement process includes all the black pixels. That is, all the black pixels in the white and black arrangement 54 before the replacement process shown in FIG. 12A are the targets of the replacement process. As the result of the replacement process, some of the black pixels in the white and black arrangement 54 before the replacement process are changed to the white pixels.

The replacement process in the descending-order replaced threshold value setting step is an aspect of a replacement process of replacing dots including some of dots at the dot pattern determined gradation with the non-dot arrangements, and is a component of the dot pattern determining step of performing the replacement process by the preset number of times of the process.

A step of setting the number of times of the replacement process in the descending-order replaced threshold value setting step is a component of a replacement process number setting step.

<Descending-Order Replaced Threshold Value Setting Step: Replaced Threshold Value Setting Process>

FIGS. 13A to 13C are explanatory diagrams of a replaced threshold value setting process in the descending-order replaced threshold value setting step shown in FIG. 9. FIG. 13A is a schematic diagram of the white and black arrangement after the replacement process.

FIG. 13B is a schematic diagram of the white and black dither mask after the replaced threshold value setting process. FIG. 13C is a schematic diagram of the black and white dither mask after the replaced threshold value setting process.

As shown in FIG. 13A, a pixel 66 and a pixel 68 hatched by dots in the white and black arrangement 64 after the replacement process are changed to the white pixels from the black pixels through the replacement process. A pixel 70 and a pixel 72 hatched by diagonal lines in the white and black arrangement 64 after the replacement process are changed to the black pixels from the white pixels.

In a replaced white and black dither mask 20 shown in FIG. 13B, a threshold value 8 is set for a pixel 74 corresponding to the pixel 66 and a pixel 76 corresponding to the pixel 68 hatched by dots in the white and black arrangement 64 after the replacement process shown in FIG. 13A. The pixel 58 is a pixel for which a threshold value 8 is already set through the black-to-white changed threshold value setting process.

In a black and white dither mask 44 shown in FIG. 13C, a threshold value 8 is set for a pixel 78 corresponding to the pixel 70 and a pixel 80 corresponding to the pixel 72 in the white and black arrangement 64 after the replacement process shown in FIG. 13A. In a case where a threshold value 8 is set for the white and black dither mask 20 and the black and white dither mask 44, the threshold value is decreased by one, and the process proceeds to the setting of a threshold value 7. By doing this, the threshold values are set in the descending order until a threshold value 1 is set.

The replaced threshold value setting process in the descending-order replaced threshold value setting step is a component of the threshold value setting step.

<Number of Times of Replacement Process>

Similarly to the ascending-order threshold value setting step described above, it is possible to set the number of times of the replacement process in the descending-order threshold value setting step. That is, the replacement of the black pixels to the white pixel may be performed while changing the target pixel 60 shown in FIG. 12B by the preset number of times of the process. Alternatively, the target pixel may be changed by using all the black pixels as the targets, the replacement of all the black pixels with all the white pixels may be performed as one cycle, and the number of cycles may be set as the number of times of the replacement process. The number of times of the replacement process may be set for each threshold value.

The processing result before one cycle is used in the second and subsequent cycles of process, and thus, it is possible to improve the graininess whenever the number of times of the replacement process is repeated.

Similarly to the ascending-order threshold value setting step described above, it has been described in such an aspect that all the black pixels in the white and black arrangement 54 before the replacement process shown in FIG. 12A are the targets of the replacement process, some black pixels are actually replaced with the white pixels.

<Example of Generation of Dither Mask Using Void and Cluster Method>

In a case where the known void and cluster method is used in the generation of the dither mask, the descending-order threshold value setting process shown in FIG. 9 is as follows.

An energy mask in which a blur filter is applied with each black pixel of the white and black arrangement 50 before the black-to-white changing process shown in FIG. 10A, as a center is prepared. In the descending-order black-to-white changed threshold value setting step S30 shown in FIG. 9, the cluster pixel which is the pixel of which the energy is maximum, among all the black pixels of the white and black arrangement 50 before the black-to-white changing process shown in FIG. 10A, is changed to the white pixel, and the threshold value is set for the white and black dither mask 20 shown in FIG. 11B.

The blur filter is removed with the pixel in the white and black arrangement 54 after the black-to-white changing process shown in FIG. 11A, which corresponds to the pixel for which the threshold value is set in the white and black dither mask 20 shown in FIG. 11B, as the center, and the energy mask is updated.

In the descending-order replaced threshold value setting step S32 shown in FIG. 9, one pixel among all the black pixels in the white and black arrangement 54 before the replacement process shown in FIG. 12A is set as the target pixel 60 shown in FIG. 12B.

Subsequently, the target pixel 60 is changed to the white pixel, as shown in FIG. 12B. The blur filter is removed with the target pixel 60 changed to the white pixel as the center, and the energy mask is updated. Subsequently, the void pixel which is the pixel of which the energy is minimum, among all the white pixels including the white pixel changed to the white pixel from the black pixel, is changed to the black pixel. The energy mask is updated by applying the blur filter with the white pixel changed to the black pixel as the center, and the threshold value is set for the white and black dither mask 20 shown in FIG. 13B and the black and white dither mask 44 shown in FIG. 13C.

Similarly to the example described above, the replacement process is performed while changing the target pixel 60 by the preset number of times of the process. The replacement process mentioned herein includes a case where the replacement of the black pixel and the white pixel is not performed since the energy of the target pixel 60 described above is minimum. Similarly to the example described above, it is preferable that the pixel position of the target pixel 60 is randomly changed or is changed without being biased. It is preferable that the pixel of the position thereof is changed in an order in which all the black pixels are changed.

The target pixel may be changed by using all the black pixels as the targets, the replacement of all the black pixels with all the white pixels may be performed as one cycle, and the number of cycles may be set as the number of times of the replacement process.

In a case where the known void and cluster method is used in the generation of the dither mask, the descending-order replaced threshold value setting step S32 shown in FIG. 9 may be as follows.

One cluster pixel which is the pixel of which the energy is maximum, among all the black pixels in the white and black arrangement 54 before the replacement process shown in FIG. 12A, is specified, and is changed to the white pixel. The blur filter is removed with the pixel changed to the white pixel as the center, and the energy mask is updated.

The void pixel which is the pixel of which the energy is minimum, among all the white pixels, is changed to the black pixel, the energy mask is updated by applying the blur filter with the pixel changed to the black pixel as the center, and the threshold value is set for the white and black dither mask 20 and the black and white dither mask 44.

Similarly to the example described above, in the replacement process, the replacement of the black pixel is repeatedly performed by a preset number of times of the process. The replacement process mentioned herein includes a case where the replacement of the black pixel and the white pixel is not performed since the energy of the specified pixel is minimum as described above.

<Description of Special Process of Threshold Value Setting>

In the descending-order black-to-white changed threshold value setting step S30 and the descending-order replaced threshold value setting step S32 shown in FIG. 9, after the black pixel is changed to the white pixel once, the changed white pixel may be returned to the black pixel again while maintaining the same threshold value. Similarly, after the white pixel is changed to the black pixel once, the changed black pixel may be returned to the white pixel again while maintaining the same threshold value.

In this case, it is assumed that the threshold value is not set for the white and black dither mask and the black and white dither mask. Specifically, in a case where the threshold value is set for any pixel of the white and black dither mask, it is checked whether or not the same threshold value is already set for the corresponding pixel of the black and white dither mask. In a case where the same threshold value is already set for the corresponding pixel of the black and white dither mask, the threshold values of the pixels for which the same threshold value is set in the white and black dither mask and the black and white dither mask are removed.

Similarly, in a case where the threshold value is set for any pixel of the black and white dither mask, it is checked whether or not the same threshold value is already set for the corresponding pixel of the white and black dither mask. In a case where the same threshold value is already set for the corresponding pixel of the white and black dither mask, the threshold values of the pixels for which the same threshold value is set in the black and white dither mask and the white and black dither mask are removed.

The descending-order threshold value setting step has been described according to the procedure of FIG. 9. Here, similarly to the ascending-order threshold value setting step, the orders of the black-to-white changed threshold value setting step and the replaced threshold value setting step may be reversed.

That is, the orders of the descending-order black-to-white changed threshold value setting step S30 and the descending-order replaced threshold value setting step S32 in the procedure of FIG. 9 may be reversed.

That is, the white and black arrangement after the replacement process may be initially determined and the threshold value may be set for the white and black dither mask and the black and white dither mask by performing the replacement process on the white and black arrangement at the dot pattern determined gradation by the preset number of times of the process in descending-order replaced threshold value setting step S32. Subsequently, the white and black arrangement at the dot pattern determining target gradation may be determined and the threshold value may be set for or may be removed from the white and black dither mask and the black and white dither mask by removing the dots as much as the dots corresponding to the gradation difference between the dot pattern determined gradation and the dot pattern determining target gradation from the white and black arrangement after the replacement process in descending-order black-to-white changed threshold value setting step S30.

These steps may be repeatedly performed until the threshold value is set for all the threshold value setting target pixels of the dither mask. Here, the details of the descending-order black-to-white changed threshold value setting step S30 and the descending-order replaced threshold value setting step S32 have been described above, and thus, the description thereof is omitted. Image quality becomes good by performing descending-order replaced threshold value setting step S32 in the dot pattern determining target gradation.

The aspect in which the descending-order replaced threshold value setting step S32 is performed and the descending-order black-to-white changed threshold value setting step S30 is subsequently performed is an aspect of the dot pattern determining step of performing the replacement processing step and subsequently performing the dot number changing step.

<Another Example of Dither Mask>

Figures 14A, 14B:
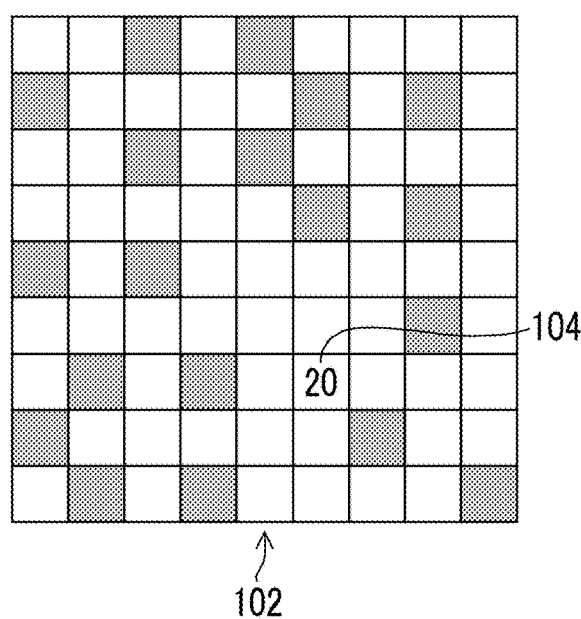
FIG. 14A is a schematic diagram of the white and black arrangement for which the threshold value is set in the ascending-order threshold value setting process.
FIG. 14B is a schematic diagram of the white and black dither mask corresponding to FIG. 14A.

FIG. 14A is a schematic diagram of the white and black arrangement for which the threshold value is set in the ascending-order white-to-black changed threshold value setting step S20 of the ascending-order threshold value setting step. FIG. 14B is a schematic diagram of the white and black dither mask corresponding to FIG. 14A.

A white and black arrangement 100 shown in FIG. 14A has a size of 81 pixels in 9 pixels×9 pixels. A two-digit number assigned to each pixel of the white and black arrangement 100 represents a position of the pixel. The tens place represents a row number, and the ones place represents a column number.

Pixels colored in black in the white and black arrangement 100 shown in FIG. 14A represent the black pixels. Pixels colored in white in the white and black arrangement 100 are the white pixels. The black pixel of which the pixel position in the white and black arrangement 100 is 76 is the pixel for which the threshold value is set.

In a white and black dither mask 102 shown in FIG. 14B, a threshold value 20 is set for a pixel 104 corresponding to the black pixel of which the black pixel position of the white and black arrangement 100 of FIG. 14A is 76. The pixels colored in black in the white and black dither mask 102 shown in FIG. 14B are pixels for which threshold values from 1 to 19 are set.

FIG. 15A is a schematic diagram of the white and black arrangement acquired by changing one black pixel to the white pixel through the replacement process in the ascending-order replaced threshold value setting step S22. FIG. 15B is a schematic diagram of the black and white dither mask for which the threshold value is set so as to correspond to FIG. 15A.

In a white and black arrangement 106 shown in FIG. 15A, the black pixel of which the pixel position hatched by dots is 35 is changed to the white pixel through the replacement process. In a black and white dither mask 108 shown in FIG. 15B, a threshold value 20 is set for a pixel 110 corresponding to the white pixel of which the pixel position of the white and black arrangement 106 shown in FIG. 15A is 35.

In the black and white dither mask 108 shown in FIG. 15B, a plurality of threshold values other than a threshold value 20 may be set for the pixel for which a threshold value 20 is set. The threshold values in the same pixels of the white and black dither mask 102 and the black and white dither mask 108 are alternately set, and thus, a minimum value and a maximum value of these threshold values belong to the white and black dither mask 102.

For example, in a case where P threshold values in any pixel of the white and black dither mask 102 are a first white-to-black threshold value, a second white-to-black threshold value, . . . , and a P-th white-to-black threshold value and (P−1) threshold values in the pixel of the black and white dither mask 108 are a first black-to-white threshold value, a second black-to-white threshold value, . . . , and a (P−1)-th black-to-white threshold value, the relationship of first white-to-black threshold value <first black-to-white threshold value <second white-to-black threshold value <second black-to-white threshold value < . . . <(P−1)-th black-to-white threshold value <P-th white-to-black threshold value is satisfied. Here, in a case where the black pixels remain even at the minimum gradation or the white pixels remain even at the maximum gradation, the minimum value or the maximum value of the plurality of threshold values in the same pixels of the white and black dither mask 102 and the black and white dither mask 108 do not necessarily belong to the white and black dither mask 102.

Figures 16A, 16B:
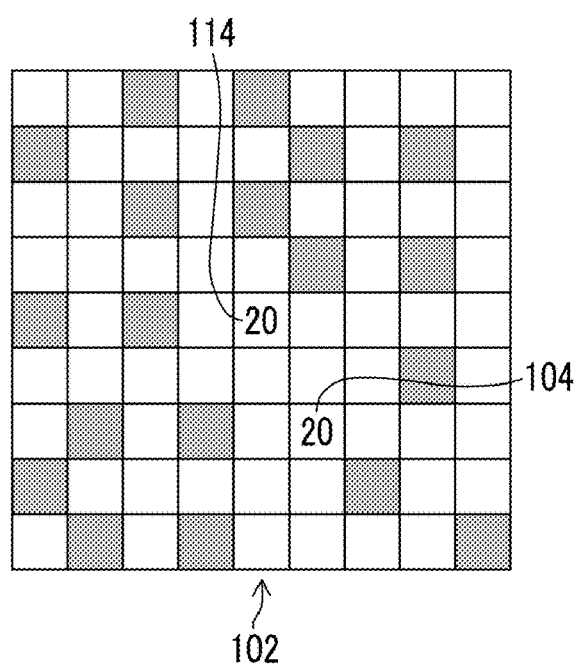
FIG. 16A is a schematic diagram of the white and black arrangement on which the replacement is performed through the replacement process.
FIG. 16B is a schematic diagram of the white and black dither mask corresponding to FIG. 16A.

FIG. 16A is a schematic diagram of the white and black arrangement acquired by replacing one black pixel and the white pixel through the replacement process in the ascending-order replaced threshold value setting step S22, that is, a schematic diagram of the white and black arrangement setting step acquired by changing one black pixel to the white pixel and changing another white pixel to the black pixel. FIG. 16B is a schematic diagram of the white and black dither mask for which the threshold value is set so as to correspond to FIG. 16A.

In the white and black arrangement 112 shown in FIG. 16A, the white pixel in a pixel position 55 hatched by dots is changed to the black pixel through the replacement process. In a white and black dither mask 102 shown in FIG. 16B, a threshold value 20 is set for a pixel 114 corresponding to the black pixel of which the pixel number of the white and black arrangement 112 shown in FIG. 16A is 55. Pixels colored in black in the white and black dither mask 102 shown in FIG. 16B are pixels for which threshold values from 1 to 19 are set.

In the present embodiment, the dither mask constituted by 16 pixels of 4 pixels×4 pixels and the dither mask having the size of 81 pixels of 9 pixels×9 pixels have been used as the examples. The dither mask manufacturing method described in the present embodiment is not limited to the manufacturing of the dither masks having these sizes, but may be applied to the manufacturing of a dither mask having a certain number of pixels.

<Description of Halftone Process>

Hereinafter, a halftone process using the dither mask manufactured by the dither mask manufacturing method according to the present embodiment will be described. As described above, the white and black dither mask that stores the threshold value at which the white pixel is changed to the black pixel and the black and white dither mask that stores the threshold value at which the black pixel is changed to the white pixels are provided as the dither mask.

As described above, the threshold values in the pixels of the white and black dither mask and the threshold values in the pixels of the black and white dither mask are alternately set. That is, in a case where the threshold values in the pixels of the white and black dither mask are the first white-to-black threshold value, the second white-to-black threshold value, . . . , and the P-th white-to-black threshold value in ascending order and the pixels of the black and white dither mask are the first black-to-white threshold value, the second black-to-white threshold value, . . . , and the (P−1)-th black-to-white threshold value in ascending order, the relationship of first white-to-black threshold value <first black-to-white threshold value <second white-to-black threshold value <second black-to-white threshold value < . . . <(P−1)-th black-to-white threshold value <P-th white-to-black threshold value is satisfied.

Here, P represents the number of threshold values in each pixel of the white and black dither mask, and has a different value for each pixel. As described above, the first white-to-black threshold value is not necessarily minimum in a case where the black pixels remain even at the minimum gradation, and the P-th white-to-black threshold value is not necessarily maximum in a case where the white pixels remain even at the maximum gradation. Thus, the number of threshold values of the same pixel of the black and white dither mask is not necessarily (P−1) with respect to the number P of threshold values of the white and black dither mask.

It is preferable that the number of threshold values of each pixel of the white and black dither mask and the number of threshold values of each pixel of the black and white dither mask are retained apart from the white and black dither mask and the black and white dither mask.

FIG. 17 is a flowchart showing a flow of a procedure of the halftone process. FIG. 17 shows the procedure of the halftone process in a case where the number of threshold values of the white and black dither mask is P and the number of threshold values of the black and white dither mask is P−1. The pixel is typically the white pixel at the minimum gradation. The minimum threshold value is the first white-to-black threshold value. The pixel is the black pixel at the maximum gradation. The maximum threshold value is the P-th white-to-black threshold value.

In a case where the halftone process is started, an image value for each pixel is acquired from image data in image value acquisition step S40.

Subsequently, in white and black first determination step S42, it is determined whether or not an image value is less than the first white-to-black threshold value stored in the white and black dither mask. In white and black first determination step S42, the pixel of which the image value is determined to be less than the first white-to-black threshold value is allocated to the white pixel in allocation step S44, and the processing of the pixel is completed. This procedure is a case where the determination result in white and black first determination step S42 is YES.

Meanwhile, in white and black first determination step S42, the processing of the pixel of which the image value is determined to be equal to or greater than the first white-to-black threshold value proceeds to a black and white first determination step S46. This procedure is a case where the determination result in white and black first determination step S42 is NO.

In black and white first determination step S46, it is determined whether or not the image value is less than the first black-to-white threshold value stored in the black and white dither mask.

In black and white first determination step S46, the pixel of which the image value is determined to be less than the first black-to-white threshold value is allocated to the black pixel in allocation step S48, and the processing of the pixel is completed. This procedure is a case where the determination result in black and white first determination step S46 is YES.

Meanwhile, in black and white first determination step S46, the processing of the pixel of which the image value is determined to be equal to or greater than the first black-to-white threshold value proceeds to white and black second determination step S50. This procedure is a case where the determination result in black and white first determination step S46 is NO.

In white and black second determination step S50, it is determined whether or not the image value is less than the second white-to-black threshold value stored in the white and black dither mask.

In white and black second determination step S50, the pixel of which the image value is determined to be less than the second white-to-black threshold value is allocated to the white pixel in allocation step S52, and the processing of the pixel is completed. This procedure is a case where the determination result in white and black second determination step S50 is YES.

Meanwhile, in white and black second determination step S50, the processing of the pixel of which the image value is determined to be equal to or greater than the second white-to-black threshold value proceeds to the black and white second determination step. This procedure is a case where the determination result in white and black second determination step S50 is NO. In FIG. 17, the illustration of the black and white second determination step is omitted. Subsequently, the comparison of the image value with the white-to-black threshold value or the comparison of the image value with the black-to-white threshold value are sequentially performed, and the processing target pixel is allocated to the black pixel or the white pixel.

In a case where the processing proceeds to black and white (P−1)-th determination step S54, it is determined whether or not the image value is less than the (P−1)-th black-to-white threshold value stored in the black and white dither mask in black and white (P−1)-th determination step S54.

The pixel of which the image value is determined to be less than the (P−1)-th black-to-white threshold value is allocated to the black pixel in allocation step S56, and the processing of the pixel is completed. This procedure is a case where the determination result in black and white (P−1)-th determination step S54 is YES.

Meanwhile, in black and white (P−1)-th determination step S54, the processing of the pixel of which the image value is determined to be equal to or greater than the (P−1)-th black-to-white threshold value proceeds to white and black P-th determination step S58. This procedure is a case where the determination result in black and white (P−1)-th determination step S54 is NO.

In white and black P-th determination step S58, it is determined whether or not the image value is less than the P-th white-to-black threshold value stored in the white and black dither mask.

The pixel of which the image value is determined to be less than the P-th white-to-black threshold value is allocated to the white pixel in allocation step S60, and the processing of the pixel is completed. This procedure is a case where the determination result in white and black P-th determination step S58 is YES.

Meanwhile, in white and black P-th determination step S58, the pixel of which the image value is determined to be equal to or greater than the P-th white-to-black threshold value is allocated to the black pixel in allocation step S62, and the processing of the pixel is completed. This procedure is a case where the determination result in white and black P-th determination step S58 is NO.

By doing this, the halftone process is completed by sequentially comparing the image value of the processing target pixel with the threshold values from the first white-to-black threshold value to the P-th white-to-black threshold value and allocating each pixel to the black pixel or the white pixel based on the comparison result.

In a case where there is a possibility that the pixel will become the white pixel even at the maximum gradation, the P-th black-to-white threshold value may be present as the maximum threshold value. The presence or absence of the P-th black-to-white threshold value may be determined based on the number of black-to-white threshold values with respect to the number P of white-to-black threshold values. That is, it may be determined that the P-th black-to-white threshold value is present in a case where the number of black-to-white threshold values is P, and it may be determined that P-th black-to-white threshold value is not present in a case where the number of black-to-white threshold values is P−1.

Alternatively, it may be determined whether or not the P-th black-to-white threshold value is present even though the maximum value of the white-to-black threshold values and the maximum value of the black-to-white threshold values are compared. That is, it may be determined that the P-th black-to-white threshold value is present in a case where the maximum value of the threshold values is the black-to-white threshold value, and it may be determined that the P-th black-to-white threshold value is not present in a case where the maximum value of the threshold values is the white-to-black threshold value.

In a case where the P-th black-to-white threshold value is present, the black and white P-th determination step of determining whether or not the image value is less than the P-th black-to-white threshold value may be added after white and black P-th determination step S58 of FIG. 17, the pixel is may be allocated to the black pixel in a case where the image value is less than the P-th black-to-white threshold value, and the pixel may be allocated to the white pixel in a case where the image value is equal to or greater than the P-th black-to-white threshold value.

In a case where there is a possibility that the pixel will become the black pixel even at the minimum gradation, there is also a possibility that the minimum threshold value will become the first black-to-white threshold value. In a case where there is a possibility that the pixel will become the black pixel even at the minimum gradation, the first white-to-black threshold value and the first black-to-white threshold value are compared, and the halftone process is performed according to the flowchart shown in FIG. 18 instead of the flowchart shown in FIG. 17 in a case where the first black-to-white threshold value is less than the first white-to-black threshold value.

Figure 18:
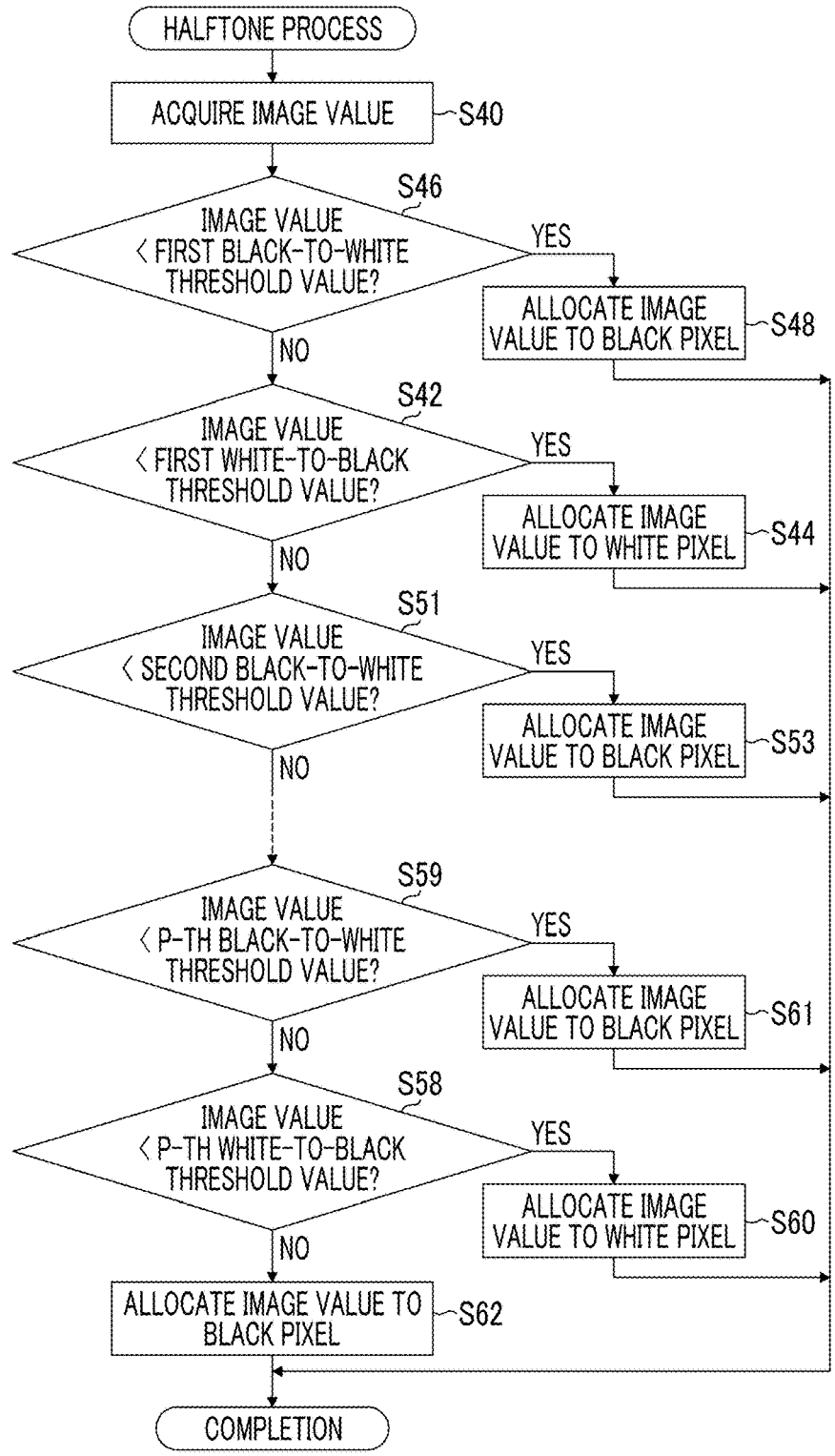
FIG. 18 is a flowchart showing a flow of a procedure of another aspect of the halftone process.

FIG. 18 is a flowchart showing a flow of a procedure of another aspect of the halftone process. In the flowchart shown in FIG. 18, it is assumed that the pixel becomes the black pixel at the maximum gradation, that is, the pixel becomes the P-th white-to-black threshold value at the maximum threshold value. The same steps in FIG. 18 as those in FIG. 17 are assigned the same references, and thus, the description thereof will be appropriately omitted.

In the flowchart shown in FIG. 18, the orders of white and black first determination step S42 and black and white first determination step S46 in the flowchart shown in FIG. 17 are changed. The orders of allocation step S44 and allocation step S48 are changed.

In the flowchart shown in FIG. 18, the orders of white and black second determination step S50 in the flowchart shown in FIG. 17 and black and white second determination step S51 shown in FIG. 18 are changed. The orders of allocation step S52 and allocation step S53 are changed. In FIG. 17, the illustration of black and white second determination step S51 and allocation step S53 is omitted.

In the flowchart shown in FIG. 18, the black and white P-th determination step S59 shown in FIG. 18 is added before white and black P-th determination step S58 in the flowchart shown in FIG. 17. Allocation step S61 is added along with the addition of black and white P-th determination step S59. The processing contents in the steps are the same as those in the flowchart shown in FIG. 17, and thus, the description thereof is omitted.

As shown in FIG. 18, the halftone process is completed by sequentially the image value of the processing target pixel with each threshold value from the first black-to-white threshold value to the P-th white-to-black threshold value and allocating each pixel to the black pixel or the white pixel based on the comparison result.

In a case where there is a possibility that the pixel will become the white pixel even at the maximum gradation, a (P+1)-th black-to-white threshold value may be present. The presence or absence of the (P+1)-th black-to-white threshold value may be determined similarly to the presence or absence of the P-th black-to-white threshold value in the description of the flowchart shown in FIG. 17.

The presence or absence of the (P+1)-th black-to-white threshold value may be determined based on the number of black-to-white threshold values with respect to the number P of white-to-black threshold values. That is, it may be determined that the (P+1)-th black-to-white threshold value is present in a case where the number of black-to-white threshold values is P+1, and it may be determined that the (P+1)-th black-to-white threshold value is not present in a case where the number of black-to-white threshold values is P.

The presence or absence of the (P+1)-th black-to-white threshold value may be determined even though the maximum values of the white-to-black threshold values and the black-to-white threshold values are compared. That is, it may be determined that the (P+1)-th black-to-white threshold value is present in a case where the maximum value of the threshold values is the black-to-white threshold value, and it may be determined that the (P+1)-th black-to-white threshold value is not present in a case where the maximum value of the threshold values is the white-to-black threshold value.

In a case where the (P+1)-th black-to-white threshold value is present, the black-to-white (P+1)-th determination step of determining whether or not the image value is less than the (P+1)-th black-to-white threshold value may be added after the white and black P-th determination step S58 of FIG. 18, the pixel may be allocated to the black pixel in a case where the image value is less than the (P+1)-th black-to-white threshold value, and the pixel may be allocated to the white pixel in a case where the image value is equal to or greater than the (P+1)-th black-to-white threshold value.

The halftone process corresponds to a halftone process for creating a halftone image by converting multivalued image data. The dither mask is an aspect of a halftone mask.

<Description of Halftone Mask>

Although the dither mask manufacturing method of manufacturing the dither mask in which the threshold value is set for each pixel as the halftone mask has been described in the present embodiment, a set of white and black arrangements corresponding to the threshold values of the dither mask may be manufactured as the halftone mask.

For example, in a case where a dither mask having a size of 256 pixels×256 pixels is used, memory capacity of 2 bytes per pixel is required in order to store threshold values from 1 to 65536. As the number of times of the replacement process of ascending-order replaced threshold value setting step S22 of FIG. 2 or the replacement process of descending-order replaced threshold value setting step S32 of FIG. 9 becomes larger, the number of threshold values to be set for each pixel of the white and black dither mask and the black and white dither mask becomes larger. Accordingly, the memory capacity for storing the white and black dither mask and the black and white dither mask may be increased.

Meanwhile, the white and black arrangement may have only the memory capacity of one byte per pixel. In a case where the gradation of the image value is a gradation which is smaller than 65536, for example, 256, the white and black arrangement corresponding to a gradation of 256 may be stored. In a case where the white and black arrangement is stored, since the white and black arrangement is directly allocated from the image value of each pixel, a processing period of the halftone process is also advantageous.

Although the aspect in which two kinds of dither masks of the white and black dither mask and the black and white dither mask are used has been described in the present embodiment, an aspect in which one dither mask includes two kinds of threshold values of the threshold value at which the white pixel is changed to the black pixel and the threshold value at which the black pixel is changed to the white pixel may be used as an example.

<Operations and Effects of First Embodiment>

According to the dither mask manufacturing method described above, the stacking limitations of the dither mask are partially eliminated, and the white and black arrangement at each density is independently optimized to some extent. Thus, the image quality is more favorable compared to a case where the dither mask of the related art is used. The stacking limitations of the dither mask are partially maintained, and thus, it is possible to secure constant continuity in the white and black arrangements between the densities.

Although it has been described in the present embodiment that the graininess is evaluated as the evaluation of the image quality, image quality other than the graininess, such as unevenness in density or unevenness in color may be evaluated.

The density mentioned herein may be referred to as the image value, the gradation, or the number of gradations.

Second Embodiment

Hereinafter, a dither mask manufacturing method according to a second embodiment will be described. The same configurations in the second embodiment to be described below as those in the first embodiment described above will be assigned the same references, and thus, the description thereof will be appropriately omitted.

<Outline>

In the first embodiment, the aspect in which the white and black arrangement is determined by increasing or decreasing the threshold value one by one and adding the black pixel or the white pixel one by one and the threshold value is set for the dither mask so as to correspond to the determined white and black arrangement has been described.

In the dither mask manufacturing method according to the second embodiment, the white and black arrangement is determined by increasing or decreasing the threshold value by two or more and adding the black pixels or the white pixels as much as the pixels corresponding to the value by which the threshold value is increased or decreased, and the threshold value is set for the dither mask based on the determined white and black arrangement.

In the dither mask manufacturing method according to the second embodiment, the step of determining the white and black arrangement by adding the black pixels or the white pixels as much as the pixels corresponding to the value by which the threshold value is increased or decreased is a component of a dot pattern determining step of determining a dot pattern in a dot pattern determining target gradation having a difference in the number of gradations of two or more gradations from the dot pattern determined gradation.

Figure 19:
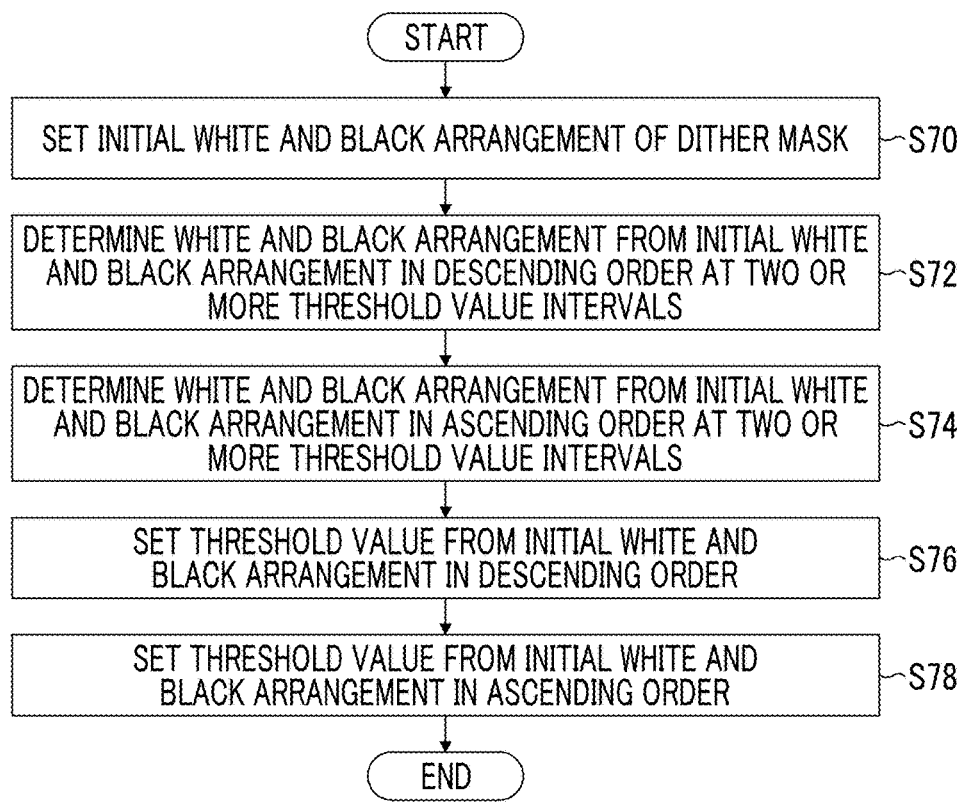
FIG. 19 is a flowchart showing a flow of a procedure of a dither mask manufacturing method according to a second embodiment.
Figure 20:
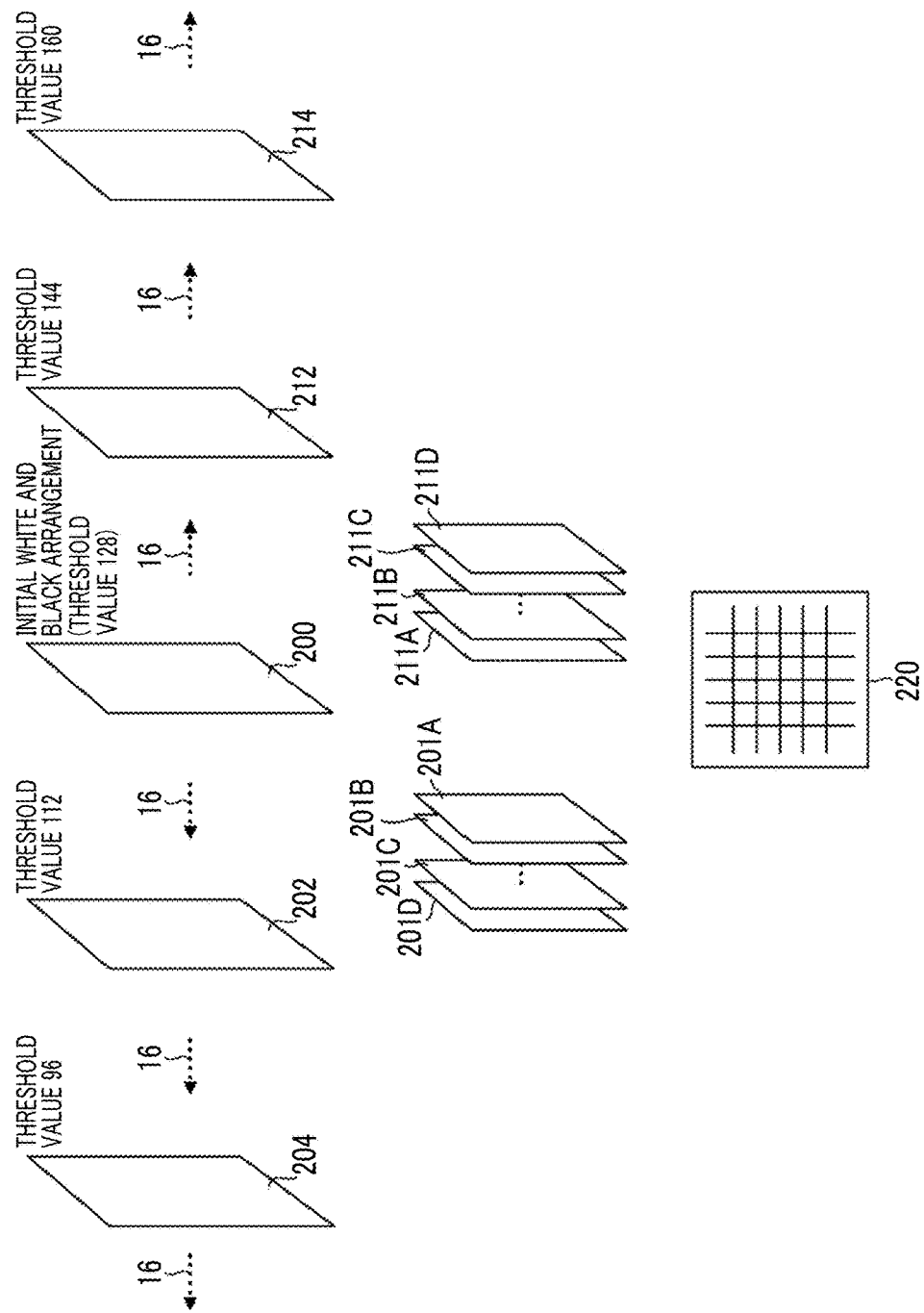
FIG. 20 is a schematic diagram of the dither mask manufacturing method according to the second embodiment.

FIG. 19 is a flowchart showing a flow of a procedure of the dither mask manufacturing method according to the second embodiment. FIG. 20 is a schematic diagram of the dither mask manufacturing method according to the second embodiment. Hereinafter, a case where the image value is expressed by 256 gradations from 0 to 255, the size of the dither mask is 256 pixels of 16 pixels×16 pixels, the threshold value interval is 16, and 0, 16, 32, 48, 64, 80, 96, 112, 128, 144, 160, 176, 192, 208, 224, 240, and 256 are section threshold values will be described.

As shown in FIG. 19, the dither mask manufacturing method according to the second embodiment includes initial white and black arrangement setting step S70, descending-order white and black arrangement determining step S72, ascending-order white and black arrangement determining step S74, descending-order threshold value setting step S76, and ascending-order threshold value setting step S78.

The descending-order threshold value setting step and the ascending-order threshold value setting step are components of the threshold value setting step.

In the dither mask manufacturing method shown in FIG. 19, the initial white and black arrangement is set in initial white and black arrangement setting step S70. Initial white and black arrangement setting step S70 shown in FIG. 19 is the same as initial white and black arrangement setting step S10 shown in FIG. 1, and the description thereof is omitted.

Subsequently, in descending-order white and black arrangement determining step S72, the black pixel is sequentially decreased in descending order at an interval of two or more threshold values, and a white and black arrangement corresponding to a section threshold value for each interval of two threshold values is determined. Initially, a white and black arrangement 202 acquired by decreasing the black pixel from the initial white and black arrangement 200 by 16 threshold values is determined. The initial white and black arrangement 200 according to the present embodiment has the number of black pixels and the number of white pixels corresponding to a threshold value 128 which is a reference threshold value.

Here, the reference threshold value is a threshold value at which descending-order white and black arrangement determining step S72 and ascending-order white and black arrangement determining step S74 are switched.

A dither mask 220 shown in FIG. 20 is acquired by integrating the white and black dither mask and the black and white dither mask according to the first embodiment. A first threshold value which is a threshold value at which the white pixel is changed to the black pixel is set for each pixel of the dither mask 220. A second threshold value which is a threshold value at which the black pixel is changed to the white pixel may be set.

Subsequently, a white and black arrangement 204 acquired by decreasing the black pixel from the white and black arrangement 202 by 16 threshold values is determined. By doing this, the black pixel is decreased by 16 threshold values until all the pixels become the white pixels, and the white and black arrangement is determined for each section threshold value with the white and black arrangement corresponding to a previous section threshold value as a reference.

Similarly, in the ascending-order white and black arrangement determining step S74, the black pixel is sequentially increased in ascending order at an interval of two or more threshold values, and a white and black arrangement corresponding to a separation threshold value for each interval of two threshold values is determined. As shown in FIG. 20, the black pixel is increased from the initial white and black arrangement 200 by 16 threshold values, and a white and black arrangement 212 is determined.

Subsequently, the black pixel is increased from the white and black arrangement 212 by 16 threshold values, and a white and black arrangement 214 is determined. By doing this, the black pixel is increased by 16 threshold values until all the pixels become the black pixels, and the white and black arrangements are determined for the section threshold values with the white and black arrangement corresponding to the previous section threshold value as the reference.

In descending-order threshold value setting step S76 of FIG. 19, the threshold values are set from the threshold value corresponding to the initial white and black arrangement in descending order based on the white and black arrangement corresponding to each section threshold value. A threshold value 128 to a threshold value 113 are set for the dither mask 220 in descending order based on the white and black arrangement 200 and the white and black arrangement 202 shown in FIG. 20. Similarly, a threshold value 112 to a threshold value 97 are set for the dither mask 220 in descending order based on the white and black arrangement 202 and the white and black arrangement 204.

White and black arrangements are determined for intermediate threshold values between the section threshold values such that continuity with the white and black arrangement of the section threshold value is maintained, and the corresponding threshold value is set for the dither mask 220.

As shown in FIG. 20, a white and black arrangement 201A, a white and black arrangement 201B, . . . , a white and black arrangement 201C, and a white and black arrangement 201D are determined for an intermediate threshold value 127, an intermediate threshold value 126, . . . , an intermediate threshold value 114, and an intermediate threshold value 113 between the section threshold value 128 and the section threshold value 112 such that the continuity of the white and black arrangement 200 of the section threshold value 128 and the white and black arrangement 202 of the section threshold value 112 is maintained.

The white and black arrangement 201A is determined, and thus, the threshold value 128 is set for the dither mask 220. Similarly, the white and black arrangement 201B, . . . , the white and black arrangement 201C, and the white and black arrangement 201D are determined, and thus, the threshold value 127, . . . , the threshold value 115, the threshold value 114 are set for the dither mask 220. The white and black arrangement 201D is determined, and thus, the threshold value 113 is set for the dither mask 220 based on the difference from the white and black arrangement 202 of the section threshold value 112.

Similarly, in ascending-order threshold value setting step S78 of FIG. 19, the threshold values are set from the threshold value corresponding to the initial white and black arrangement by one or more threshold values in ascending order based on the white and black arrangements corresponding to the section threshold values. The threshold value 129 to the threshold value 144 are set for the dither mask 220 in ascending order based on the white and black arrangement 200 and the white and black arrangement 212 shown in FIG. 20. Similarly, the threshold value 145 to the threshold value 160 are set for the dither mask 220 in ascending order based on the white and black arrangement 212 and the white and black arrangement 214.

As for each intermediate threshold value between the section threshold values, the white and black arrangement is determined such that continuity with the white and black arrangement of the section threshold value is maintained, and the corresponding threshold value is set for the dither mask 220.

As shown in FIG. 20, a white and black arrangement 211A, a white and black arrangement 211B, . . . , a white and black arrangement 211C, and a white and black arrangement 211D are determined for an intermediate threshold value 129, an intermediate threshold value 130, . . . , an intermediate threshold value 142, and an intermediate threshold value 143 between the section threshold value 128 and the section threshold value 144 such that the continuity of the white and black arrangement 200 of the section threshold value 128 with the white and black arrangement 212 of the section threshold value 144 is maintained.

The white and black arrangement 211A is determined, and thus, the threshold value 129 is set for the dither mask 220. Similarly, the white and black arrangement 211B, . . . , the white and black arrangement 211C, and the white and black arrangement 211D are determined, and thus, the threshold value 130, . . . , the threshold value 142, and the threshold value 143 are set for the dither mask 220. The white and black arrangement 211D is determined, and thus, the threshold value 144 is set for the dither mask 220 based on the difference from the white and black arrangement 212 of the section threshold value 144.

<Description of Ascending-order White and Black Arrangement Determining Step>

Figure 21:
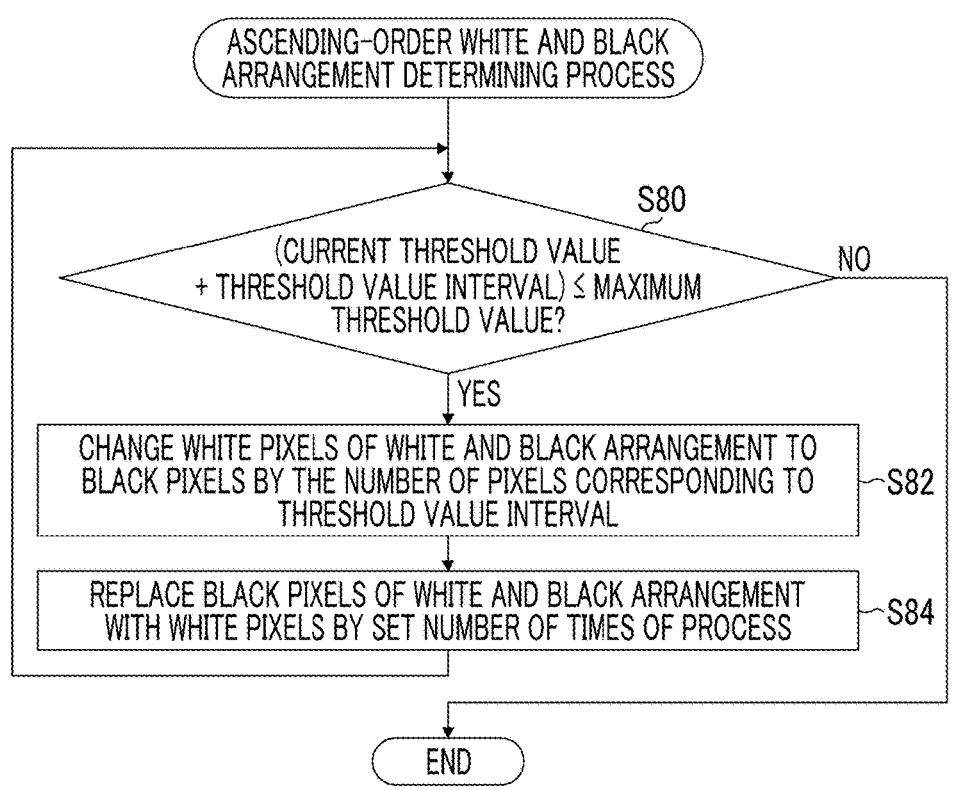
FIG. 21 is a flowchart showing a flow of a procedure of an ascending-order white and black arrangement determining step shown in FIG. 19.

FIG. 21 is a flowchart showing a flow of a procedure of the ascending-order white and black arrangement determining step shown in FIG. 19. Hereinafter, the ascending-order white and black arrangement determining step shown in FIG. 21 will be appropriately described with reference to FIG. 20.

As shown in FIG. 21, an ascending-order white and black arrangement determining process in ascending-order white and black arrangement determining step S74 shown in FIG. 19 includes maximum threshold value determining step S80, white-to-black changing processing step S82, and replacement processing step S84 shown in FIG. 21. These steps are repeatedly performed until all the pixels become the black pixels.

A step of setting the number of times of the replacement process in the replacement processing step is a component of the replacement process number setting step.

In the first process, the black pixels as much as 16 threshold values are added to the initial white and black arrangement 200 shown in FIG. 20, and the white and black arrangement 212 is determined. In the second process, the black pixels as much as 16 threshold values are added to the white and black arrangement 212, and the white and black arrangement 214 is determined. Subsequently, the black pixels as much as 16 threshold values are added to the current white and black arrangement, and the process processes are repeated until all the pixels become the black pixels.

In white-to-black changing processing step S82 of FIG. 21, the white pixels as much as the number of pixels corresponding to the threshold value interval 16, among the white pixels of the initial white and black arrangement 200 shown in FIG. 20, are changed to the black pixels, and the temporary white and black arrangement is determined. The number of pixels corresponding to the threshold value interval is equal to the threshold value interval.

In white-to-black changing processing step S82 shown in FIG. 21, the same process as the white-to-black changing process in ascending-order white-to-black changed threshold value setting step S20 shown in FIG. 2 is performed. In white-to-black changing processing step S82 shown in FIG. 21, one pixel among white pixels of a white and black arrangement before the white-to-black changing process is temporarily changed to the black pixel, and the graininess is evaluated. This process is repeatedly performed on all the white pixels, and the graininess in a case where all the white pixels are temporarily changed to the black pixels is evaluated.

The white pixel of which the graininess becomes best is actually changed to the black pixel. This process is repeatedly performed by the same number of times as the number of pixels corresponding to the threshold value interval. The white pixels as much as the number of pixels corresponding to the threshold value interval are changed to the black pixel.

In other words, white-to-black changing processing step S82 is a process of repeating the process of temporarily changing one pixel among the white pixels of the white and black arrangement before the white-to-black changing process to the black pixel, evaluating the graininess, determining the white pixels of which the graininess becomes best, and changing the white pixel to the black pixel by the same number of times as the number of pixels corresponding to the threshold value interval.

In replacement processing step S84 shown in FIG. 21, the same process as the replacement process of ascending-order replaced threshold value setting step S22 shown in FIG. 2 is performed.

By doing this, the white and black arrangements corresponding to the section threshold values are determined for the threshold values from 144 to 256 through the steps shown in FIG. 21. Similarly to the procedure of FIG. 2, the orders of white-to-black changing processing step S82 and replacement processing step S84 may be reversed in the procedure of FIG. 21.

Here, in a case where the orders thereof are not reversed, image quality is favorable.

The aspect in which replacement processing step S84 is performed and white-to-black changing processing step S82 is subsequently performed is an aspect of the dot pattern determining step of performing the replacement processing step and performing the dot number changing step.

The ascending-order white and black arrangement determining step is an aspect of the dot pattern determining step. The ascending-order white and black arrangement determining step is an aspect of the dot pattern determining step of determining the dot pattern of the dot pattern determining target gradation which is the gradation having the gradation difference of one or more gradations from the dot pattern determined gradation and is the gradation of the target for determining the dot pattern.

<Description of Descending-Order White and Black Arrangement Determining Step>

Figure 22:
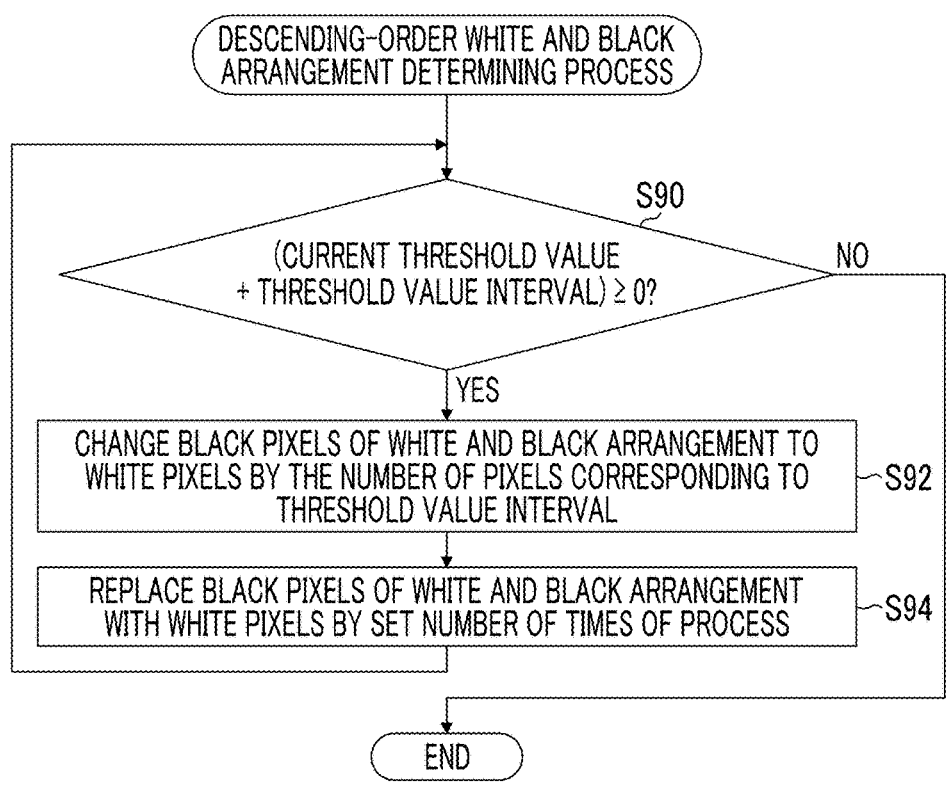
FIG. 22 is a flowchart showing a flow of a procedure of a descending-order white and black arrangement determining step shown in FIG. 19.

FIG. 22 is a flowchart showing a flow of a procedure of the descending-order white and black arrangement determining step shown in FIG. 19. Hereinafter, the descending-order white and black arrangement determining step shown in FIG. 22 will be appropriately described with reference to FIG. 20.

A descending-order white and black arrangement determining process in the descending-order white and black arrangement determining step shown in FIG. 22 includes minimum threshold value determining step S90, black-to-white changing processing step S92, and replacement processing step S94. These steps are repeatedly performed until all the pixels become the white pixels.

A step of setting the number of times of the replacement process in the replacement processing step is a component of the replacement process number setting step.

In the first process, the black pixels as much as 16 threshold values are decreased from the initial white and black arrangement 200, and the white and black arrangement 202 is determined. In the second process, the black pixels as much as 16 threshold values are decreased from the white and black arrangement 202, and the white and black arrangement 204 is determined. Subsequently, the black pixels as much as 16 threshold values are decreased from the current white and black arrangement, and these processes are repeated until all the pixels become the white pixels.

In black-to-white changing processing step S92 of FIG. 22, the black pixels as much as the number of pixels corresponding to the threshold value interval 16, among the black pixels of the initial white and black arrangement 200 shown in FIG. 20, are changed to the white pixels, and the temporary white and black arrangement is determined.

In black-to-white changing processing step S92 shown in FIG. 22, the same process as the black-to-white changing process in descending-order black-to-white changed threshold value setting step S30 shown in FIG. 9 is performed. In the black-to-white changing processing step S92 shown in FIG. 22, one pixel among the black pixels of the white and black arrangement before the black-to-white changing process is temporarily changed to the white pixel, and the graininess is evaluated. This process is repeated for all the black pixels, and the graininess in a case where all the black pixels are temporarily changed to the white pixels is evaluated.

The black pixel of which the graininess becomes best is actually changed to the white pixel. This process is repeatedly performed by the same number of times as the number of pixels corresponding to the threshold value interval. The black pixels as much as the number of pixels corresponding to the threshold value interval are changed to the white pixels.

In other words, black-to-white changing processing step S92 is a process of repeating the process of temporarily changing one pixel among the black pixels of the white and black arrangement before the black-to-white changing process to the white pixel, evaluating the graininess, determining the black pixel of which the graininess becomes best, and changing the black pixel to the white pixel by the same number of times as the number of pixels corresponding to the threshold value interval.

In replacement processing step S94 shown in FIG. 22, the same process as the replacement process of descending-order replaced threshold value setting step S32 shown in FIG. 9 is performed.

By doing this, the white and black arrangements corresponding to the section threshold values are determined for the threshold values from 128 to 0 through the steps shown in FIG. 22. Similarly to the procedure of FIG. 9, the orders of black-to-white changing processing step S92 and replacement processing step S94 in the procedure of FIG. 22 may be reversed. Here, in a case where the orders thereof are not reversed, image quality is favorable.

The aspect in which replacement processing step S94 is performed and black-to-white changing processing step S92 is subsequently performed is an aspect of the dot pattern determining step of performing the replacement processing step and subsequently performing the dot number changing step.

The descending-order white and black arrangement determining step is an aspect of the dot pattern determining step. The descending-order white and black arrangement determining step is an aspect of the dot pattern determining step of determining the dot pattern of the dot pattern determining target gradation which is the gradation having the gradation difference of one or more gradations from the dot pattern determined gradation and is the gradation of the target for determining the dot pattern.

<Determining of White and Black Arrangements Corresponding to Intermediate Threshold Values and Setting of Threshold Values>

Hereinafter, the determining of the white and black arrangements corresponding to the intermediate threshold values and the setting of the threshold values including the section threshold values will be described with reference to FIG. 23 to 25. In the following description, a case where the section threshold values are the intermediate threshold values between 32 and 48 will be described. Initially, the ascending-order process will be described.

Figure 23:
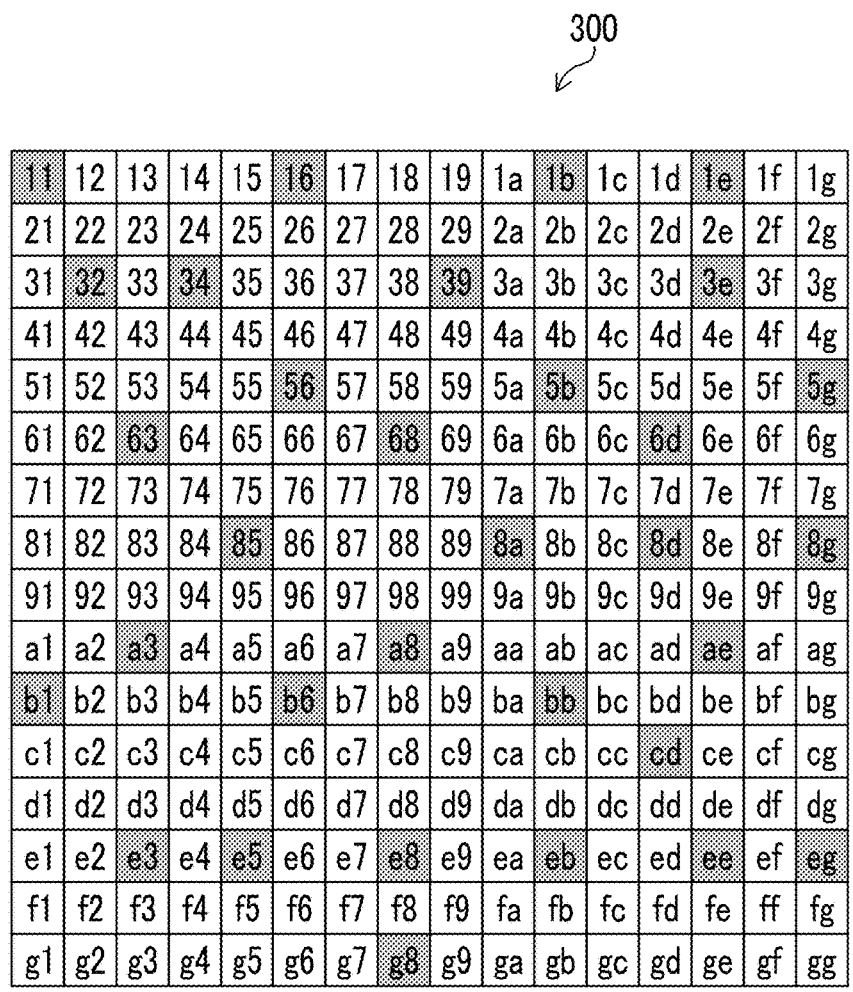
FIG. 23 is a schematic diagram of a white and black arrangement corresponding to a threshold value 32.

FIG. 23 is a schematic diagram of a white and black arrangement corresponding to a threshold value 32. FIG. 24 is a schematic diagram of a white and black arrangement corresponding to a threshold value 48. FIG. 25 is a schematic diagram showing the relationship between the white and black arrangement corresponding to the threshold value 32 and the white and black arrangement corresponding to the threshold value 48.

Figure 25:
FIG. 25 is a schematic diagram representing the relationship between the white and black arrangement corresponding to the threshold value 32 and the white and black arrangement corresponding to the threshold value 48.

A two-digit sign assigned to each pixel in FIGS. 23 to 25 represents a pixel position. A left sign represents a row number from 1 to 16. A right sign represents a column number of 1 to 16. Each of alphabets a to g represents a value of 10 to 16.

The pixels colored in black in FIGS. 23 and 24 are the black pixels. The pixels colored in white in FIGS. 23 and 24 are the white pixels. For example, in a white and black arrangement 300 of FIG. 23, a pixel of which the pixel position is 11, a pixel of which the pixel position is b1, and a pixel of which the pixel position is 32 are the black pixels. In FIG. 24, a pixel of which the pixel position is 21, a pixel of which the pixel position is a1, and a pixel of which the pixel position is 32 are the black pixels.

In a white and black arrangement 304 shown in FIG. 25, the pixels colored in black are the black pixels common to the white and black arrangement corresponding to the threshold value 32 and the white and black arrangement corresponding to the threshold value 48. The number of black pixels common to the white and black arrangement corresponding to the threshold value 32 and the white and black arrangement corresponding to the threshold value 48 is 23.

For example, a pixel of which the pixel position is 32 is the black pixel common to the white and black arrangement 300 shown in FIG. 23 and the white and black arrangement 302 shown in FIG. 24.

In FIG. 25, the pixels hatched by lattice are the black pixels only in the white and black arrangement corresponding to the threshold value 32. The number of black pixels only in the white and black arrangement corresponding to the threshold value 32 is nine. The pixel positions 11, 16, 5*b*, 5*g*, 63, a3, b1, e3, and g8 are the pixel positions of the changing targets from the black pixels to the white pixels in the white and black arrangement corresponding to any of the threshold value 33 to the threshold value 48.

The pixels hatched by the diagonal lines are the black pixels only in the white and black arrangement corresponding to the threshold value 48. The black pixels only in the white and black arrangement corresponding to the threshold value 48 are pixels of which the pixel positions 15, 21, 37, and 3*c*, and are 25 pixels in all. The pixel positions of the black pixels only in the white and black arrangement corresponding to the threshold value 48 are pixel positions of targets to be changed from the white pixels to the black pixels in the white and black arrangement corresponding to any of the threshold value 33 to the threshold value 48.

25 which is the number of pixels only in the white and black arrangement corresponding to the threshold value 48 is 25 acquired by adding a value at which the white pixel is replaced to the black pixel, that is, 9 which is the number of black pixels only in the white and black arrangement corresponding to the threshold value 32 to a value of 16 corresponding to the threshold value interval.

In the ascending-order threshold value setting step S78 shown in FIG. 19, the white and black arrangements corresponding to the threshold value 33 to the threshold value 48 are determined, and the threshold value is set.

Initially, any of the white pixels, among 25 white pixels in the white and black arrangement 300 corresponding to the threshold value 32, which correspond to 25 pixels which are the black pixels only in the white and black arrangement 302 corresponding to the threshold value 48 is changed to the black pixel. The threshold value is set for the pixels of the white and black dither mask corresponding to the pixels changed to the black pixels from the white pixels.

The changing of the white pixels to the black pixels is performed similarly to the white-to-black changing process in ascending-order white-to-black changed threshold value setting step S20 of FIG. 2. That is, the temporary changing of 25 white pixels in the white and black arrangement 300, which correspond to the black pixels only in the white and black arrangement 302 corresponding to the threshold value 48, that is, 25 pixels hatched by diagonal lines in the white and black arrangement 304 shown in FIG. 25 and correspond to the threshold value 32, to the black pixels and the evaluation of the graininess are repeated. Subsequently, the white pixel of which the graininess becomes best is determined, and is actually changed to the black pixel. In a case where the void and cluster method is used, the void pixel which is the pixel of which the energy is minimum is selected, and is changed to the black pixel.

Subsequently, any of the black pixels as much as a predetermined replacement number, among nine pixels which are the black pixels only in the white and black arrangement 300 corresponding to the threshold value 32 and the 25 white pixels in the white and black arrangement 300 corresponding to the threshold value 32 corresponding to 25 pixels which are the black pixels only in the white and black arrangement corresponding to the threshold value 48 are replaced. The threshold value is set for the pixels of the white and black dither mask corresponding to the pixels changed to the black pixels from the white pixels through the replacement. The threshold value is set for the pixels of the black and white dither mask corresponding to the pixels changed to the white pixels from the black pixels through the replacement.

That is, it is necessary to change nine pixels which are the black pixels only in the white and black arrangement 300 corresponding to the threshold value 32 to the white pixels from the black pixels in any of the white and black arrangements corresponding to the threshold value 33 to the threshold value 48. It is necessary to change the white pixels to the black pixels as much as the same number of white pixels changed from the black pixels. The pixel positions in which the pixels are able to be changed to the black pixels are the pixel positions of the black pixels only in the white and black arrangement 302 corresponding to the threshold value 48.

Here, the predetermined replacement number, 9 which is the number of pixels required to be replaced is divided by the threshold value interval 16 between the section threshold values of the processing targets, and the product of the division is the replacement number in a case where there is no remainder. The replacement number is acquired by appropriately distributing the remainder in addition to the product in a case where there is the remainder.

In the present embodiment, since nine pixels are allocated to 16 gradations, an aspect in which the pixels are allocated to the first-half nine gradations one by one, an aspect in which the pixels are allocated to the second-half nine gradations one by one, and an aspect in which the pixels are randomly allocated may be adopted. There is an example of the aspect in which the pixels are randomly allocated to the gradations, an example in which the pixels are allocated to the white and black arrangements corresponding to the threshold values of 35, 38, 40, 42, 43, 44, 45, 46, and 48 one by one.

Here, an actual replacement number is counted in order to necessarily obey the set replacement number. That is, it is preferable that the replacement number before the replacement process is set to be zero, the counted number is increased by one in a case where the actual replacement process is performed, and the replacement process is completed in a case where the count number reaches the preset replacement number.

The replacement process of replacing the black pixel and the white pixel will be described in detail. Initially, one black pixel among nine pixels which are the black pixels only in the white and black arrangement 300 corresponding to the threshold value 32 is set as the target pixel. The set target pixel is temporarily replaced with all the white pixels among 25 pixels which are the black pixels only in the white and black arrangement 302 corresponding to the threshold value 48, and the graininess is evaluated.

Subsequently, the target pixel is sequentially changed to all the black pixels, among nine pixels which are the black pixels only in the white and black arrangement 300 corresponding to the threshold value 32. Similarly, the target pixel is temporarily replaced with all the white pixels among 25 pixels which are the black pixels only in the white and black arrangement 302 corresponding to the threshold value 48, and the graininess is evaluated. The black pixel of which the graininess becomes best is actually replaced with the white pixel.

In a case where the void and cluster method is used, the cluster pixel which is the pixel of which the energy is maximum, among all the black pixels out of nine pixels which are the black pixels only in the white and black arrangement 300 corresponding to the threshold value 32 is initially changed to the white pixel. The blur filter is removed with the changed pixel as the center, and the energy mask is updated. Thereafter, the void pixels which is the pixel of which the energy is minimum, among all the white pixels out of 25 pixels which are the black pixels only in the white and black arrangement 302 corresponding to the threshold value 48, is changed to the black pixel.

In both the process of changing the pixel from the white pixel to the black pixel and the process of replacing the white pixel and the black pixel, in a case where the void and cluster method is used, it is necessary to update the energy mask through the applying or removing of the blur filter whenever the pixel is changed from the white pixel to the black pixel or is changed from the black pixel to the white pixel.

The process of changing and replacing the pixel is repeatedly performed from the threshold value 33 to the threshold value 48, the white and black arrangements corresponding to the threshold values are determined, and the threshold value is set.

It has been described in the present embodiment that the process of changing the pixels from the white pixels to the black pixels among 25 pixels which are the black pixels only in the white and black arrangement corresponding to the threshold value 48 is initially performed and the process of replacing the black pixels among nine pixels which are the black pixels in the white and black arrangement corresponding to the threshold value 32 and any of the white pixels among 25 pixels which are the black pixels in the white and black arrangement corresponding to the threshold value 48 is subsequently performed. However, the process of replacing the black pixel and the white pixel may be initially performed, and the process of changing the pixel from the white pixel to the black pixel may be subsequently performed.

The aspect in which the process of replacing the black pixel and the white pixel is performed and the process of the changing the pixel from the white pixel to the black pixel is subsequently performed is an aspect of the dot pattern determining step of performing the replacement processing step and subsequently performing the dot number changing step.

Hereinafter, the descending-order process will be described. It is assumed that the white and black arrangement 300 shown in FIG. 23 and the white and black arrangement 302 shown in FIG. 24 are acquired through descending-order white and black arrangement determining step S72 of FIG. 19.

That is, it is assumed that after the white and black arrangement 302 corresponding to the threshold value 48 shown in FIG. 24 is determined, 16 black pixels corresponding to the threshold value interval 16 are changed to the white pixels, nine black pixels are replaced with the white pixels, and the white and black arrangement corresponding to the threshold value 32 is determined.

In descending-order threshold value setting step S76 of FIG. 19, the white and black arrangements corresponding to the threshold value 47 to the threshold value 32 are determined based on the white and black arrangement 302 corresponding to the threshold value 48 shown in FIG. 24 and the white and black arrangement 300 corresponding to the threshold value 32 shown in FIG. 23, and the threshold values are set. It is noted that the threshold values set in the descending-order process are the threshold values for returning the white pixels or the black pixels changed in descending order to the black pixels or the white pixels.

Initially, any of black pixels among 25 black pixels which are the black pixels only in the white and black arrangement 302 corresponding to the threshold value 48 is changed to the white pixel. The threshold value is set for the white and black dither mask.

The changing of the pixel from the black pixel to the white pixel is performed as follows. The temporary changing of all the black pixels among 25 pixels which are the black pixels only in the white and black arrangement 302 corresponding to the threshold value 48 to the white pixels and the evaluation of the graininess are repeated. Subsequently, the black pixel of which the graininess becomes best is determined, and is actually changed to the white pixel. In a case where the void and cluster method is used, the cluster pixel which is the pixel of which the energy is maximum is selected, and is changed to the white pixel.

Subsequently, the black pixels corresponding to the predetermined replacement number among 25 pixels which are the black pixels only in the white and black arrangement 302 corresponding to the threshold value 48 and any of the white pixels among nine pixels which are the black pixels only in the white and black arrangement 300 corresponding to the threshold value 32 are replaced. The threshold value is set for the pixel of the black and white dither mask corresponding to the pixel changed from the white pixel to the black pixel through the replacement. The threshold value is set for the pixel of the white and black dither mask corresponding to the pixel changed from the black pixel to the white pixel through the replacement.

The predetermined replacement number may be determined similarly to the ascending-order process, and thus, the description thereof is omitted. Similarly to the ascending-order process, it is preferable that the actual replacement number is counted.

Hereinafter, the replacement process of replacing the black pixel and the white pixel will be described in detail. Initially, the target pixel is set for one black pixel among 25 pixels which are the black pixels only in the white and black arrangement 302 corresponding to the threshold value 48. The set target pixel is temporarily replaced with all the white pixels among nine pixels which are the black pixels only in the white and black arrangement 300 corresponding to the threshold value 32, and the graininess is evaluated.

Subsequently, the target pixel is sequentially changed to all the black pixels among 25 pixels which are the black pixels only in the white and black arrangement 302 corresponding to the threshold value 48. Similarly, the target pixel is sequentially replaced with all the white pixels among nine pixels which are the black pixels only in the white and black arrangement 300 corresponding to the threshold value 32, and the graininess is evaluated.

The black pixel of which the graininess becomes best and the white pixel are actually replaced.

In a case where the void and cluster method is used, the cluster pixel which is the pixel of which the energy is maximum among all the black pixels out of 25 pixels which are the black pixels only in the white and black arrangement 302 corresponding to the threshold value 48 is initially changed to the white pixel. The blur filter is removed with the changed pixel as the center, and the energy mask is updated. Thereafter, the void pixel which is the pixel of which the energy is minimum among all the white pixels out of nine pixels which are the black pixels only in the white and black arrangement 300 corresponding to the threshold value 32 is changed to the black pixel.

In any of the process of changing the pixel from the black pixel to the white pixel and the process of replacing the black pixel and the white pixel, in a case where the void and cluster method is used, it is necessary to update the energy mask through the removing or applying of the blur filter whenever the pixel is changed from the black pixel to the white pixel or is changed from the white pixel to the black pixel.

By doing this, the white and black arrangements corresponding to the intermediate threshold values between the section threshold values are determined, and the threshold values including the section threshold values are set.

The determination of the white and black arrangements corresponding to the intermediate threshold values is a component of the dot pattern determining step. The setting of the threshold values is a component of the threshold value setting step.

The process of changing the pixel and the process of replacing the pixel are repeatedly performed from the threshold value 47 to the threshold value 32, the white and black arrangements corresponding to the threshold values are determined, and the threshold values are set.

It has been described in the present embodiment that the process of changing the pixel to the white pixel from the black pixel among 25 pixels which are the black pixels only in the white and black arrangement corresponding to the threshold value 48 is initially performed and the process of replacing the black pixels among 25 pixels which are the black pixels only in the white and black arrangement corresponding to the threshold value 48 with any of the white pixels among nine pixels which are the black pixels only in the white and black arrangement corresponding to the threshold value 32 is subsequently performed. The process of replacing the black pixel and the white pixel may be initially performed, and the process of changing the pixel from the black pixel to the white pixel may be subsequently performed.

The aspect in which the process of replacing the black pixel and the white pixel is performed and the process of the changing the pixel from the white pixel to the black pixel is subsequently performed is an aspect of the dot pattern determining step of performing the replacement processing step and subsequently performing the dot number changing step.

Operations and Effect of Second Embodiment

According to the dither mask manufacturing method described above, it is possible to acquire the same operations and effects as those of the first embodiment between the section threshold values. That is, the constant continuity in the white and black arrangements between the densities is secured, and the image quality is more favorable compared to a case where the dither mask of the related art is used. The stacking limitations of the dither mask are partially maintained at the intermediate threshold value between the section threshold values, and thus, it is possible to secure constant continuity in the white and black arrangements between the densities.

<Other Aspects of Number of Times of Replacement Process>

In the dither mask manufacturing method according to the first embodiment and the second embodiment, the replacement process is repeated by the preset number of times the process, and thus, the replacement of the white pixel and the black pixel as much as the number of pixels corresponding to the number of times of the process is performed. The definition of the number of times of the process has been already described, and thus, the description thereof is omitted.

Meanwhile, in a case where the image quality in which the replacement of the white pixel and the black pixel is replaced becomes best, the replacement of the white pixel and the black pixel may not be performed in the white and black arrangement acquired as the result of the replacement process even though the replacement process is performed.

In view of the circumstances, the replacement of the white pixel and the black pixel for at least one pixel is performed by adopting an aspect in which the number of replacement pixels is set instead of setting the number of times of the replacement process, the number of pixels actually replaced is counted, and the replacement process is ended in a case where the number of pixels actually replaced reaches the set replacement pixel number. The number of replacement pixels corresponds to the replacement dot number.

Since the continuity in the white and black arrangements between the densities depends on the number of overlapped white pixels or black pixels of the white and black arrangements at the neighboring densities, the image quality can be favorable while appropriately securing the constant continuity in the white arrangements between the densities in an aspect in which the replacement process is ended based on the number of actually replaced pixels rather than the number of times of the replacement process.

Similarly to the aspect in which the replacement process is ended based on the number of times of the process the replacement process described above is performed, it is preferable that the pixel position of the target pixel is changed randomly or without being biased even in the aspect in which the replacement process is ended based on the number of replacement pixels. It is preferable that the pixel of the position thereof is changed in an order in which all the black pixels are changed.

Since it is considered that the number of overlapped white pixels or black pixels in the white and black arrangements at the neighboring gradations required to secure the constant continuity is different depending on the number of all white pixels or the number of all black pixels, that is, the gradations, it is preferable that the number of replacement pixels is changed depending on the gradations and is set. For example, in a case where the gradation is 256, the number of replacement pixels may be set as follows. The gradation mentioned herein may be replaced with the density.

Initially, since the number of black pixels is zero at a gradation of zero, the number of replacement pixels is set to zero. In the range of the number of gradations as 1 to the number of gradations as 128, that is, the range of the gradations in which the number of white pixels is larger than the number of black pixels, as the gradation is increased, that is, as the number of black pixels is increased, the number of replacement pixels is also increased.

Meanwhile, the range of the gradation 128 to the gradation 255, that is, the range of the gradation in which the number of black pixels is larger than the number of white pixels, as the gradation is increased, that is, as the number of white pixels is decreased, the number of replacement pixels is also decreased. Since the number of white pixels is zero at the gradation 256, the number of replacement pixels is set to zero.

A ratio in a case where the number of replacement pixels is increased or decreased depending on the gradation may be constant, that is, the number of replacement pixels may be in proportion to the gradation. That is, in a case where the number of replacement pixels is L, the gradation is n, and a is α proportionality constant, the number L of replacement pixels may be L=α×n in the range in which n is from 0 to 128, and the number of L of replacement pixels may be L=α×(256−n) in a range in which n is from 128 to 256. Here, in order to increase the number of replacement pixels, the proportionality constant α may be set to a large value.

Figure 26:
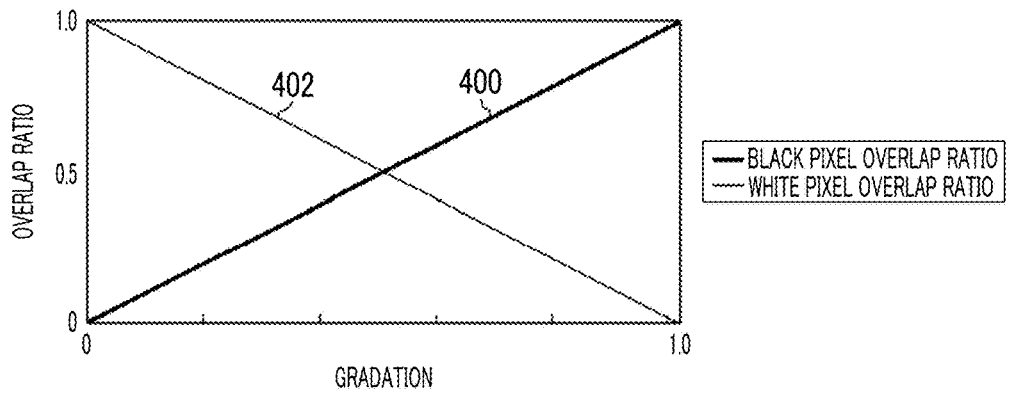
FIG. 26 is a graph showing the relationship between a gradation and an overlap ratio in a case where the white and black arrangements at the gradations are independently optimized.

The number of replacement pixels may be set as follows. FIG. 26 is a graph showing the relationship between the gradation and the overlap ratio in a case where the white and black arrangements at the gradations are independently optimized. A horizontal axis of FIG. 26 is the gradation, and a vertical axis is the overlap ratio. The horizontal axis is a value acquired by dividing the gradation by the maximum gradation, and is expressed by a value of 0 to 1.0. In the present embodiment, the maximum gradation is 256. The same is true for the gradations of the horizontal axes in FIGS. 27 and 28.

A straight line 400 shown in FIG. 26 is an overlap ratio of an average black pixel in a case where the white and black arrangements at the gradations are independently optimized. A straight line 402 shown in FIG. 26 is an overlap ratio of an average white pixel in a case where the white and black arrangements at the gradations are independently optimized.

The overlap ratio of the black pixels is a value acquired by expressing the number of black pixels common to the white and black arrangements at the neighboring gradations, that is, the number of overlapped black pixels as a ratio in a case where the number of black pixels in the white and black arrangement at the gradation of the white and black arrangement having a smaller number of black pixels is 1. The overlap ratio of the white pixels is a value acquired by expressing the number of white pixels common to the white and black arrangements at the neighboring gradations, that is, the number of overlapped white pixels as a ratio in a case where the number of white pixels in the white and black arrangement at the gradation of the white and black arrangement having a smaller number of white pixels is 1.

The relationship between the gradation and the overlap ratio of FIG. 26 may be expressed by Expression. In a case where gradation n ranges 0 to 256 and an overlap ratio of the black pixel is expressed by ε, ε is given by n/256.

Figure 27:
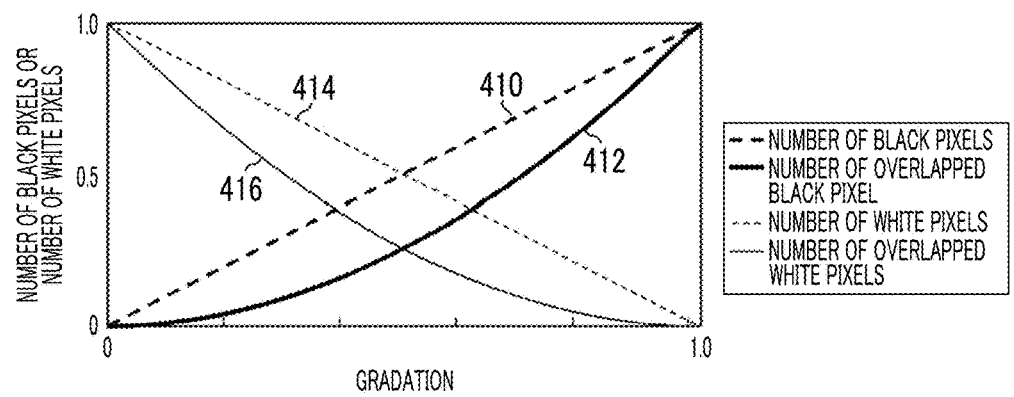
FIG. 27 is a graph showing the relationship between the gradation and the number of black pixels or the number of white pixels.

FIG. 27 is a graph showing the relationship between the gradation and the number of black pixels or the number of white pixels. The horizontal axis of FIG. 27 is the gradation, and the vertical axis is the number of black pixels or the number of white pixels. The number of black pixels or the number of white pixels of FIG. 27 is expressed by a decimal point in a case where it is assumed that a halftone mask size is one pixel. The same is true for the number of black pixels or the number of white pixels on the vertical axis of FIG. 28.

A straight line 410 shown in FIG. 27 represents the number of black pixels at the gradations. A curved line 412 shown in FIG. 27 represents the number of black pixels common to the white and black arrangements at the neighboring gradations. A straight line 414 shown in FIG. 27 represents the number of white pixels at the gradations. A curved line 416 shown in FIG. 27 represents the number of white pixels common to the white and black arrangements at the neighboring gradations.

The relationship between the gradation and the number of black pixels and the number of black pixels common to the white and black arrangements at the neighboring gradations of FIG. 27 may be expressed by the following Expression. In a case where the number of black pixels at the gradation n is b, b is expressed by n/256. That is, the number of black pixels at the gradation 256 matches the halftone mask size, and becomes one pixel. In a case where the number of common black pixels at the gradation n is s, s is expressed by $\varepsilon \times b = (n/256)^2$.

The number s of common black pixels at a certain gradation shown in FIG. 27 represents the number of black pixels common to the white and black arrangements at the neighboring gradations in a case where the white and black arrangements at the gradations are independently optimized, that is, the white and black arrangements at the neighboring gradations are discontinuous.

Meanwhile, in a case where the dither mask having the stacking limitations is used, the overlap ratio of the black pixels in the white and black arrangements between the neighboring gradations is 1 without depending on the gradation. By doing this, the number of common black pixels which is the number of overlapped black pixels in the white and black arrangements between the neighboring gradations in the dither mask having the stacking limitations matches the straight line 410 of FIG. 27.

The number of common black pixels is decreased by one whenever one black pixel is replaced with the white pixel, and the number of common black pixels is equal to or less than s in a case where (b−s) pixels or more are replaced. Thus, the white and black arrangements at the neighboring gradations are discontinuous.

Thus, the number of replacement pixels is set to a value smaller than (b −s) such that the number of common black pixels is not equal to or less than s. That is, the number of replacement pixels is set to a value smaller than $x-x^2$. Here, x is n/256, that is, is a value acquired by dividing the gradation n by the maximum gradation 256 and representing the gradation by a range of 0 to 1. It is assumed that the size of the halftone mask is one pixel.

Figure 28:
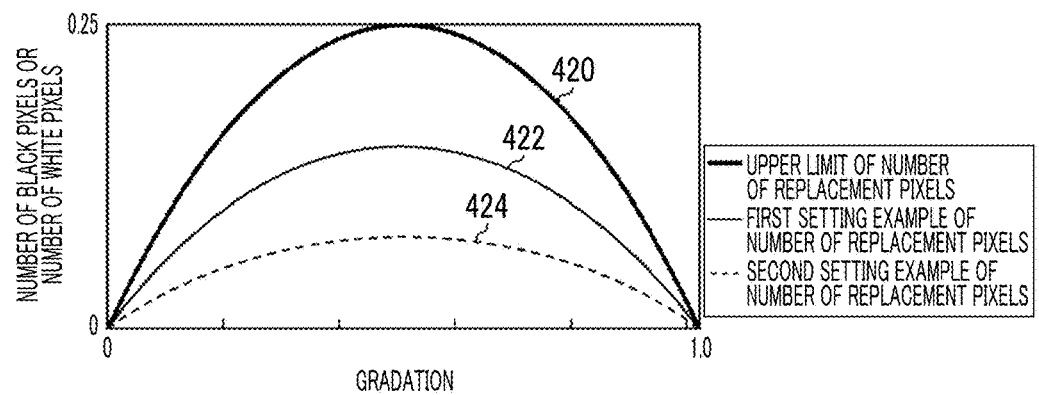
FIG. 28 is a graph showing the relationship between the gradation and the number of replacement pixels.

FIG. 28 is a graph showing the relationship between the gradation and the number of replacement pixels. The horizontal axis of FIG. 28 is the gradation, and the vertical axis is the number of replacement pixels. A curved line 420 represents an upper limit of the number of replacement pixels, that is, $x-x^2$. The number of replacement pixels is set in a range which is equal to or less than the curved line 420 indicating the upper limit of the number of replacement pixels.

A curved line 422 shown in FIG. 28 is a first setting example of the number of replacement pixels. The curved line 422 is acquired by multiplying the curved line 420 by 0.6. A curved line 424 is a second setting example of the number of replacement pixels. The curved line 424 is acquired by multiplying the curved line 420 by 0.3.

Since the actual size of the halftone mask is not one pixel, in a case where it is assumed that the size of the halftone mask is M pixels, a value acquired by multiplying the value of each gradation of the curved line 420 shown in FIG. 28 by M becomes the upper limit of the number of replacement pixels at each gradation.

That is, the upper limit of the number of replacement pixels at each gradation is expressed by $M \times (x-x^2)$. For example, in a case where predetermined constant which is greater than 0 or is equal to or less than 1 is β, the number of replacement pixels at each gradation is set as $M \times \beta \times (x-x^2)$.

It has been described that since the continuity in the white and black arrangements between the gradations depends on the number of overlapped white pixels or black pixels of the white and black arrangements at the neighboring gradations, the replacement process is ended based on the number of actually replaced pixels at the neighboring gradation, that is, the number of replacement pixels instead of the number of times of the replacement process.

However, since the image data on which the halftone process is performed also includes a gradation sharply changed over a plurality of gradations in addition to the neighboring gradations, it is preferable that the number of overlapped white pixels or black pixels of the white and black arrangements at the plurality of gradations in addition to the neighboring gradations is maintained by a predetermined number or more in order to secure the constant continuity over the plurality of gradations in addition to the neighboring gradations.

In a case where the dither mask having the stacking limitations of the related art is used, the overlap ratio of the white pixels or the black pixels in the white and black arrangements at the plurality of gradations in addition to the neighboring gradations is 1 (the white pixels or the black pixels at the gradation at which the number of white pixels or the number of black pixels is smaller are completely included in the white pixels or the black pixels at the gradation at which the number of white pixels or the number of black pixels is larger, of two certain gradations among the plurality of gradations), and thus, the continuity is secured over the plurality of gradations. As a result, even in a case where the halftone process is performed on the image data including the gradation sharply changed over the plurality of gradations, since the image quality of the halftone image is favorable, it is preferable that the number of overlapped white pixels or black pixels of the white and black arrangements at the plurality of gradations is retained by a predetermined number or more in addition to the neighboring gradations similarly to a case where the replacement process is performed.

That is, in a case where the white and black arrangement corresponding to the threshold value I(u) is determined, it is preferable that m is an integer which is equal to or less than u, the white and black arrangements corresponding to m neighboring threshold values I(u−1), I(u−2), . . . , and I(u−m) are retained, and the white and black arrangement is determined such that the number of overlapped white pixels or black pixels of the white and black arrangements is retained by a predetermined number or more. Here, I(u) represents a u-th threshold value.

The number of overlapped white pixels or black pixels of the white and black arrangements may be set as follows.

Figure 29:
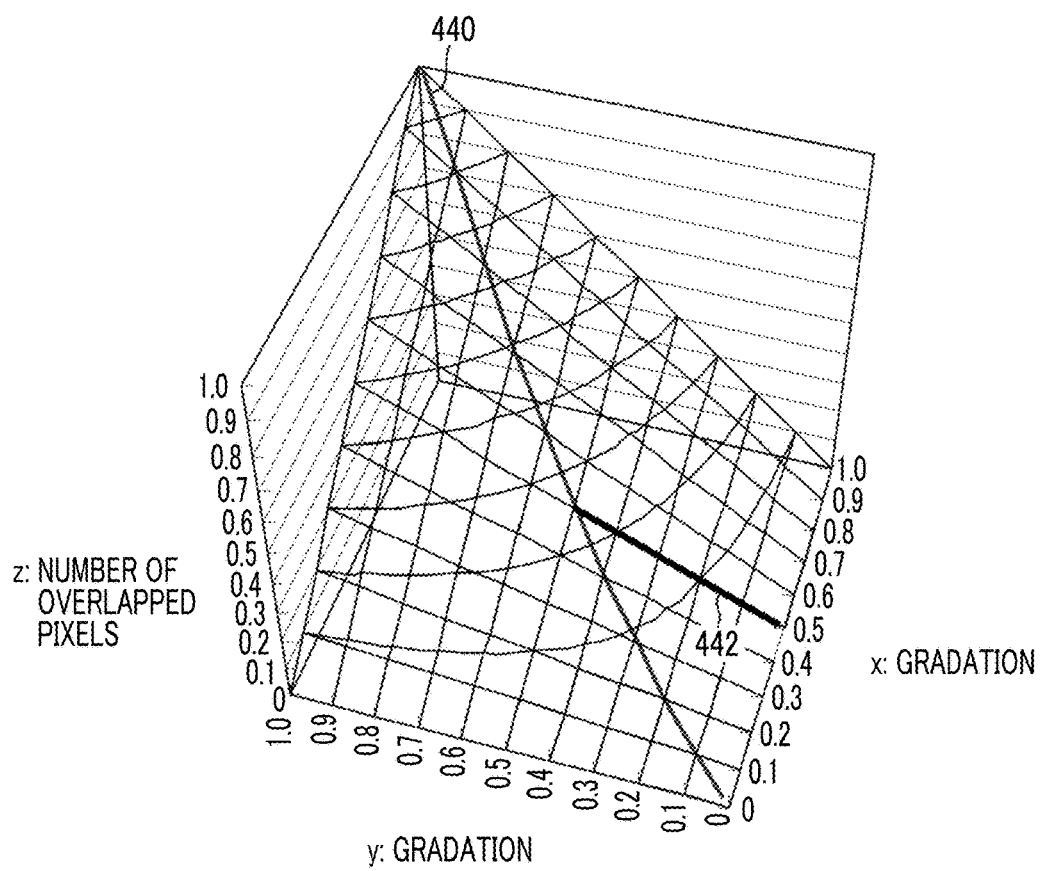
FIG. 29 is a graph showing the relationship between a gradation and the number of overlapped pixels in a case where the white and black arrangements at the gradations are independently optimized, that is, a case where the white and black arrangements are discontinuous.

FIG. 29 is a graph showing the relationship between the gradation and the number of overlapped pixels in a case where the white and black arrangements at the gradations are independently optimized, that is, a case where the white and black arrangements are discontinuous. An x-axis denotes a gradation x of the white pixel or the black pixel, a y-axis denotes a gradation y of the white pixel or the black pixel, and a z-axis denotes the white and black arrangements of the gradation x and the gradation y which are independently optimized, that is, the number of overlapped white pixels or black pixels of the discontinuous white and black arrangements at the gradation x and the gradation y. Here, it is assumed that the gradation is expressed in a range from 0 to 1, and the size of the halftone mask is one pixel.

The curved line 412 and the curved line 416 of FIG. 27 represent the number of overlapped black pixels or white pixels of the white and black arrangements at the neighboring gradations, whereas FIG. 29 represents the number of overlapped black pixels or white pixels of the white and black arrangements at a certain gradation x and a certain gradation y.

That is, the number of overlapped pixels in the curved line 412 or the curved line 416 of FIG. 27 is a part of FIG. 29, and corresponds to a curved line 440. From FIG. 29, in a case where a gradation of a threshold value I(u) is x(I(u)) and x(I(u)) is 0.5, the number of overlapped white pixels or black pixels in the white and black arrangements corresponding to gradations x(I(u−i)), x(I(u−2)), . . . , and x(I(u−m)) may be set to a value greater than the number of overlapped pixels represented by a straight line 442. The straight line 422 shown in FIG. 29 represents a case where y is equal to or greater than 0 and is equal to or less than 0.5.

The relationship between the gradation and the number of overlapped pixels of FIG. 29 may be expressed by simple Expression. That is, the number of overlapped white pixels or black pixels of the independent (discontinuous) white and black arrangements at the gradation x and the gradation y is expressed by x×y. The number of overlapped white pixels or black pixels of the independent white and black arrangements at the neighboring gradation x and gradation (x−1) is expressed $x \times (x-1) \approx x^2$, and matches the curved line 412 and the curved line 416 of FIG. 27.

In a case where the white and black arrangement corresponding to the threshold value I(u) is determined based on x×y representing the number of overlapped white pixels or black pixels of the independent white and black arrangements at the gradation x and the gradation y, the white and black arrangements corresponding to m neighboring threshold value I(u−1), I(u−2), . . . , and I(u−m) may be retained, the number of overlapped white pixels or black pixels of the white and black arrangements may be respectively set as $$M \times [x(I(u-1)) - \gamma \times \{x(I(u-1)) - x(I(u)) \times x(I(u-1))\}] \quad (1)$$

$$M \times [x(I(u-2)) - \gamma \times \{x(I(u-2)) - x(I(u)) \times x(I(u-2))\}] \quad (2)$$

$$\ldots$$

$$M \times [x(I(u-m)) - \gamma \times \{x(I(u-m)) - x(I(u)) \times x(I(u-m))\}], \quad (3)$$

and the replacement process may be performed while maintaining the number of overlapped pixels.

x(I(u) in Expression (1), Expression (2), and Expression (3) corresponds to x of FIG. 29. x(I(u−1)) in Expression (1), x(I(u−2)) in Expression (2), and x(I(u−m)) in Expression (3) correspond to y of FIG. 29.

Here, M represents the size of the halftone mask. γ is set to a value which is greater than 0 and is equal to or less than 1. In a case where γ is set to 0, the number of overlapped pixels with the white and black arrangements corresponding to m neighboring threshold values I(u−1), I(u−2), . . . , I(u−m) are M×x(I(u−i)), M×x(I(u−2)), . . . , and M×x(I(u−m)), and match the number of overlapped pixels of the dither mask having the stacking limitations of the related art. Thus, the halftone mask that considers the continuity in the white and black arrangements between the gradations as being important is manufactured.

Meanwhile, in a case where γ is set to 1, the number of overlapped pixels with the white and black arrangements corresponding to m neighboring threshold values I(u−1), I(u−2), . . . , and I(u−m) are M×x(I(u))×x(I(u−1)), M×x(I(u))×x(I(u−2)), . . . , and M×x(I(u))×x(I(u−m)), and the white and black arrangement corresponding to the threshold value I(u) is independently optimized from the white and black arrangements corresponding to m neighboring threshold values I(u−1), I(u−2), . . . , and I(u−m). Thus, the halftone mask that considers the image quality as being important is manufactured.

That is, in a case where the determining target gradation of the white and black arrangement is x, the gradation at which the white and black arrangement is already determined and has the gradation difference of one or more gradations from the determining target gradation of the white and black arrangement is y, the size of the halftone mask is M, and predetermined constant which is greater than 0 and is equal to or less than 1 is γ, Expression (1), Expression (2), and Expression (3) represent M×{y−γ×(y−x×y)} which is the number of overlapped white pixels or black pixels. In a case where y=1, the number of overlapped white pixels or black pixels is expressed by M×x×y.

m is set to be wide such that a change in gradation of the gradations included in image data on which the halftone process is performed in the range of the gradation from x(I(u−m)) to x(I(u)).

Although it has been described that the replacement process is ended based on the number of actually replaced pixels, in a case where any pixel is not replaced even though the replacement of all the black pixels as the candidates is performed as a cycle, the white pixel and the black pixel are not replaced even though several cycles of replacement are performed. Accordingly, in a case where any pixel is not replaced after one cycle of replacement is performed, the replacement process is completed even though the number of actually replaced pixels does not reach the number of set replacement pixels.

It has been described in the present specification that the target pixel is set for the black pixel and is replaced in the replacement process of the white pixels and the black pixels. In the replacement process of the white pixel and the black pixel, the white pixel may be set as the target pixel, and may be replaced. Due to a difference between the setting of the black pixel as the target pixel and the setting of the white pixel as the target pixel, the white and black arrangement after the replacement process is different even though the number of times of the replacement process or the number of replacement pixels is the same.

An aspect in which the black pixel is set as the target pixel in the threshold value range in which the number of black pixels is smaller than the number of white pixels, that is, in the threshold value range from zero to ½ of the maximum value of the threshold value and the white pixel is set as the target pixel in the threshold value range in which the number of white pixels is smaller than the number of black pixels, that is, in the threshold value range from ½ of the maximum value of the threshold value to the maximum value of the threshold value is preferable.

In the present specification, the white and black arrangements corresponding to the threshold values or the dither mask having the plurality of threshold values have been described as an example of the halftone mask. As the halftone mask, the dither mask and the white and black arrangement may be combined. For example, the dither mask may be used in a partial threshold value range, and the white and black arrangement may be used in the remaining threshold value range. In such an aspect, an aspect in which a white and black arrangement storing step of storing the white and black arrangement is included as the dither mask is preferable. The white and black arrangement storing step is an aspect of the dot pattern storing step.

[Description of Dither Mask Manufacturing System]

Hereinafter, a dither mask manufacturing system corresponding to the dither mask manufacturing method described above will be described. The dither mask manufacturing system is an aspect of a halftone mask manufacturing system.

Figure 30:
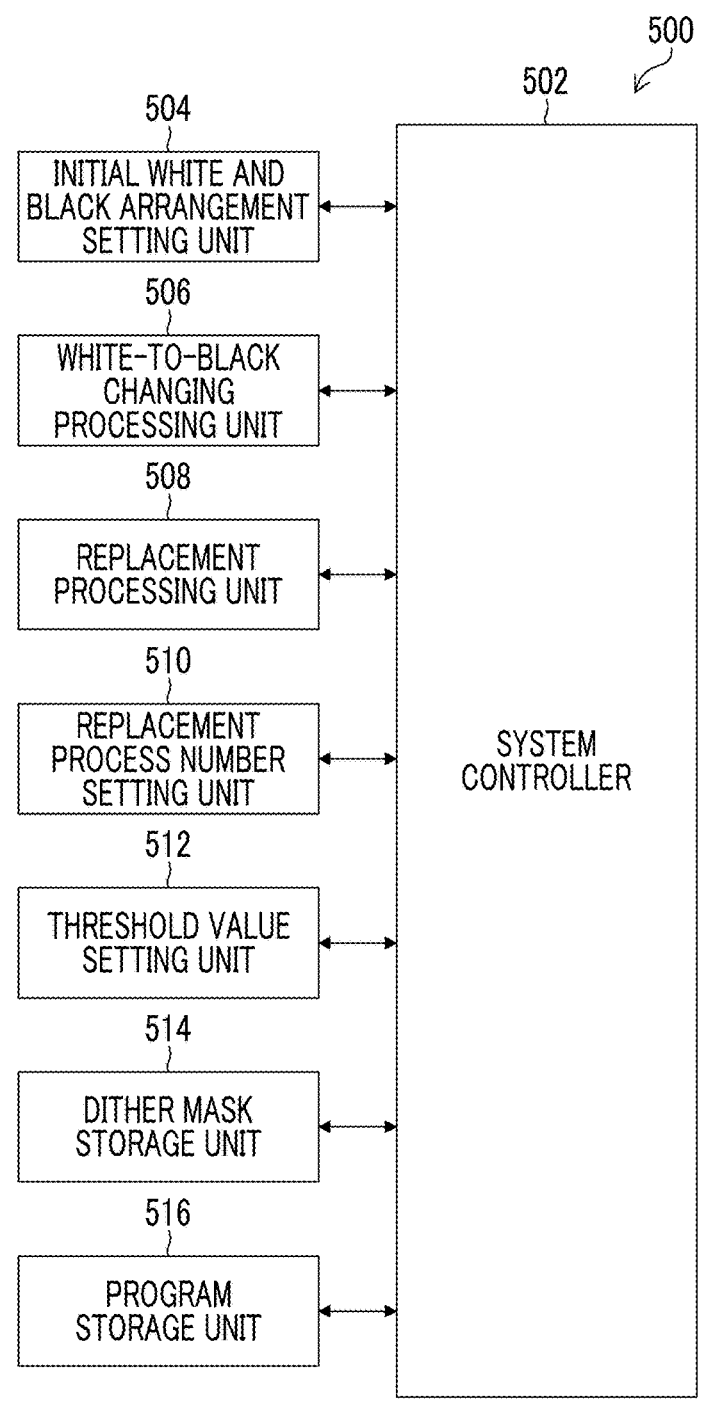
FIG. 30 is a block diagram showing the entire configuration of a dither mask manufacturing system.

FIG. 30 is a block diagram showing the entire configuration of the dither mask manufacturing system.

A dither mask manufacturing system 500 shown in FIG. 30 includes a system controller 502. The system controller 502 integrally controls the units of the system. As a configuration example of the system controller 502, there is an aspect in which a central processing unit and a memory are provided.

The dither mask manufacturing system 500 includes an initial white and black arrangement setting unit 504. The initial white and black arrangement setting unit 504 has a function corresponding to initial white and black arrangement setting step S10 shown in FIG. 1.

The dither mask manufacturing system 500 shown in FIG. 30 includes a white-to-black changing processing unit 506. The white-to-black changing processing unit 506 performs the white-to-black changing process in ascending-order white-to-black changed threshold value setting step S20 shown in FIG. 2 and the black-to-white changing process in descending-order black-to-white changed threshold value setting step S30 shown in FIG. 9.

The white-to-black changing processing unit 506 is an aspect of the dot number changing unit, and is a component of the dot pattern determining unit. The white-to-black changing processing unit 506 corresponds to dot number changing means, and is a component of dot pattern determining means.

The dither mask manufacturing system 500 shown in FIG. 30 includes a replacement processing unit 508. The replacement processing unit 508 performs the replacement process in ascending-order replaced threshold value setting step S22 shown in FIG. 2 and the replacement process in descending-order replaced threshold value setting step S32 shown in FIG. 9.

The replacement processing unit corresponds to replacement processing means, and is a component of dot pattern determining means.

The dither mask manufacturing system 500 shown in FIG. 30 includes a replacement process number setting unit 510. The replacement process number setting unit 510 sets the number of replacement pixels or the number of times of the replacement process in ascending-order replaced threshold value setting step S22 shown in FIG. 2 and the number of replacement pixels or the number of times of the replacement process in descending-order replaced threshold value setting step S32 shown in FIG. 9.

The dither mask manufacturing system 500 shown in FIG. 30 includes a threshold value setting unit 512. The threshold value setting unit 512 sets the threshold values for the white and black dither mask such as the white and black dither mask 20 shown in FIGS. 6A to 6C and the black and white dither mask such as the black and white dither mask 44 shown in FIGS. 6A to 6C.

The dither mask manufacturing system 500 shown in FIG. 30 includes a dither mask storage unit 514. The dither mask storage unit 514 stores the white and black dither mask such as the white and black dither mask 20 shown in FIGS. 6A to 6C and the black and white dither mask such as the black and white dither mask 44 shown in FIGS. 6A to 6C.

The dither mask storage unit 514 shown in FIG. 30 may function as a white and black arrangement storage unit that stores the white and black arrangements corresponding to the threshold values.

The dither mask manufacturing system 500 includes a program storage unit 516. The program storage unit 516 stores programs executed by the units of the dither mask manufacturing system 500. A temporary non-transitory information storage medium is applied as the program storage unit 516.

The units of the dither mask manufacturing system 500 shown in FIG. 30 may be appropriately integrated or separated.

The dither mask manufacturing system 500 shown in FIG. 30 may include means corresponding to the steps or the processes in various aspects of the dither mask manufacturing method in addition to the configurations or instead of the configurations.

[Description of Dither Mask Manufacturing Program]

A program causing a computer to function as the dither mask manufacturing system may be stored in a computer-readable medium, and a dither mask manufacturing program may be provided through the computer-readable medium.

As an example of the computer-readable medium, there are CD-ROM and a magnetic disk. The CD-ROM is short for a compact disc read-only memory. The computer-readable medium that stores the dither mask manufacturing program is a temporary non-transitory information storage medium.

Instead of the aspect in which the program is stored in the information storage medium and is provided, a program signal may be downloaded and provided by busing a communication network such as the Internet. The provided program is installed into the computer, and thus, the program may cause the computer to function as the dither mask manufacturing system. The dither mask manufacturing program is an aspect of a halftone mask manufacturing program.

The embodiments of the present invention described above may appropriately change, add, and remove the components without departing from the gist of the present invention. The present invention is not limited to the embodiment described above, and may be variously changed by those having ordinary knowledge within the technical scope of the present invention.

EXPLANATION OF REFERENCES

20: white and black dither mask
44: black and white dither mask
220: dither mask

What is claimed is:

1. A halftone mask manufacturing method of manufacturing a halftone mask to be applied to a halftone process of creating a halftone image by converting multivalued image data, the method comprising:
    a dot pattern determining step of determining a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changing the dot pattern determining target gradation, and determining dot patterns for a plurality of gradations,
    wherein the dot pattern determining step includes
    a dot number changing step of determining a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and
    a replacement processing step of determining the dot pattern at the dot pattern determining target gradation by performing a replacement process of replacing dots including some of the dots at the dot pattern determined gradation with non-dot arrangements on the temporary dot pattern, or
    a replacement processing step of determining a temporary dot pattern at the dot pattern determined gradation by performing a replacement process of replacing some of dots with non-dot arrangements on the dot pattern at the dot pattern determined gradation, and a dot number changing step of determining the dot pattern at the dot pattern determining target gradation by removing or adding the dots as much as the number of dots corresponding the gradation difference between the dot pattern determined gradation and the dot pattern determining target gradation from or to the temporary dot pattern.

2. The halftone mask manufacturing method according to claim 1, wherein, in the dot number changing step, the dots as much as the number of dots corresponding to the gradation difference between the dot pattern determined gradation and the dot pattern determining target gradation are added in a case where the dot pattern determining target gradation is greater than the dot pattern determined gradation, and the dots as much as the number of dots corresponding to the gradation difference between the dot pattern determined gradation and the dot pattern determining target gradation are removed in a case where the dot pattern determining target gradation is less than the dot pattern determined gradation.

3. The halftone mask manufacturing method according to claim 1, further comprising:
a threshold value setting step of setting a threshold value to the halftone mask based on the dot pattern for each gradation determined in the dot pattern determining step.

4. The halftone mask manufacturing method according to claim 3,
wherein the threshold value setting step includes a threshold value setting step of setting a first threshold value at which the non-dot arrangement is switched to the dot with an increase in gradation and a second threshold value at which the dot is switched to the non-dot arrangement with the increase in gradation at at least some gradations.

5. The halftone mask manufacturing method according to claim 4,
wherein, in the threshold value setting step, two kinds of the first threshold value and the second threshold value are set for at least some pixels at at least some gradations.

6. The halftone mask manufacturing method according to claim 1, further comprising:
a dot pattern storing step of storing the dot pattern which is determined in the dot pattern determining step and is the dot pattern for each gradation at at least some gradations.

7. The halftone mask manufacturing method according to claim 1,
wherein, in the dot pattern determining step, the dot pattern is determined at one gradation at a time at at least some gradations.

8. The halftone mask manufacturing method according to claim 1,
wherein, in the dot pattern determining step, a dot pattern at the dot pattern determining target gradation having a gradation difference of two or more gradations from the dot pattern determined gradation is determined, and
a dot pattern at a gradation between the dot pattern determined gradation and the dot pattern determining target gradation is determined based on the dot pattern at the dot pattern determined gradation and the dot pattern at the dot pattern determining target gradation.

9. The halftone mask manufacturing method according to claim 1, further comprising:
a replacement process number setting step of setting the number of times of the replacement process in the replacement processing step.

10. The halftone mask manufacturing method according to claim 9,
wherein, in the replacement process number setting step, the number of times of the replacement process in the replacement processing step is changed depending on the gradation at at least some gradations.

11. The halftone mask manufacturing method according to claim 9,
wherein, in the replacement process number setting step, the number of times of the replacement process in the replacement processing step of increasing the number of times of the replacement process in the replacement processing step in a case where the smaller one of the number of dots in the dot pattern and the number of non-dot arrangements is increased or decreasing the number of times of the replacement process in the replacement processing step in a case where the smaller one of the number of dots in the dot pattern and the number of non-dot arrangements is decreased is set at at least some gradations.

12. The halftone mask manufacturing method according to claim 9,
wherein, in the replacement process number setting step, the number of times of the replacement process in the replacement processing step which is in proportion to the smaller one of the number of dots in the dot pattern and the number of non-dot arrangements is changed at at least some gradations.

13. The halftone mask manufacturing method according to claim 9,
wherein, in the replacement process number setting step, in a case where a value acquired by dividing the gradation by a maximum gradation is x and a size of the halftone mask is M, the number of times of the replacement process in the replacement processing step is set in a range which is not greater than $M \times (x - x^2)$ at at least some gradations.

14. The halftone mask manufacturing method according to claim 9,
wherein, in the replacement process number setting step, the number of times of the replacement process in the replacement processing step is set in a range which is not greater than $M \times \beta \times (x - x^2)$ at at least some gradations in a case where a value acquired by dividing the gradation by a maximum gradation is x, the size of the halftone mask is M, and predetermined constant which is greater than 0 or is equal to or less than 1 is $\beta$.

15. The halftone mask manufacturing method according to claim 9,
wherein, in the replacement process number setting step, the number of times of the replacement process in the replacement processing step is set based on a replacement dot number which is the number of dots on which the replacement of the dot and the non-dot arrangement is actually performed at at least some gradations.

16. The halftone mask manufacturing method according to claim 9,
wherein, in the replacement process number setting step, the number of times of the replacement process in the replacement processing step is set based on the number of overlapped dots or the number of overlapped non-dot arrangements in a dot pattern of a target on which the replacement process is performed and a dot pattern of each of one or more dot pattern determined gradations at at least some gradations.

17. The halftone mask manufacturing method according to claim 9,
wherein, in the replacement process number setting step, in a case where a value acquired by dividing a gradation of a dot or a non-dot arrangement in a dot pattern of a target on which the replacement process is performed by a maximum gradation is x, a value acquired by dividing a gradation of a dot or a non-dot arrangement in a dot pattern of each dot pattern determined gradation by a maximum gradation is y, and a size of the halftone mask is M, the number of times of the replacement process in the replacement processing step is set in a range in which the number of overlapped non-dot arrangements or the number of overlapped dots in the dot pattern of the target on which the replacement process is performed and the dot pattern at each dot pattern determined gradation is equal to or greater than M×x×y at at least some gradations.

18. The halftone mask manufacturing method according to claim 9,
wherein, in the replacement process number setting step, in a case where a value acquired by dividing a gradation of a dot or a non-dot arrangement in a dot pattern of a target on which the replacement process is performed by a maximum gradation is x, a value acquired by dividing a gradation of a dot or a non-dot arrangement in a dot pattern of each dot pattern determined gradation by a maximum gradation is y, a size of the halftone mask is M, and predetermined constant which is greater than 0 and is equal to or less than 1 is γ, the number of times of the replacement process in the replacement processing step is set in a range in which the number of overlapped non-dot arrangements or the number of overlapped dots in the dot pattern of the target on which the replacement process is performed and the dot pattern at each dot pattern determined gradation is equal to or greater than M×(y−γ×(y−x×y)) at at least some gradations.

19. The halftone mask manufacturing method according to claim 1,
wherein, in the dot pattern determining step, a dot pattern of which evaluation of image quality becomes best is determined as the dot pattern at the dot pattern determining target gradation.

20. The halftone mask manufacturing method according to claim 1,
wherein, in the dot number changing step, a dot pattern of which evaluation of image quality becomes best is determined as the temporary dot pattern at the dot pattern determining target gradation.

21. The halftone mask manufacturing method according to claim 1,
wherein, in the replacement processing step, a dot pattern of which evaluation of image quality becomes best is determined as the temporary dot pattern at the dot pattern determined gradation.

22. A halftone mask manufacturing system of manufacturing a halftone mask to be applied to a halftone process of creating a halftone image by converting multivalued image data, the system comprising:
a dot pattern determining unit that determines a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changes the dot pattern determining target gradation, and determines dot patterns for a plurality of gradations,
wherein the dot pattern determining unit includes
a dot number changing unit that determines a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and
a replacement processing unit that determines the dot pattern at the dot pattern determining target gradation by performing a replacement process of replacing dots including some of the dots at the dot pattern determined gradation with non-dot arrangements on the temporary dot pattern, or
a replacement processing unit that determines a temporary dot pattern at the dot pattern determined gradation by performing a replacement process of replacing some of dots with non-dot arrangements on the dot pattern at the dot pattern determined gradation, and a dot number changing unit that determines the dot pattern at the dot pattern determining target gradation by removing or adding the dots as much as the number of dots corresponding the gradation difference between the dot pattern determined gradation and the dot pattern determining target gradation from or to the temporary dot pattern.

23. A non-transitory computer-readable recording medium that stores a halftone mask manufacturing program for manufacturing a halftone mask to be applied to a halftone process of creating a halftone image by converting multi-valued image data,
wherein, in a case where the halftone mask manufacturing program is read by a computer,
the program causes the computer to function as dot pattern determining means for determining a dot pattern at a dot pattern determining target gradation, which is a gradation having a gradation difference of one or more gradations from a dot pattern determined gradation as a gradation at which a dot pattern indicating whether or not there is a dot is already determined and is a gradation of a target for determining a dot pattern based on the dot pattern at the dot pattern determined gradation, consecutively changing the dot pattern determining target gradation, and determining dot patterns for a plurality of gradations,
the dot pattern determining means causes the computer to function as
dot number changing means for determining a temporary dot pattern at the dot pattern determining target gradation by removing or adding dots as much as the number of dots corresponding to the gradation difference between the dot pattern determined gradation and the dot pattern determining target gradation from or to the dot pattern at the dot pattern determined gradation, and replacement processing means for determining the dot pattern at the dot pattern determining target gradation by performing a replacement process of replacing dots including some of the dots at the dot pattern determined gradation with non-dot arrangements on the temporary dot pattern, or
replacement processing means for determining a temporary dot pattern at the dot pattern determined gradation by performing a replacement process of replacing some of dots with non-dot arrangements on the dot pattern at the dot pattern determined gradation, and dot number changing means for determining the dot pattern at the dot pattern determining target gradation by removing or adding the dots as much as the number of dots corresponding the gradation difference between the dot pattern determined gradation and the dot pattern determining target gradation from or to the temporary dot pattern.

\* \* \* \* \*